(12) United States Patent
Ritter et al.

(10) Patent No.: US 7,770,491 B2
(45) Date of Patent: Aug. 10, 2010

(54) DEVICE WITH ADDITIONAL RESTORING FORCE ON THE GAS PEDAL BASED ON THE DEVIATION OF A VEHICLE PARAMETER FROM THE SET VALUE

(75) Inventors: Wolfgang Ritter, Oberursel/Ts (DE); Holger von Hayn, Bad Vilbel (DE); Jürgen Schonlau, Walluf (DE); Torsten Queisser, Frankfurt am Main (DE); Milan Klimes, Zornheim (DE); Manfred Rüffer, Sulzbach (DE); Martin Haverkamp, Frankfurt am Main (DE); Johannes Görlach, Langgöns (DE); Wolfgang Kroll, Hofheim (DE); Lothar Schiel, Hofheim (DE)

(73) Assignee: Continental Teves AG & Co. oHG (DE)

( * ) Notice: Subject to any disclaimer, the term of this patent is extended or adjusted under 35 U.S.C. 154(b) by 1183 days.

(21) Appl. No.: 10/493,896

(22) PCT Filed: Oct. 31, 2002

(86) PCT No.: PCT/EP02/12202

§ 371 (c)(1),
(2), (4) Date: Apr. 26, 2004

(87) PCT Pub. No.: WO03/039899

PCT Pub. Date: May 15, 2003

(65) Prior Publication Data
US 2004/0259687 A1 Dec. 23, 2004

(30) Foreign Application Priority Data

Nov. 5, 2001 (DE) ................. 101 53 837
Nov. 26, 2001 (DE) ................. 101 57 622
Feb. 13, 2002 (DE) ................. 102 06 102
May 2, 2002 (DE) ................. 102 19 674
Oct. 30, 2002 (DE) ................. 102 50 456

(51) Int. Cl.
G05G 1/30 (2008.04)
(52) U.S. Cl. .................. 74/560
(58) Field of Classification Search ............. 74/512, 74/513, 516, 517, 518, 560; 180/170
See application file for complete search history.

(56) References Cited

U.S. PATENT DOCUMENTS 2,822,881 A 2/1958 Treharne (Continued)

FOREIGN PATENT DOCUMENTS

DE 26 30 071 A1 7/1976

(Continued)

OTHER PUBLICATIONS

International Search Report of International Application No. PCT/EP02/12202 dated Mar. 6, 2003.

*Primary Examiner*—Vicky A Johnson
(74) *Attorney, Agent, or Firm*—RatnerPrestia

(57) ABSTRACT

It is known in the art to apply a counterforce, which opposes the actuating force, onto an accelerator pedal of a vehicle in the event that the vehicle, with respect to a vehicle parameter, sufficiently deviates from the nominal value. The parameter can be the speed or the measured distance from vehicles driving ahead.

The invention discloses a series of embodiments that satisfy especially easily and reliably the defined requirements for applying the counterforce to the pedal.

13 Claims, 43 Drawing Sheets

U.S. PATENT DOCUMENTS

| | | | | |
|---|---|---|---|---|
| 2,986,953 | A * | 6/1961 | De Armond et al. | 74/478 |
| 4,367,805 | A | 1/1983 | Totani et al. | |
| 5,568,797 | A * | 10/1996 | Landerretche | 123/396 |
| 6,009,853 | A * | 1/2000 | Fujikawa et al. | 123/396 |
| 6,666,105 | B2 * | 12/2003 | Wachi | 74/512 |
| 7,044,019 | B2 * | 5/2006 | Hauschopp et al. | 74/512 |
| 7,318,361 | B2 * | 1/2008 | Boutteville et al. | 74/518 |

FOREIGN PATENT DOCUMENTS

| | | |
|---|---|---|
| DE | 25 55 429 A1 | 6/1977 |
| DE | 195 06 629 A1 | 8/1996 |
| DE | 692 09 660 T2 | 12/1996 |
| DE | 196 20 929 A1 | 11/1997 |
| DE | 298 05 253 U1 | 3/1998 |
| DE | 197 23 812 C1 | 2/1999 |
| DE | 198 10 691 A1 | 9/1999 |
| DE | 199 16 434 A1 | 10/2000 |
| DE | 101 10 836 A1 | 10/2001 |
| EP | 0 709 245 A1 | 5/1996 |
| GB | 2 114 717 A | 8/1983 |
| JP | 05231194 A | 9/1993 |

* cited by examiner

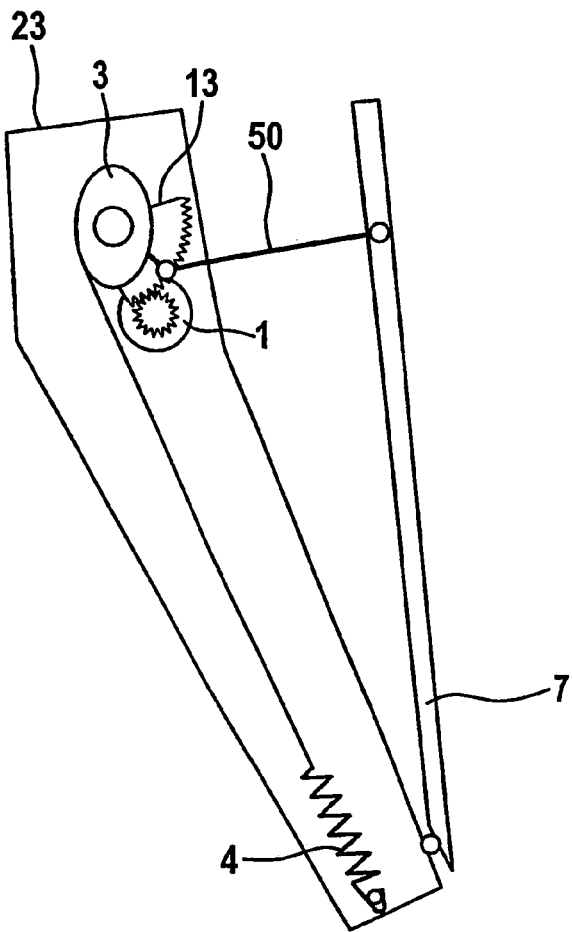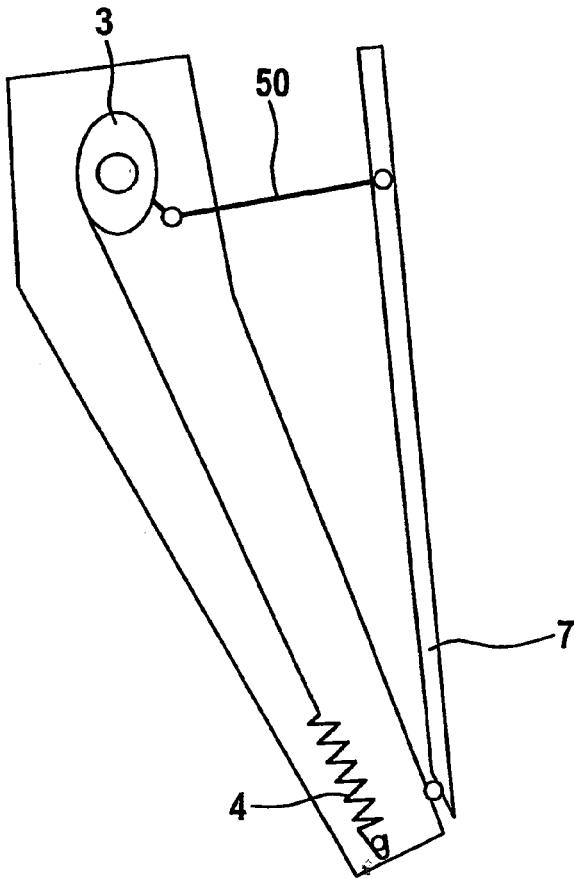
Fig. 8a  Fig. 8c
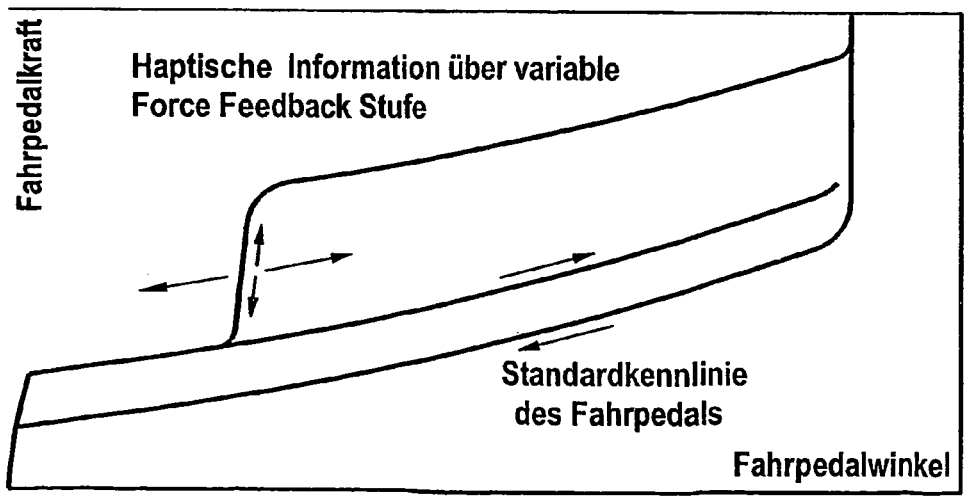
Fig. 8b

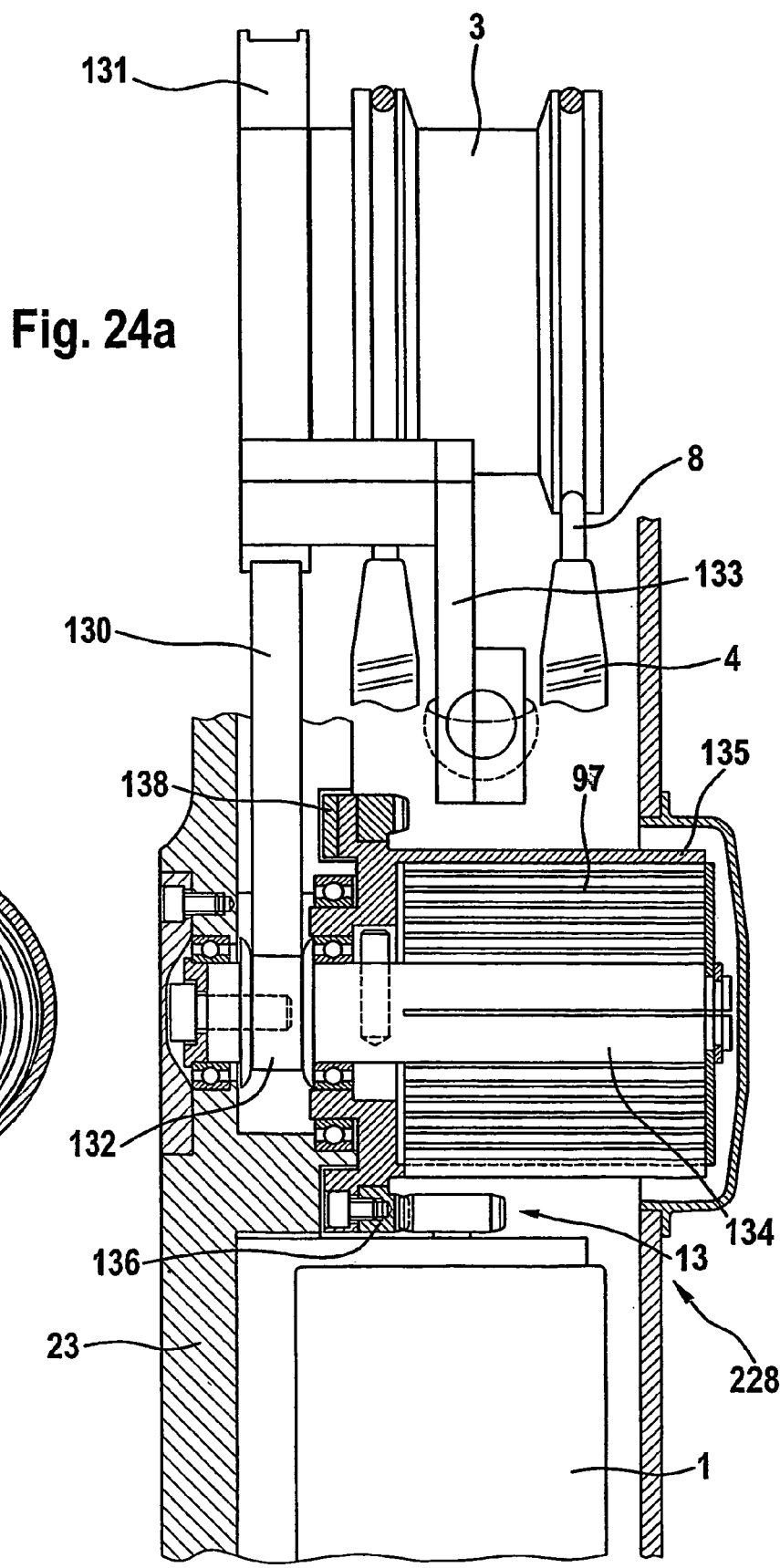

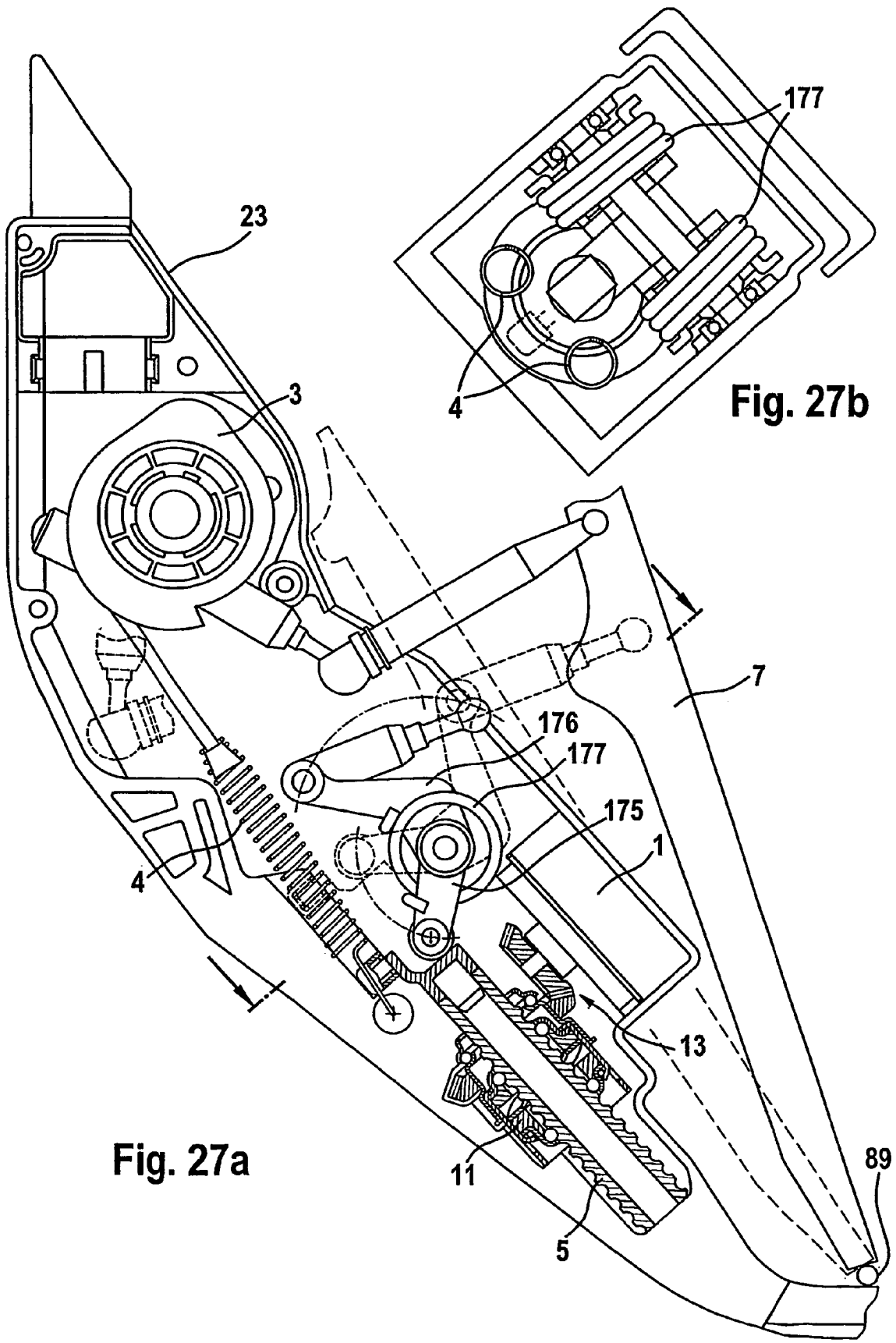

DEVICE WITH ADDITIONAL RESTORING FORCE ON THE GAS PEDAL BASED ON THE DEVIATION OF A VEHICLE PARAMETER FROM THE SET VALUE

TECHNICAL FIELD

The present invention relates to a device for controlling a parameter of a motor vehicle (e.g. the speed of a vehicle), which includes a control element configured as a pedal. The fuel supply to the engine and, thus, the driving speed of the vehicle is controlled by way of the control element (e.g. the accelerator pedal or brake pedal) (or the speed is reduced by way of activation of the brake system). For safely and duly driving a vehicle, it is very important to stick to an appropriate and/or prescribed speed of a vehicle. To detect the instantaneous speed of a vehicle, the driver must read the speed from a speedometer in displays known in the art. While the driver is reading this measuring instrument and evaluates the result, it is possible for him/her only to certain limits to pay attention to the traffic.

Hence, care must be taken in designing a display system for the driving speed of a vehicle, in particular, that the reading operation, on the one hand, and performing the actual task of a driver (maintaining the course, the speed, and the distance from other vehicles) hinder each other to a least possible degree. To this end, it is desirable that warning devices are as conspicuous and easy to interpret as possible, e.g. as regards an excessive speed, so that the driver can react especially quickly and without error. The reaction time to a display is the shorter, the more compatible it is with the associated operating element, that means the better the discernible correlation between the display and the operating element is.

BACKGROUND OF THE INVENTION

In this regard, it was disclosed in DE-OS 255 429 that a force is coupled into the pedal controlling the speed of the vehicle in dependence on the deviation of a parameter of the vehicle (for example, the distance from another vehicle, deviation from a nominal speed). A like function is designated in the following as force-feedback function and mostly referred to as FF function. A pedal equipped with a function of this type is mostly referred to as Force-Feedback-Pedal or FFP.

EP patent 709245 describes how, in the event of exceeding of the nominal speed, a force is exerted computer-controlled on the pedal that controls the speed, said force counteracting the pressure applied by the foot of the driver and thus warning the driver. As the driver has the feeling of having reached already an accelerator pedal position that corresponds to a higher driving speed because a corresponding pedal force is counteracting, the driver is quasi disciplined thereby and induced to observe the speed prescribed or appropriate for safe driving. In this arrangement, a turning lever is coupled to a carburetor cable. When the actual speed is below the nominal speed, a gear will adopt the position as shown in FIG. 1, and the lever is freely movable. The position of FIG. 2 is adopted when the nominal speed is reached, and an adjusting lever will abut on the control lever. When the actual speed deviates further from the nominal speed, a condition as shown in FIG. 3 is adapted, where the adjusting lever is returned counterclockwise by the control lever, with the result that the gas is reduced and the force exerted by the driver becomes ineffective. It is not possible for the driver to increase the speed in excess of the adjusted speed value in case of need.

U.S. Pat. No. 4,367,805 discloses coupling the conduit used to meter the gas with a lever that cooperates with an adjusting lever driven by a motor. The lever is turned to the right upon depression of the pedal. When the cruise control is switched on, the adjusting lever is moved to adopt the position that corresponds to the adjusted speed. The angle of rotation of the adjusting lever depends on the difference between the actual speed and the nominal speed. As long as the actual speed is lower than the nominal speed, the position of the two levers is freely variable. When the nominal speed is exceeded, a spring must be counteracted upon depression of the pedal. As a result, the counterforce rises in dependence on the difference between actual and nominal speeds, an abrupt increase of the restoring force is not intended.

U.S. Pat. No. 5,568,797 discloses adjusting a lever by way of a pedal along with a throttle. Turning the lever to the right means an increase of speed. The nominal speed is adjusted by way of a motor shaft with the indicator secured thereto, and turning to the right implies a higher nominal speed. This prior art device suffers from the following disadvantage: initially, the force of the spring counteracts the restoring force of the spring, then becomes zero, and subsequently acts in dependence on the difference of speeds rising in the direction of the restoring force.

In U.S. Pat. No. 2,822,881, the pre-adjustment is effected by means of a turning plate. An indicator plots the actual speed. When the actual speeds exceeds the nominal speed, the indicator will switch a contact, and a relay will switch on a motor causing a slide to move by means of a rod back against a stop until the actual speed is sufficiently below the nominal speed and the motor is hence switched off.

It has shown that the prior art constructions are rather complicated and costly and do not satisfy a number of demands placed in practical operations (cf. e.g. the demanded course of curve in FIG. 8b). Attention must be paid, among others, that when using an electric motor for providing the FF function, said motor will not be overloaded. Further, care must be taken that the actuator for the FF function or the device is under no circumstances allowed to independently increase the speed of the vehicle, thereby augmenting risks that are to be avoided by the device. In addition, the driver shall keep full control over the vehicle. This means, it must be possible to the driver to apply the accelerator pedal (or brake pedal) to achieve a higher speed or intensified braking even if the FF function has commenced already. This action is referred to as 'overruling depression'. Furthermore, it must be ensured that the driver notices that the vehicle exceeded the nominal speed. Attention must be paid that the force applied to the pedal at a defined speed can be very different, depending on how much the vehicle is loaded and whether it is driving uphill or downhill.

BRIEF SUMMARY OF THE INVENTION

In view of the above, the invention is based on a device for controlling a vehicle parameter, in particular the speed or the deceleration of a vehicle, which includes a control element preferably configured as a pedal, through which the parameter, especially the driving force of the vehicle engine and, thus, the speed of the vehicle or the brake force and, thus, the deceleration of the vehicle is adjustable, wherein the change in position of the control element caused by a corresponding actuating force with respect to its initial position leads to an increase of the parameter of especially the driving force of the engine or the brake force of the brake system in opposition to a restoring force, and with decreasing actuating force, the restoring force returns the control element in the direction of its initial position, and a controlling member being provided and generating an additional controlling force that acts in the restoring direction of the control element in dependence on one or more predetermined measured variables of the vehicle as it is e.g. shown in FIG. 8c.

An object of the invention is to describe improvements of the known constructions that allow reducing the manufacturing costs for the device, improving the reliability of the mode of operation of the device and additionally introducing favorable features that simplify handling the device in practical operations. Details relating to the problems of the prior art devices can be seen in FIGS. 8a and 8c in connection with the associated description.

Another objective of the invention is to safeguard that the generic device can be overruled. This means that the brake pedal can be depressed in opposition to the effect of the restoring force (FFP function). This is e.g. important when a dangerous situation can best be overcome by accelerating the vehicle, for example, for the purpose of overtaking. This means, it shall be avoided by all means that a force occurring in the direction of the return movement of the pedal will make a risky situation more dangerous instead of eliminating it.

This object is achieved according to the present invention in that the controlling force is generated by an electromechanical actuator, in that the actuator is actuated by a corrective signal triggered by the deviation of a measured quantity of the vehicle from a nominal value, in particular the deviation of the driving speed from a predetermined nominal speed or the brake force from an allowable brake force, or is at least dependent thereon, in that the controlling force acts on the control element in dependence on the deviation from the nominal value, especially of the actual speed from the nominal speed, in that means of overruling pedal depression are provided by way of which the controlling force can be overcome by a sufficiently high actuating force and the features listed in the embodiments. Thus, the invention principally includes combining a number of features to the end of supporting the appropriate application of a pedal, in particular the accelerator pedal, in an optimal fashion.

On the one hand, an electromechanical actuator provides the additional controlling force (that is the FF function). Said actuator is favorably controllable in dependence on a number of parameters. This control can be carried out e.g. by a suitable electronic circuitry such as a processor. It is this way possible to make the controlling force depend not only on the magnitude of the deviation of the actual speed from the nominal speed. Instead, it can also be considered which force the driver uses to apply the accelerator pedal so that the controlling force can be adjusted in response thereto. This way it can be avoided that the driver will not feel the relatively low controlling force that develops e.g. with an only insignificant exceeding of speed during uphill driving where it is necessary to apply the pedal with higher force. This means that, admittedly, the controlling force shall depend qualitatively but not quantitatively on the difference of speed. More specifically, even at a small deviation of the actual speed from the nominal speed, the controlling force is required to set in at an adequate quantity in order that the driver senses that now the nominal speed was exceeded and the actuator resets the pedal.

Finally, another objective is to enable the driver to overcome the controlling force in special cases. In this respect, dangerous situations are at issue where a reduction of the speed may entail an increased danger, for example, in an overtaking operation before a hilltop. This action is often referred to as an overruling pedal depression.

According to the solution of the invention to the task set, means shall be provided, among others, enabling the driver to overcome the additional controlling force including the anyway predetermined restoring force. This means that the driver will not yield to the restoring force exerted by the actor, in particular an electric motor, that restores the pedal, but withstands this force, whereupon the pedal remains in its position, or even that the driver exerts a higher force by which the pedal is depressed deeper in opposition to the controlling force in the sense of a higher speed. To render this possible, two embodiments of the device of the invention are feasible. When the power source, e.g. the electric motor, can be reversed, i.e. can be moved contrary to its driving direction, the 'overruling pedal depression' can be rendered possible in a simple fashion in that the drive is overcome by a corresponding high pedal force and the motor is this way practically forced to reverse to some extent.

However, if it is not possible for the power source to reverse, it is necessary to insert an elastic member into the path of force in order to allow overruling pedal depression, which elastic member will yield to a sufficiently great force applied to the pedal and thereby permits a depression of the pedal in opposition to the controlling force. The elastic member, e.g. a steel spring, must have a sufficient rate of preload because otherwise the spring will give in without exerting a greater force on the pedal, with the result that the driver is not warned due to the response of the force-feedback-pedal device (FFP device). On the other hand, it is desired that the spring constant of the spring is small to prevent the controlling force from changing excessively with the position of the pedal.

However, even if the power source is reversible, it is nevertheless very expedient to insert the elastic member described above into the path of force. This is because in emergency situations it may be necessary for the pedal to be depressed so quickly that the reversing power source and/or an interposed gear is unable to follow and will quasi block or is actually blocked. For these cases, the invention suggests inserting the elastic member described above into the path of force even when a reversible power source is used.

Corresponding to an improvement of the invention it is proposed that the controlling force commences abruptly. This means that the controlling force shall not occur gradually so that the driver hardly notices that the additional controlling force (FFP force) has set in and possibly is under the illusion that the pedal feeling has changed. It is rather desired that the additional controlling force commences abruptly and does not leave the driver in doubt about that the control wants to reset the pedal in opposition to the actuating force of the driver. This achieves the necessary alarm effect. If, on the other hand, e.g. the controlling force rises with the difference between the actual speed and the nominal speed, the actual rise of the restoring force at the pedal will possibly be understood only as a changed pedal feeling rather than as a warning.

Because hydraulic and pneumatic forces are used in addition to mechanical forces for the control of vehicles, it is possible to furnish the actuator with energy in this way. In an improvement of the invention, the actuator accommodates an electromechanical drive, in particular, an electric motor generating the controlling force. This permits implementing the features of the invention in a relatively simple manner. Using an electric motor as a power source not only renders its start easily possible by means of electric signals. In addition, this power source can also follow input control signals very easily so that the magnitude of the additional controlling force can be adapted easily to additional marginal conditions during the FFP action. Thus, it is e.g. possible to make the additional controlling force depend on the magnitude of the presently prevailing normal restoring force and, thus, on the pedal position. It can be ensured thereby that the additional controlling force will always stay in a largely constant ratio to the restoring force just applied in the commencement of the controlling force.

Provision is made in an improvement of the invention in that the controlling force is active only in opposition to the actuating force but not in the direction of the actuating force so that only a controlling force that acts in a predetermined direction may become active, while a controlling force acting in the opposite direction is reliably prevented. This may be brought about e.g. by a corresponding selection of the type of motor or mechanically by appropriate stops. This provision is important in particular because it must be excluded that the control, on account of a malfunction, accelerates the vehicle instead of ensuring that the accelerator pedal is returned and, hence, the speed reduced. Special components will be proposed in the following for this purpose, which can transmit a force only in one single direction, as is the case with the transmission of tensile forces by means of ropes or bands, for example. In addition, provisions must be made to reliably prevent that, in the case of malfunction of the actuator, the gas lever (or brake lever) can move in the wrong direction, thereby increasing the speed of the vehicle instead of reducing it. Further, the controlling force shall be effective only as long as the actual speed exceeds the nominal speed. Hence, it must be ensured that the controlling force will not reverse when the speed falls under the nominal speed, for example, in order to force the driver to maintain the adjusted nominal speed.

As will be explained herein below, the means for overruling depression of the pedal in opposition to the FFP force can consist in a particularly simple fashion in that the power source furnishing the additional controlling force can be forced by a correspondingly high actuating force at the pedal to move in opposition to its direction of drive. When the power source is an electric motor, for example, overruling pedal depression can involve that the activated motor is forced by the overruling force to move in opposition to its direction of drive. It must be ensured, however, that an overruling depression is possible even if the motor and/or the gear interposed between motor and pedal block at high pedal forces or high pedal actuating speeds (e.g. quick depression of the accelerator pedal through its full travel). Appropriate measures for this purpose are suggested in an improvement of the invention, which will be referred to as fail-safe devices in the following. One expedient solution may involve interposing a stiff spring into the driving path of the power source, said spring acting like a non-elastic object in the case of usual overruling depression forces. If, however, the forces become too high, what may be due to a blocked condition, the spring will give way and thus permit a movement of the pedal in opposition to the FFP force.

In order to abruptly increase the force that urges the pedal back, an improvement of the invention suggests using a stop under bias instead of the clutch. In this arrangement, the stop can be constantly under a defined preload, or the preload will develop only when the actual speed approaches the nominal speed. Principally, it is only necessary that the stop has assumed that position, which a counterstop coupled to the pedal will reach when the nominal speed is exceeded. One problem, however, can involve that the position of the pedal is not precise at a defined speed, because said position not only depends on the condition of the vehicle (charge) but also on the condition of the route (uphill driving). Thus, attention must be paid in the pre-adjustment of the position of the stop that the mentioned factors are taken into account. A simple solution for this problem is achieved in that the actuator, in particular the electric motor, is only actuated when the actual speed is equal to or higher than the adjusted nominal speed. The basic reflection in this regard is that at the moment of activation of the FFP force, this additional controlling force can be applied to the pedal without the need to know where the pedal is exactly positioned at that moment. Thus, at the moment when the actual speed reaches the nominal speed, it is only necessary that the additional controlling force is applied to the pedal or the path of force leading to the pedal in order to achieve the desired effect.

In consequence thereof, it is recommended as an improvement of the invention that the actuator has an electric control circuit outputting a switching signal when a sufficiently small distance prevails between the actual speed and the nominal speed, by which switching signal the stop is moved into engagement with the counterstop, with the result that the controlling force output by the actuator is transmitted to the pedal. Thus, the electric motor starts to operate only when the additional controlling force shall become effective. A pre-adjustment of a stop and the related problems as described hereinabove are simply avoided thereby.

To bring about that the desired controlling force commences abruptly, an improvement of the invention suggests providing the actuator with a clutch. The force generated by the motor can be transmitted abruptly to the pedal by activating the clutch. More detailed statements with respect to a favorable design of a like clutch will be made in the following.

The controlling force that is output by the actuator is introduced by means of a transmission member. To ensure that the driver is able to overcome (overrule) the controlling force, a preferred aspect of the invention discloses designing the controlling element itself or its support elastically so that it can escape starting from a defined actuating force exerted by the driver and allows adjusting the pedal in the direction of higher speed.

A particularly simple dimensioning of the controlling force can be achieved in that the controlling force is coupled into the pedal completely separated from the restoring force. This way, the actuator can become active in the direction of the pedal-module irrespective of the restoring force. It is this way more easily possible to conform the effect of the actuator to the restoring force.

A relatively simple construction can be achieved in that the transmission paths for the controlling force and restoring force are jointly used to a large extent. This can occur e.g. in that both the actuator and the source for the restoring force make catch at the deflection pulley in the pedal module. This can happen at a joint point of application or at different points of application.

When a joint point of application is chosen, it is also possible to jointly use the traction rope guided over the deflection pulley so that in the direction of force in front of the deflection pulley both the source for the restoring force and the actuator make catch at the traction rope. The restoring force and the controlling force may then be connected in series, that means, the two forces are coupled one behind the other in the traction rope or its extension. The advantage is that the transmission member of the actuator can be suspended at the restoring spring and is elastically captivated thereby. The tensile force of the restoring spring can be abruptly increased by means of the transmission member by shortening the traction rope, with the result that the tensile force is increased by the magnitude of the controlling force added. The driver can, however, overcome the controlling force as long as the restoring spring can be unwound still further.

As has been explained already hereinabove, a clutch can be used to make the force of the actuator act abruptly on the pedal. As this occurs, the clutch can transmit the controlling force either directly onto the pedal or indirectly, e.g. by way of the traction rope and the deflection pulley. Thus, it is possible to abruptly apply the force of the motor, which is possibly started already before the nominal value is exceeded or which is constantly idling, to the pedal by way of the clutch so that the force retracting the pedal rises abruptly. A spiral spring or a helical spring may be used optionally for producing the preload. The preload is preferably built up by an electric motor, which starts to operate before the nominal value is reached or while the nominal value is reached.

A favorable design by using a stop can include that an electric motor is connected by way of a rope to a spring that develops the controlling force. When the electric motor extends the spring in length, a stop attached to the rope can be changed in position only by means of a correspondingly greater force. When a counterstop is now fastened to the traction rope of the restoring spring, the point at which the controlling force becomes active can be determined by way of varying the position of the stop by the electric motor. This principle can well be employed even if two restoring springs are provided, as is conventional practice. It is advisable in this case for reasons of symmetry to arrange one counterstop moving against the stop adjusted by the electric motor for each of the two restoring springs.

It is normally advantageous to adjust the stop in relation to the housing of the pedal module. This changes the distance between the counterstop and the pedal lever. Another possibility involves keeping the stop stationary in relation to the housing of the pedal module and providing the pedal lever with a counterstop variable in its position. The adjustment may be effected by an electric motor attached to the pedal lever.

As has been explained hereinabove, the position of the stop can be reset on a circular path. This is favorable in particular when the controlling force is applied by a spiral spring preloaded by means of an electric motor. When a helical spring is used, it is favorable to shift the stop on a linear path. These constructions are based on the fact that the stop is mechanically arrested. However, it is also possible in a preferred aspect of the invention to arrest the stop only in one direction of coordinate. E.g. a rope or a band, at the end of which a stop is provided, can be used for this purpose. The rope or band is wound or unwound accordingly in dependence on the desired point of support of the stop. The other end of the band is connected to a suitable spring providing the desired controlling force.

It is per se possible that a linear motor exerts a controlling force on the pedal directly, or indirectly by deviation of the force. A provision of this type is suggested hereinbelow was a very simple solution in selecting the electric motor. On the other hand, an inexpensive solution can involve providing a usual electric motor with a rotating rotor and developing the magnitude of the force to be exerted as well as the preferably linear force direction by means of a gear. Appropriate embodiments will be explained in the following.

It has already been explained hereinabove that it can be advisable in an improvement of the invention to fit a gear into the actuator. To this end, the use of a ball-and-thread drive is advisable which is easy-running. When the gear is blocked, attention must be paid that the driver can overrule the threaded spindle. This is done in that the spindle or the nut of the gear is elastically supported or includes an elastic member. Another possibility involves tuning the self-locking mechanism of the gear so that the thread will yield starting from a defined actuating force so that the driver is allowed to overrule and depress the pedal also in this case. This is the normal overruling pedal depression function.

In a favorable improvement of the invention, the spindle of the ball-and-thread drive can act directly on the control element configured as a pedal. In this case, the restoring force and the controlling force preferably act on different points of the pedal lever. A planetary drive can be employed as a gear, for the case that high speed-increasing ratios are necessary.

Instead of elastically supporting one of the elements of the gear to allow the driver to depress the pedal in an overruling fashion, it is also possible to arrange for a special spring that is inserted into the path of force of the controlling force. It has already been explained hereinabove that among certain circumstances the spring ensuring the restoring force can simultaneously take over the function of overruling depression. If this is not possible because the restoring spring cannot be extended further, it is proposed in a favorable aspect of the invention to provide a special spring for the overruling depression function.

Further, the restoring spring can additionally provide the controlling force by being extended by the actuator so far that the restoring force increases abruptly. Thus, the spring can take over all three tasks, when tuned accordingly, i.e. providing the restoring force and the controlling force and assuming the function of overruling depression. However, it is advisable in many cases to use at least one additional spring because different spring constants may then be employed. What is more, the function of the restoring spring shall not be changed in many cases, e.g. when the actuator shall be provided optionally and additionally.

When two or more springs are used, it may be advisable for reasons of space economy to nest them. This is possible also when the springs are connected in series, that is, they are disposed one after the other in terms of effect. Some of the subsequent embodiments show details. It is favorable that the different springs may have a different spring constant.

The above-mentioned clutches may be designed in such a manner that they establish the force connection between electric motor and pedal lever by positive engagement (e.g. by a toothed engagement) or by frictional engagement. In this arrangement the coupling elements may be configured as discs or as rods. To be able to joint the elements for activating the clutch, electromagnets can be used. It is, however, also possible to use the inertia of the elements for the switching operation. This may occur, for example, in that a selector shaft is provided which includes an external thread and is smoothly running in a threaded sleeve, e.g. by means of a ball screw. When an electric motor starts to rotate the threaded sleeve, the selector shaft stands still due to its inertia and moves out of the sleeve, whereby the coupling elements are moved against each other.

The clutch may also comprise a rod equipped with teeth or a frictional surface into which an associated second coupling element is coupled by way of a switching magnet or an eccentric shaft.

It has already been explained hereinabove that it may be especially advisable to insert a linear motor in the actuator. The special advantage is that the linear motor requires neither a gear nor a clutch and, in addition, can act directly on the pedal lever in the form of a linear movement. When the inductor is not energized, it practically does not resist the pedal lever. By means of a simple switching operation causing energization of the inductor, a force can be favorably applied to the pedal lever by way of the reaction bar because no current supply line is required for the moving transmission member (reaction bar) when it is furnished with permanent magnets or composed of a magnetizable material. It is, however, also possible that the reaction bar has a curved design and the inductor is used with a turning lever making catch at the cam plate. Said turning lever can additionally constitute part of the coupling lever transmitting in a per se known fashion the restoring force to the pedal lever, which force is introduced into the cam plate by the restoring spring.

When the reaction bar is used as a transmission member, as described, it can be interposed within the pedal module into the path of force of the restoring spring. This is best done on the path between the restoring spring and the cam plate.

It is aimed at as an improvement of the invention to protect the mechanically and/or electrically sensitive parts against possible contamination by the ambient air. To this end, it is proposed protecting the movable parts that project from the housing of the pedal module and are connected to the pedal lever by means of a cup seal encompassing the parts. On the other hand, care must be taken that it is possible for the pedal lever to move very quickly in relation to the housing of the pedal module, for example, in a panic braking. This renders the space sealed against the environment very quickly narrow, however, whereby considerable pressure is built up that may jeopardize the cup seal. Therefore, it is suggested as an improvement of this embodiment to provide a valve in the housing through which the excess pressure may escape.

It was further explained to provide in the invention a stop and/or counterstop, from which the controlling force of the power source is output or received as soon as the actual speed reaches the range of the nominal speed. A theoretical possibility is to move one of the two stops into a position already when the FFP device is switched on, which position the counter-stop is likely to adopt when the nominal speed is reached. The position of the stop must then be readjusted constantly the nearer the actual speed approaches the nominal speed. It is, however, much easier to move the two stops in relation to each other by a preferably electric or electronic monitoring or controlling in that moment when the actual speed has reached the nominal speed. The advantage especially resides in that it is without doubt at that point of time, which position the counterstop assumes at this speed. It is then only necessary to switch on the power source, and the counterstop will apply its force to the stop at the proper time.

Attention must be paid that the construction features described in the individual embodiment of the invention may be exchanged with comparable features in other embodiments. Further, the invention provides solutions to the set task being characterized by their space-saving design, in particular.

It is also important for the invention that it is not limited to leading a driver to the appropriate or prescribed speed of a vehicle by warning the driver upon application of the accelerator pedal that the necessary speed is exceeded or imparting to the driver the impression that the accelerator pedal has already reached the position the driver desires. Rather, the object of the invention can be favorably implemented also in the actuation of other control elements of the vehicle such as the brake pedal. The additional force resetting the brake pedal cannot only depend on the appropriate actuation of the brake itself (e.g. when starting to drive). Rather, the additional resetting force at the brake pedal (or also at the accelerator pedal) can also be controlled by driving-dynamics parameters such as ESP, if a driver wishes to brake too vigorously or to ride too rapidly into a curve. The design of the devices of the invention becomes particularly simple when the braking operation or the change in speed is not introduced directly into the pedal, but when the pedal position is scanned by means of sensors, as is the case e.g. in an electromechanically or electrohydraulically operating brake system.

The arrangement made in the embodiments is, however, also extremely appropriate to induce the driver to operate the accelerator pedal in an optimum manner. If e.g. a driver in its vehicle tends to step on the gas too heavily in a difficult situation by applying the accelerator pedal with an excessive force, electronic control renders it possible to combine the application of the accelerator pedal with a hindering or even restoring force in dependence on the dynamic vehicle parameters so that the impression is imparted to the driver that the accelerator pedal has already adopted the position that corresponds to his/her request (jeopardizing the vehicle). A dangerous application of the brake pedal can be eliminated in a similar fashion. It is this way possible to make the driver adopt a disciplined style of driving. The hindering force in applying the pedal or the force counteracting the pedal force of the driver is regularly brought about by the power of an electric motor. To produce a corresponding magnetic field, in turn, a correspondingly high amount of current is sent to an appropriate motor-coil. This action is triggered by the output signal of a control system actuated by parameters indicative of the vehicle dynamics. The output signal of the control system can also be triggered by signals input from the outside, for example, by an arrangement arranged in connection with a speed limitation at a route.

BRIEF DESCRIPTION OF THE DRAWINGS

FIG. 8a to FIG. 8f show an eighth embodiment with modifications.

FIG. 24a to FIG. 24e shows a twenty-fourth embodiment.

FIG. 27a and FIG. 27b shows a twenty-seventh embodiment.

DETAILED DESCRIPTION OF THE PREFERRED EMBODIMENTS

Figure 1:
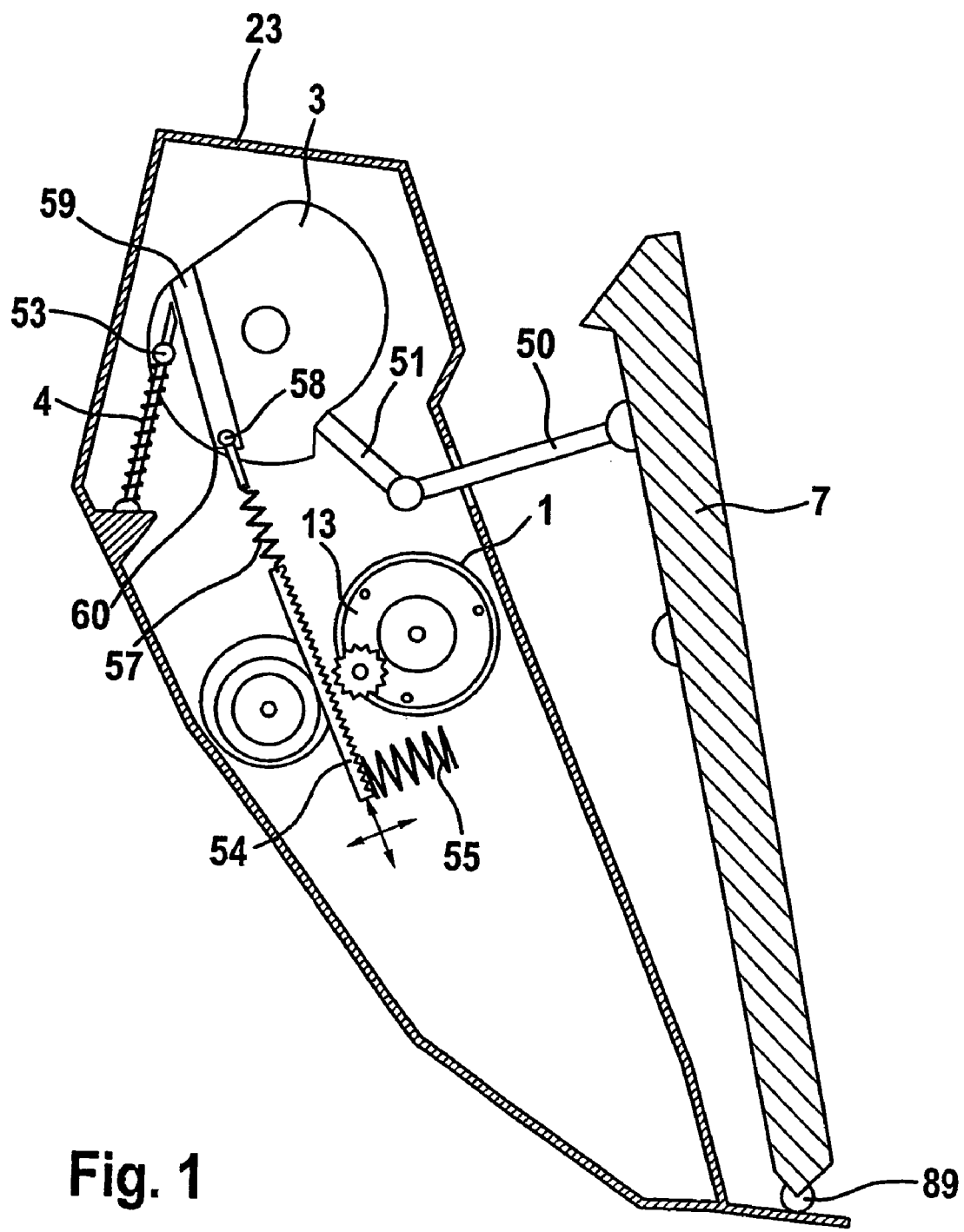
FIG. 1 shows a first embodiment.

The individual embodiments will be described so that initially existing proposed solutions are discussed, and thereafter the improved features of the respective embodiment are explained. Finally, the advantages achieved with the respective embodiment are explained, then the basic advantage of the respective embodiment is indicated and possible modifications are explained in the embodiment. Parts identical to each other have been assigned like reference numerals in the single embodiments. Thus, insofar as a reference numeral is not explained separately in an individual embodiment, the statements made with respect to this reference numeral in other embodiments can be used accordingly.

Embodiment 1 According to FIG. 1

A fixed or a displaceable stop is used in some of the embodiments suggested herein below. Depending on the position of the stop, the engine torque acts in a defined pedal position in opposition to the pedal force or with respect to the stop. It is not only necessary to adapt the position of the stop to the desired driving speed but also to the driving situation. The stop is an adjustable rope slack in another solution. Different therefrom, the following function without a stop is proposed in the embodiment 1.

In FIG. 1 a pedal board 7 is articulated at a housing 23 of a pedal module. A cam plate 3 is rotatably arranged in housing 23. A coupling lever 50 cooperating with a turning lever 51 fixed to the cam plate makes catch at the pedal lever 7 configured as a board. It can be seen that the cam plate 3 is turned clockwise upon a counterclockwise rotation of the pedal lever 7. A restoring spring 4 which is referred to as return spring or retracting spring and generates a restoring force makes catch at an attachment point 53 on the cam plate 3. In a manner not described in detail, the quantity of gas made available to the engine is regulated by means of turning the cam plate 3, and counterclockwise displacement of the pedal lever 7 increases the quantity of gas. When the force exerted to the pedal lever 7 is reduced, the restoring spring 4 is able to expand and thereby shift back the pedal lever 7.

Based on this per se known construction, the design of the invention as illustrated in FIG. 1 will ensure now that when the actual speed value exceeds the nominal speed value, an electric motor 1 with a gear 13 connected thereto will apply a controlling force to the pedal lever 7 that is added to the restoring force of the restoring spring 4.

In the initial condition, there is no operative connection between the motor-and-gear unit 1, 13 and a retracting rod 54 which is urged by a hold-back spring 55 in FIG. 1 to the left out of engagement with the motor-gear unit 55. When the Force-Feedback-Function is connected to produce the controlling force, the retracting rod 54 is urged in the direction of the motor-and-gear unit by way of an actor (not shown) with the connected eccentric 56, and the operative connection (e.g. frictional engagement or form lock) is established between the retracting rod and the motor-and-gear unit. The cam plate 3 is now retracted in a downward direction by the motor-and-gear unit in FIG. 1, and the pedal force is increased thereby. To overrule the system in the event of failure of the motor-and-gear unit or the actor, the connection between the retracting rod and the cam plate is established by way of a withdrawing spring 57. 'Overruling depression' means the following. It is rendered possible to the driver to depress the pedal lever 7 deeper counterclockwise in opposition to the force exerted by the retracting rod 54. To this end, the withdrawing spring 57 is interposed between the cam plate 3 and the retracting rod 54. The suspension of the retracting rod can give way in an upward direction within the cam plate so that a sudden acceleration due to a malfunction in the Force-Feedback unit (e.g. by a wrong direction of rotation of the motor) is avoided. To this end the suspension 58 is guided in a groove 59 in such a fashion that it can make catch at a wall 60 of the groove 59 and, by applying tensile forces, rotate the cam plate 3 counterclockwise. Pressure forces cannot be transmitted because the suspension 59 can give way within groove 60 in an upward direction. Instead of the groove shown in the drawings, the connection between the cam plate and the retracting rod can also be constituted by way of a rope. It is merely necessary to ensure that the force transmission is allowed in one direction only.

As is illustrated in FIG. 1, the connection between the retracting rod 54 and the motor-and-gear unit 1, 13 can be established by form lock and frictional engagement also. To have a higher engine torque directly available when the Force-Feedback-Function is connected, the motor will initially operate in opposition to a blocked gear (not shown). Displacing the retracting rod to the right in a downward direction will also release the blocked condition of the gear (not shown), and the overall motor torque is instantly available for the Force-Feedback-Function.

Advantages

It is only needed to switch the motor on or off. No position detection for the motor is required. The motor must only be able to turn in one direction. No reversing operation is necessary. The parts can be made of plastics. The system does not have to be set to different load conditions. There is considerably less controlling effort compared to prior-art solutions.

It is especially important for the present embodiment that position detection is not necessary for the motor.

Figure 2B:
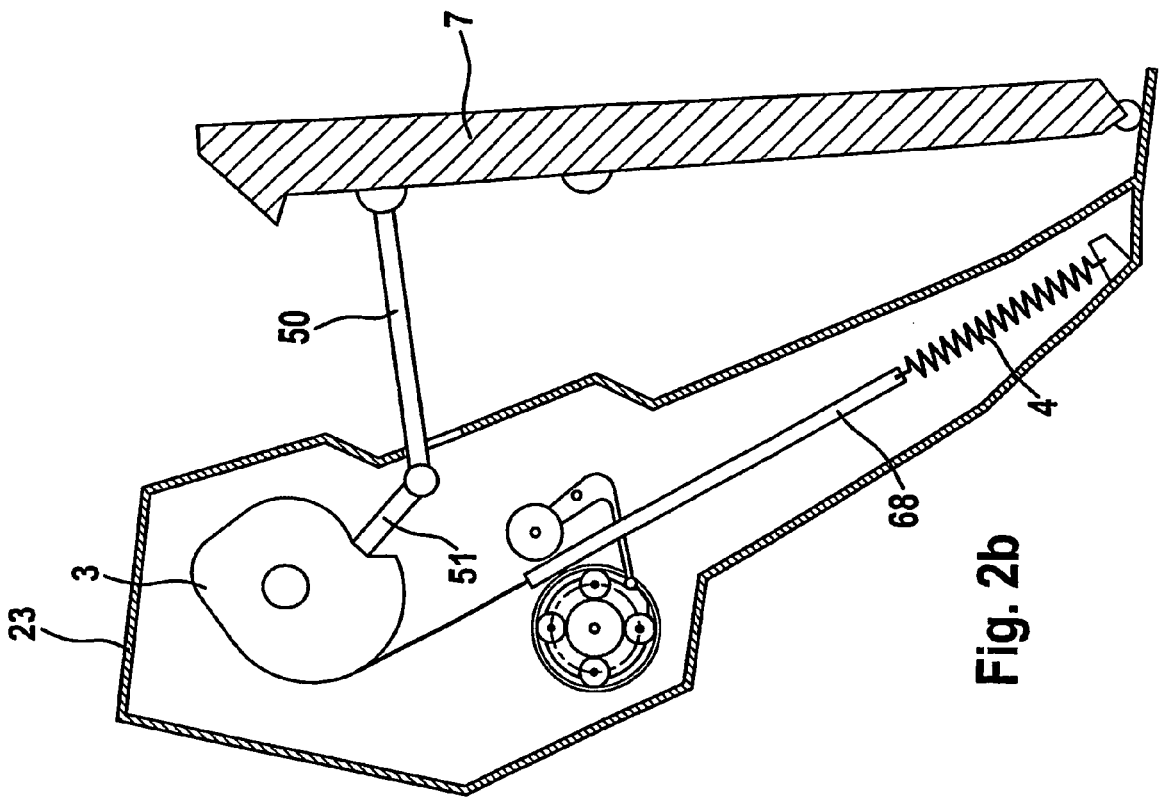
FIG. 2a and FIG. 2b show a second embodiment.
Figure 2A:
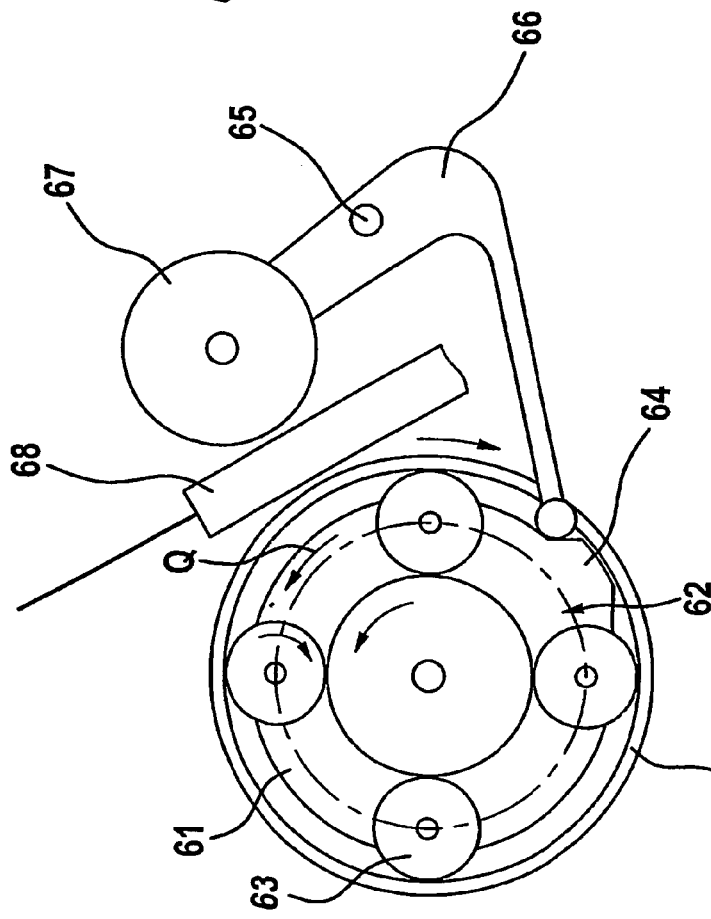

Embodiment 2 According to FIG. 2a and FIG. 2b

A fixed or a displaceable stop is used in some of the embodiments that will be suggested hereinbelow. Depending on the position of the stop, the motor torque acts in opposition to the pedal force or with respect to the stop in a defined pedal position. It is not only necessary to conform the position of the stop to the desired driving speed but also to the driving situation. In another solution, the stop is realized by an adjustable slack of rope. Different herefrom, the following function that does not provide for a stop is suggested in the embodiment 2.

The basic design of the embodiment shown in FIG. 2 again corresponds largely to the design according to FIG. 1 and shall not be explained more closely. When the motor (not shown in FIG. 2) is started in the embodiment of FIG. 2, a planet carrier 61 of the planetary gearing illustrated in FIG. 2a will turn in the plotted direction Q. The result is that the pressing roller 67 is urged against the frictional shaft or the friction member 68 by way of the control cam 64 connected to the carrier 61 of the planet wheels 63 and the thus actuated switching lever 66 rotatable about the fulcrum 65, with the friction shaft or friction member being thereby urged against the ring gear 69 of the planetary gearing 62. The planet carrier 61 is blocked thereby, and the speed-increasing ratio in the planetary gearing 62 now passes from the motor to the ring gear, by way of which a brake torque is transmitted to the friction shaft (or friction member) and, thus, the necessary pedal-actuating force is increased.

To prevent the ring gear from co-rotating from the very beginning, it is necessary to arrange for a corresponding device ensuring that the starting resistance of the hollow shaft exceeds the planetary gearing.

The brake torque can be transmitted from the ring gear to the friction shaft either by way of frictional connection, as illustrated herein, or form lock. The connection of the friction member 68 to the cam plate can be effected by means of the measures described with respect to FIG. 1. When the motor is switched off again, the planet carrier must be reset to its initial position by way of a resetting mechanism, e.g. a restoring spring at the gearshift lever.

In a modification of the embodiment shown in FIG. 2, the force can be transmitted between ring gear 69 and friction shaft or square friction member 68 either by way of frictional connection or form lock. The following statement is especially important for the Force-Feedback-Function: In order to enable the Force-Feedback-Function, it is only necessary to switch on the motor. When the motor is switched off again or fails, the Force-Feedback-Function is disabled again, and the normal pedal feeling prevails.

Advantages of the Embodiment 2

It is only needed to switch the motor on or off.
No position detection for the motor is required.
The motor must only be able to turn in one direction.
No reversing operation is necessary.
Small assembly dimensions.
Planetary gearings have a good acoustics performance.
The parts can be made of plastics.
The system does not have to be set to different load conditions.
There is considerably less controlling effort compared to prior-art solutions.
If the motor fails, the Force-Feedback unit will automatically disconnect, and the normal pedal feeling prevails.

Figure 3A:
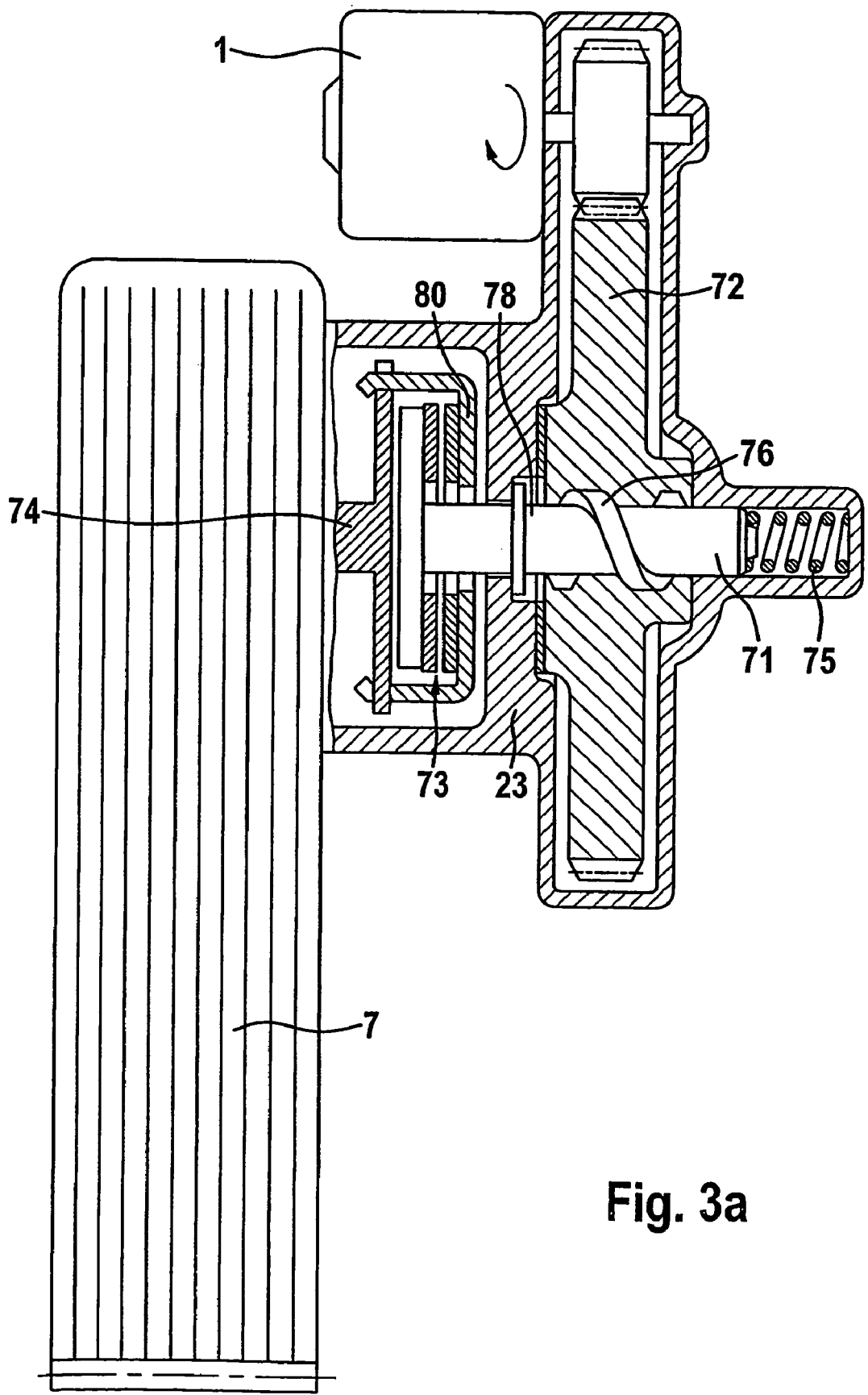
FIG. 3a and FIG. 3b and FIG. 3c show a third embodiment with modifications.
Figure 3B:
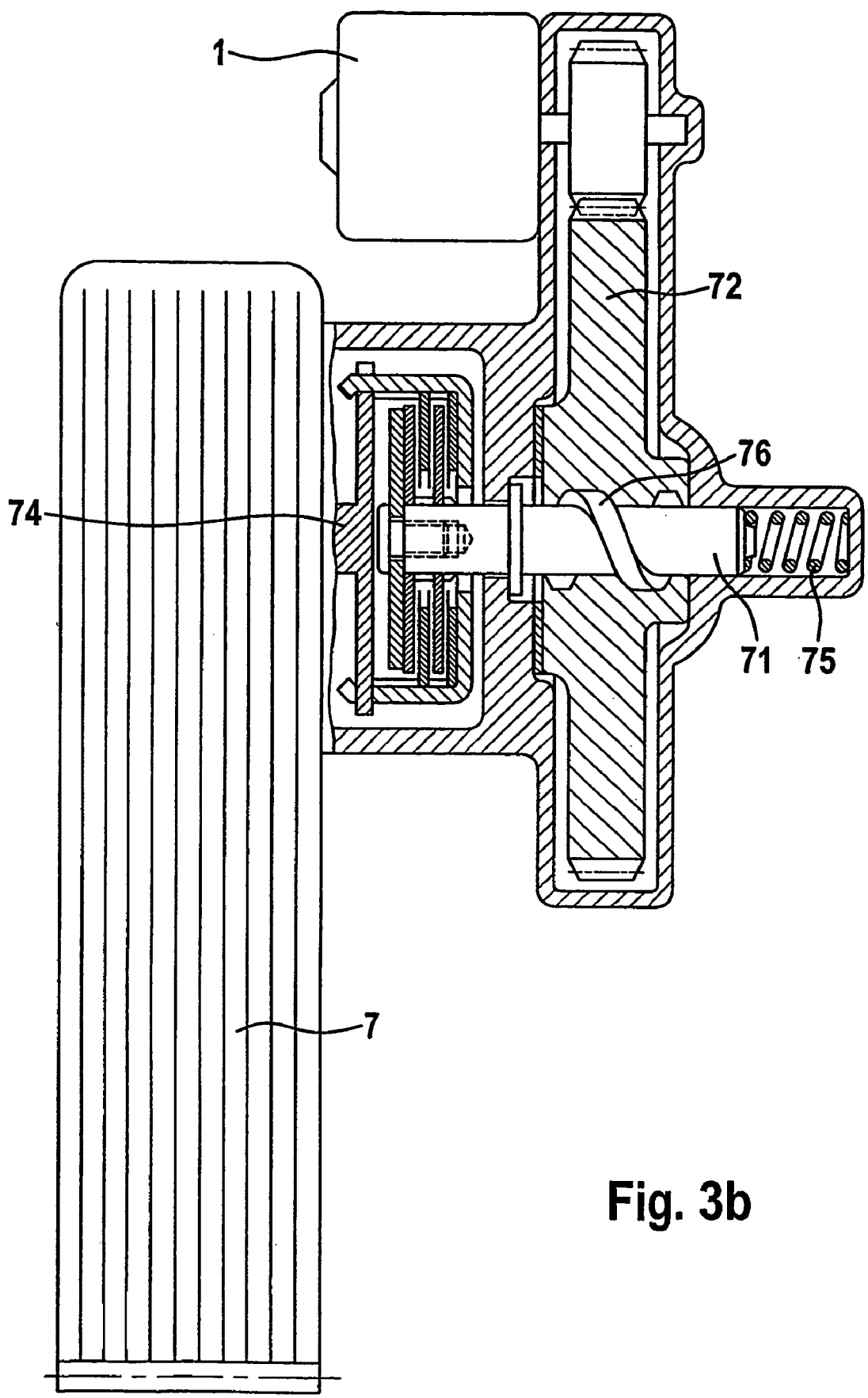
Figure 3C:
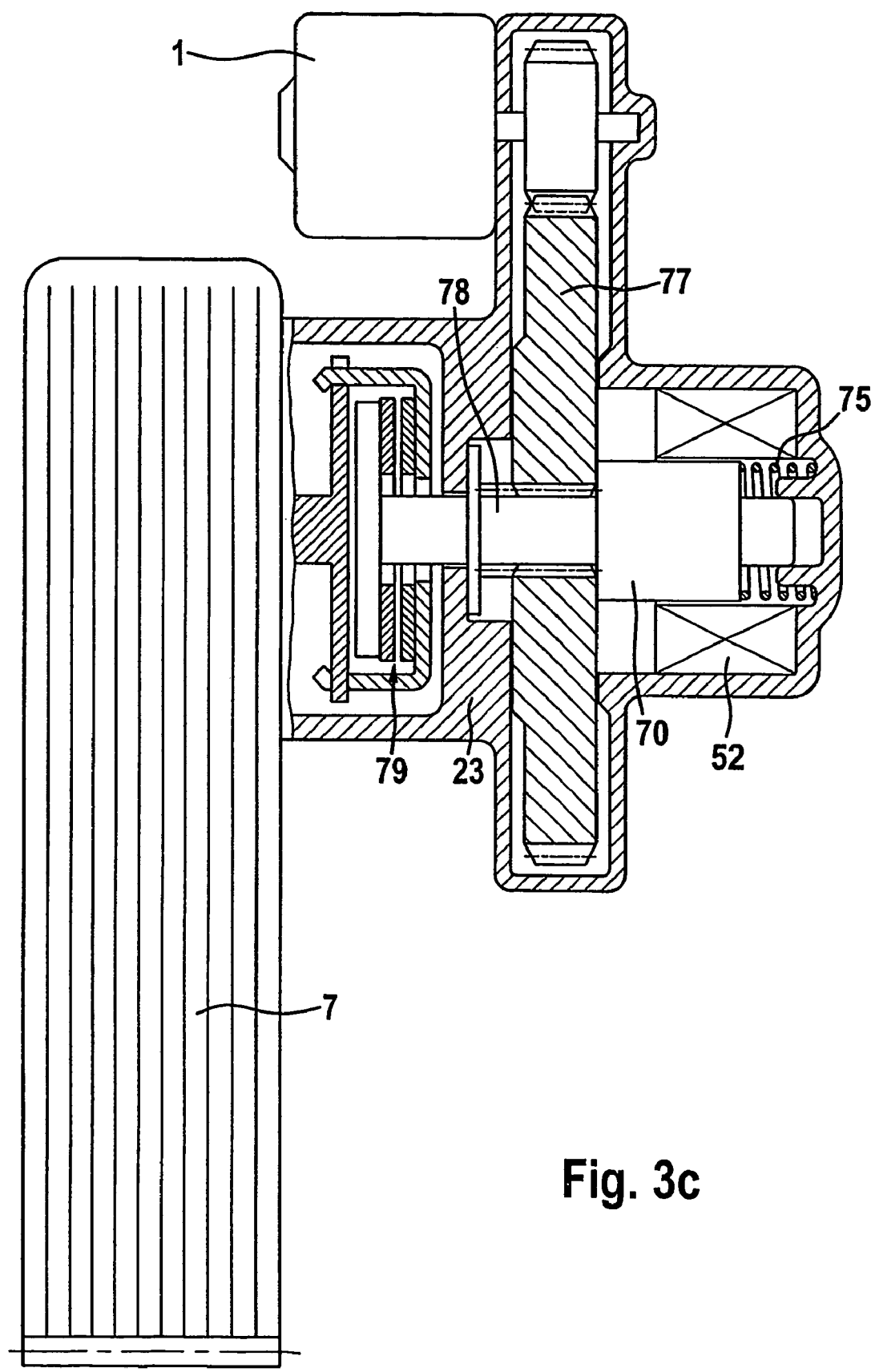

Embodiment 3 According to FIG. 3a to FIG. 3c

The Force-Feedback unit (hereinbelow called FFE) shown in the drawings (see especially FIG. 3a) is connected to the accelerator pedal 7 at the point where the translation motion of the pedal or the pedal linkage (e.g. the coupling lever 50 in FIG. 2) is converted into a rotation. This point may e.g. be the axis of rotation of the pedal lever 7 or the axis of rotation of the cam plate 3 (cf. FIG. 1). Normally, it is the point where likewise the sensor for determining the angle of rotation is connected.

The sketches are only meant to illustrate the mode of operation, in all other respects the mechanics shown in FIGS. 3a to 3c is preferably integrated into the pedal module, and a housing 23 generally bounds the pedal module. The pedal module typically accommodates the restoring spring that resets the pedal 7 as a standard, a cam plate deviating the force of the restoring spring, and a coupling lever that transmits the force of the restoring spring to the pedal.

In the present principle, the inertia and the friction of the clutch shaft 71 is used in such a fashion that a motor 1 with a speed-increasing gear acts on a thread wheel 72 and thus triggers an axial movement of the clutch shaft 71. It is brought about by the inertia and the negligible friction that the clutch shaft 71 will not instantaneously co-rotate with the toothed wheel but is turned out a distance (to the right in the drawing) by a rotation of the thread 76 relative to the toothed wheel 72.

This axial movement is used for coupling the output shaft 74 resetting the accelerator pedal, if necessary, counteracting the actuating force of the driver. The clutch 73 connects the two shafts in frictional or form-locking engagement and may also have a multi-lamella design (see FIG. 3b). A spring element 75 resets the clutch shaft 71 into the initial position.

When the motor 1 starts to operate, the toothed wheel 72 commences a rotation with respect to shaft 71, by which the shaft 71 due to its inertia is displaced by way of thread 76 in FIG. 3a to the right against the claw 80 of the driving shaft 74 and coupled to it. As now the shaft 71 is no longer able to evade to the right, the torque of the toothed wheel 72 is transmitted by way of thread 76 to shaft 71 and thus to the driving shaft 74. The operational connection in the clutch is additionally maintained by this transmission of the torque.

The difference of the embodiment of FIG. 3b over FIG. 3a basically involves that the clutch 73 is provided with several lamellas.

In FIG. 3a, the shaft 71 is displaced axially by means of an electromagnet 52, 70. Housing 23 accommodates windings 52, which can be connected to a current source (not shown) and act on a magnetizable portion 70 of shaft 71. Preferably, shaft 71 is mounted axially slidably yet unrotatably with respect to the toothed wheel 72 for this purpose. This design is more secure than the design according to FIG. 3a and FIG. 3b inasmuch as it need not be safeguarded that the shaft 71 due to its inertia will move in an axial direction when the toothed wheel 72 starts to move. However, it is also possible to combine both systems so that the magnet 52, 70 is used quasi as a starting aid, with a view to preventing that the clutch according to FIGS. 3a and 3b is omitted due to losses caused by friction, because the toothed wheel entrains the shaft 71 instantaneously. When the clutch has been engaged, it can be held automatically by means of thread 76 (not shown in FIG. 3c) as described with respect to FIGS. 3a and 3b, without requiring further energization of the magnet. Instead of magnet 52, 70, a second motor driving unit for the torque control is also possible.

It is also ensured in the embodiment of FIG. 3a, 3b that the pedal 7 can be depressed in an overruling fashion. This means that the pedal can be depressed deeper in opposition to the restoring (additional) controlling force, in order to increase the speed. This is because if the actuating force applied by the driver exceeds the restoring force by way of shaft 71, shaft 71 is turned with respect to toothed wheel 72 contrary to the direction of drive in such a way that it is displaced axially to the left in FIG. 3, thereby releasing clutch 73.

Advantages of the Embodiment According to FIGS. 3a, 3b and 3c

It is only needed to switch the motor on or off, and the motor can transmit different torques.

No position detection for the motor is required because the motor can be coupled to the pedal by way of the clutch in every position of rotation.

The motor must only be able to turn in one direction.

No reversing operation is necessary. The system is safe because the clutch is disengaged if the motor rotates in the wrong direction or the motor and/or the gear unit blocks.

Small assembly dimensions.

The parts can be made of plastics.

The system does not have to be set to different load conditions. There is considerably less controlling effort compared to prior-art solutions.

If the motor or a gear range fails, the Force-Feedback unit will automatically disconnect, and the normal pedal feeling prevails.

Pedal resetting forces are variable because the motor output can be controlled. It is especially important for the embodiment according to FIG. 3 to co-use the rotational energy and convert it into translation energy for torque transmission. To activate the Force-Feedback-Function, it is only necessary to switch on the motor. When the motor is switched off again or fails, the Force-Feedback-Function is also disabled again, and the normal pedal feeling prevails.

Figure 4A:
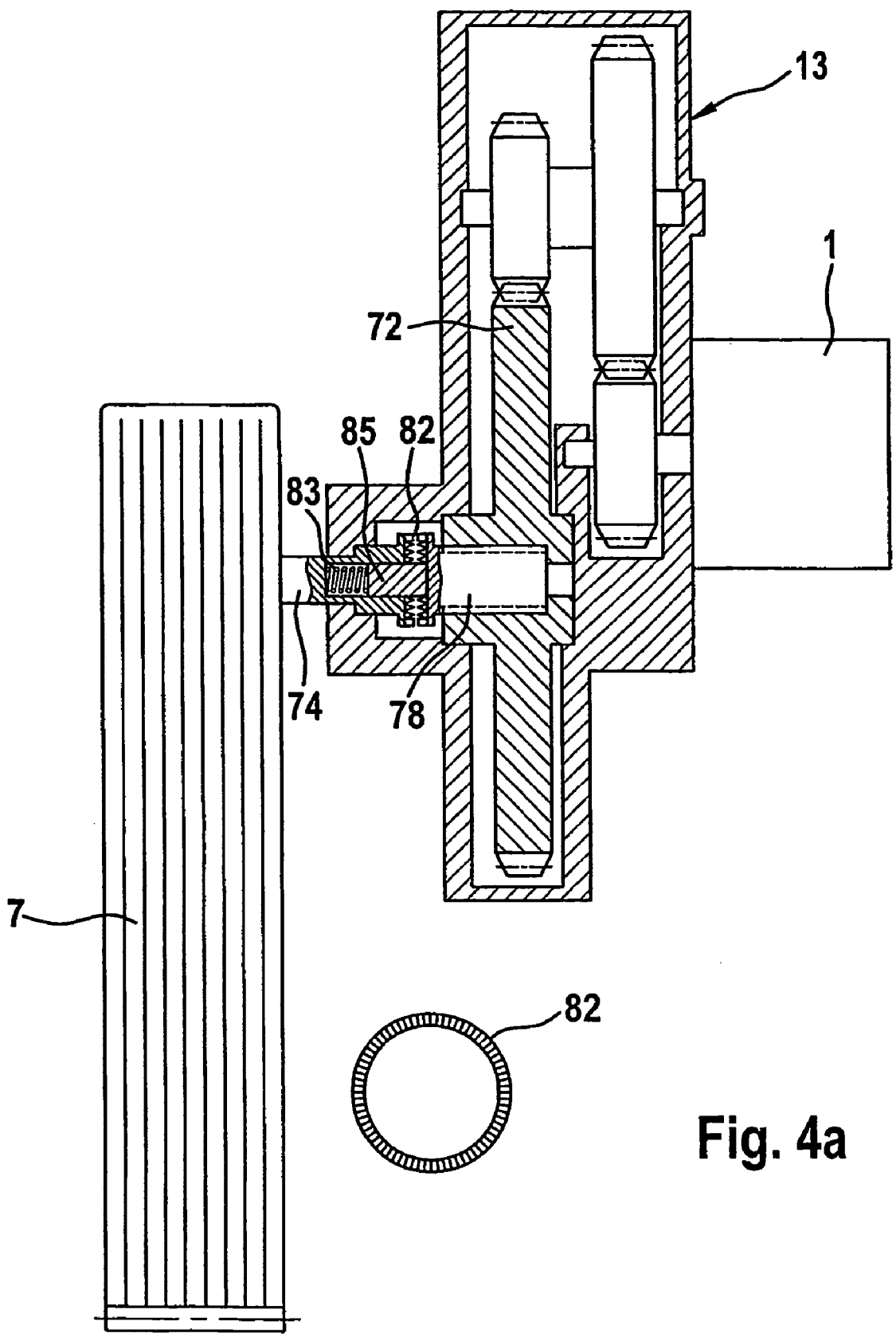
FIG. 4a and FIG. 4b show a fourth embodiment with modification.
Figure 4B:
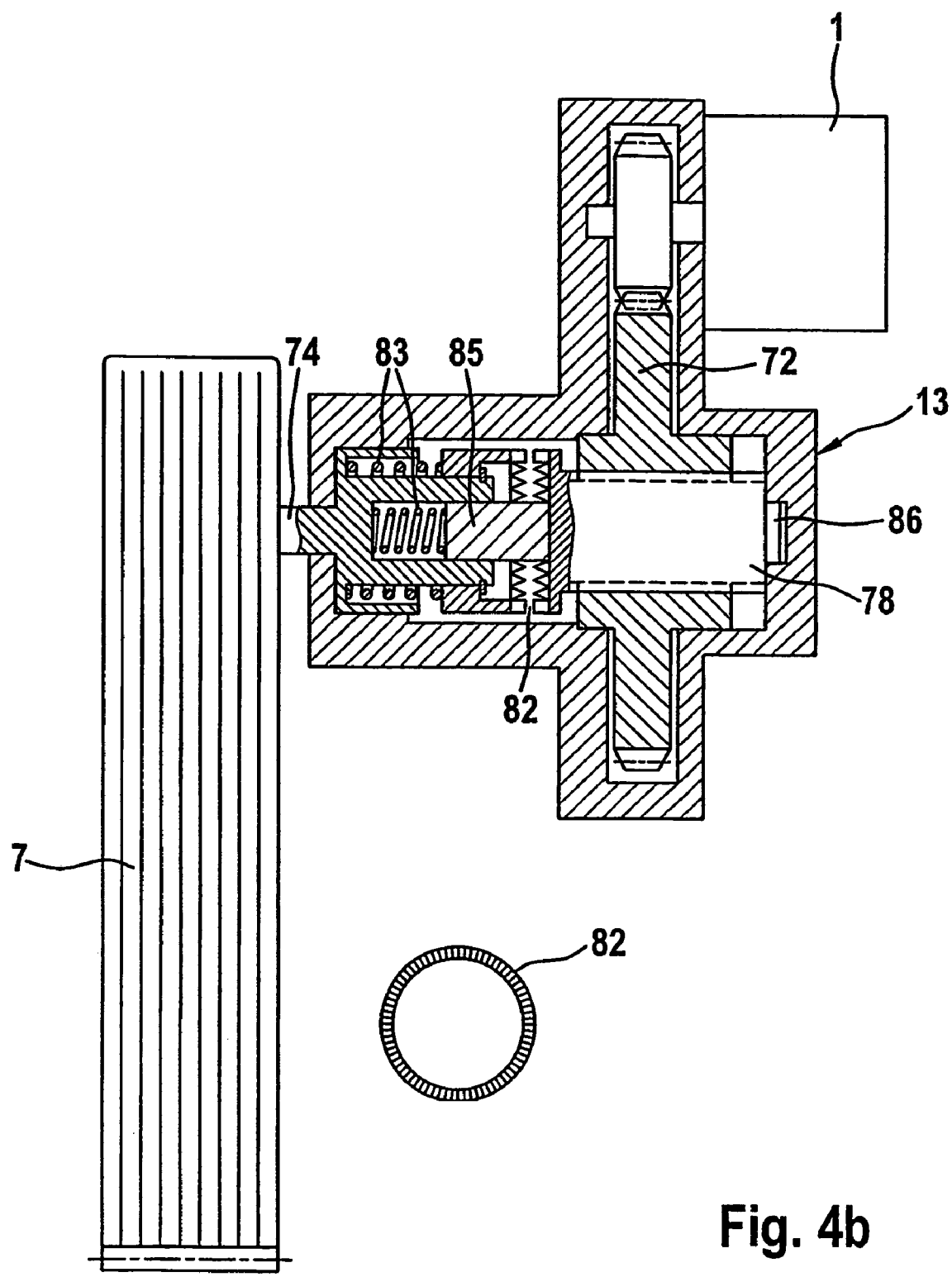

Embodiment 4 According to FIG. 4*a* and FIG. 4*b*

The Force-Feedback unit (hereinbelow named FFE) illustrated in FIG. 4*a* is connected to the accelerator pedal at the point where the translation motion of the pedal 7 or the pedal linkage is converted into a rotation. Normally, it is the point where likewise the sensor for determining the angle of rotation is connected. In the initial position, the motor 1 stands still and, hence, also the gear 13 connected downstream of the motor. The restoring piston 85 may glide with its end surface on the control shaft 78 so that it is not possible to transmit through it a sufficient torque from the pedal module by way of the connecting shaft into the control shaft, the latter shaft causing rotation of the gear unit and the motor of the FFE.

The purpose of the restoring piston 85 is to push the control shaft 78 onto the right-hand end stop by means of the restoring spring 83, when the motor 1 is switched off. It is thereby ensured that the crown gears 82 of connecting shaft 74 and control shaft 78 are not in engagement when the motor is switched off. It is desired in this arrangement that the clearance is kept as small as possible. The spring 83 may, however, also act directly on the control shaft 78.

When now the Force-Feedback-Function shall be enabled, the motor must start. Due to the mass inertia of the control shaft and, above all, on account of the remnant friction between the restoring piston and the control shaft, the control shaft is turned out a short distance in the direction of the connection shaft 74 by way of the rot-trans gear (e.g. screw drive—see embodiment 3, recirculating ball screw) before it would co-rotate with the toothed wheel. This slight translation motion of the control shaft is sufficient in order that the crown gears 82 of the connecting shaft and the control shaft move into engagement with each other and, thus, the control shaft is turned out still further until the crown gears are in full engagement. The torque of the motor and the gear connected after it is now transmitted by way of the crown gears into the connecting shaft and, thus, into the accelerator pedal. The Force-Feedback-Function is switched on. For the torque-resistant connection between control shaft and connecting shaft, other form-lock connections or even a frictional connection (see also embodiments 1 and 3) are feasible apart from the solution with the crown gears.

When the motor is switched off again, the restoring spring will push the control shaft by way of the restoring piston (or directly) back until the stop. As a result, the connecting shaft is uncoupled again from the rest of the FFE. The same mechanism acts when the motor or a gear range gets stuck. In the case that the rot-trans gear is seized or if the pedal 7 shall be depressed further down in an overruling manner, the following gear and motor must be entrained upon application of the accelerator pedal.

The following actions happen in detail. In the initial condition, the gear coupling 82 is open, that means the teeth of the coupling are not in mesh. The shaft 78 in FIG. 4*a* is kept to the right on a stop caused by the force of spring 83 by way of a restoring piston 85. When the electric motor 1 starts to operate, the gear 13 with its toothed wheels will set the threaded wheel 72 to rotate. As described in connection with the embodiment 3, the externally threaded control shaft 78 is turned out to the left by start of the thread wheel 73 in FIG. 4*a* until engagement of the teeth of the gear coupling 82. This way, the driving shaft 74 fixes the control shaft 78 in position so that the force of inertia of the control shaft 78 is no more required for moving the control shaft still further outwards. Finally, the gear coupling 82 is on its stop, and the force of the motor 1 is transmitted onto a mechanism (not shown) resetting the pedal lever 7. When the motor 1 is disabled, e.g. because the actual speed has been reduced to the nominal speed, the spring 83 will urge the control shaft 78 into the initial position by way of the restoring piston 85.

The gear ranges illustrated in the drawings are only used to illustrate the mode of operation. The motor could also be connected directly to the point of the toothed wheel 72 (see embodiment 4*b*). It is irrespective for the functioning which gear is interposed between the motor and the free-wheeling mechanism.

An alternative possible solution with respect to the embodiment of FIG. 4*a* shows the variant of FIG. 4*b*. In order to minimize the friction between the restoring piston and the control shaft to the greatest extent possible and to avoid co-rotation of the control shaft upon start of the motor in any case, there is provision of an additional torque-resistant mounting support for the control shaft 78 in the housing (frictional connection or form lock). It must be ensured in any case that the control shaft is always able to snap into the mounting support. This means that the mounting support 86 has such a design that the control shaft 78 is axially displaceable but not rotatable with respect to the housing of the gear 13. The control shaft can only be rotated after it has left the mounting support 86.

When the motor is started, co-rotation of the control shaft is initially prevented by the torque-resistant mounting support, and the control shaft is shifted out in the direction of the switching sleeve or gear coupling 82. As in the embodiment of FIG. 4*a*, this produces again a torque-resistant connection between the control shaft and the connecting shaft. To be able to compensate possible tolerances, the control shaft is additionally supported on the torque-resistant mounting support for a short transition. As the switching sleeve, which is torque-resistantly connected to the connecting shaft, can evade to the left in the Figure, the control shaft 78 is turned out still further and, at the end, is supposed to be no longer engaged with the torque-resistant mounting support 86. The engine torque is transmitted from the control shaft through the switching sleeve into the connecting shaft and, hence, into the pedal module. The disabling of the Force-Feedback-Function and the failure behavior corresponds to the embodiment of FIG. 4*a*.

Advantages

It is only needed to switch the motor on or off.
No position detection for the motor is required.
The motor must only be able to turn in one direction.
No reversing operation is necessary.
Small assembly dimensions.
The parts can be made of plastics.

The system does not have to be set to different load conditions. There is considerably less controlling effort compared to prior-art solutions.

If the motor or a gear range fails, the Force-Feedback unit will automatically disconnect, and the normal pedal feeling prevails.

The following is especially important for the embodiment according to FIG. 4:

To activate the Force-Feedback-Function, it is only necessary to switch on the motor. When the motor is switched off again or fails, the Force-Feedback-Function is also disabled again, and the normal pedal feeling prevails.

Instead of the crown gears used in the embodiment of FIG. 4, other form-locking or frictional connections may also be used. A positive or frictional connection can be used also for the torque-resistant mounting support. The gear ranges illustrated in the drawings may be replaced by any other type of gears and are not decisive for the functioning of the torque-controlled free-wheel mechanism.

Embodiment 5 According to FIG. 5a to FIG. 5f

Figure 5A:
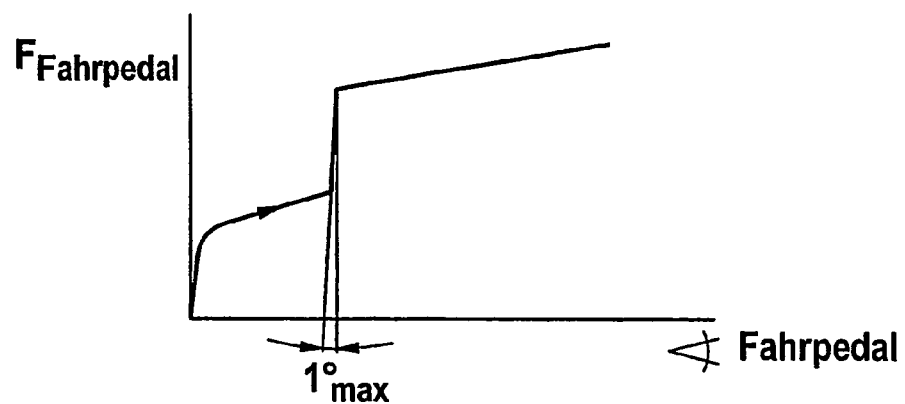
FIG. 5a to FIG. 5f show a fifth embodiment.

Under certain circumstances, it is especially important for the FFP function that a system strength imperative for a comfortable function can be appropriately realized. The characteristic curve according to FIG. 5a shows a course of the pedal force demanded in practice as a function of the setting angle of the pedal (see also FIG. 8b). In a defined angular position of the pedal lever 7, a much higher amount of force is required at the pedal for further displacing the pedal over only a small angle (e.g. one degree). This jerk is necessary to indicate to the driver that the adjusted nominal speed has been exceeded to an appropriate extent.

Figure 5B:
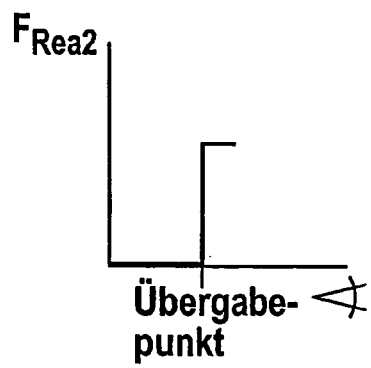
Figure 5C:
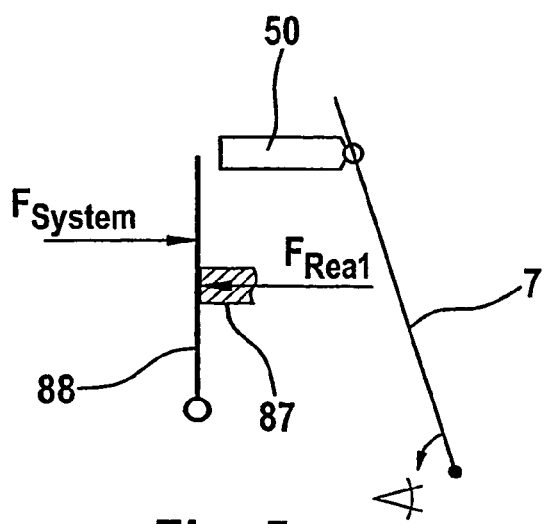
Figure 5D:
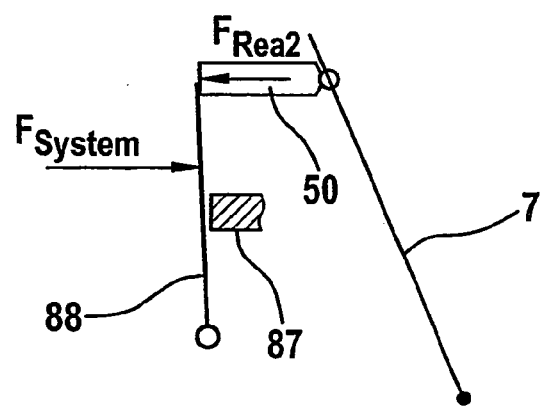

FIG. 5c shows how the counterforce F_System acts on a stop 87 fixed with regard to the vehicle, said stop discharging a counterforce F_rea into the housing that is increased by the lever transmission. The sketch of FIG. 5d shows how the coupling rod 50 being rigidly connected to the pedal takes up the force F_System, with the transmission lever 88 lifting from the stop.

Figure 5E:
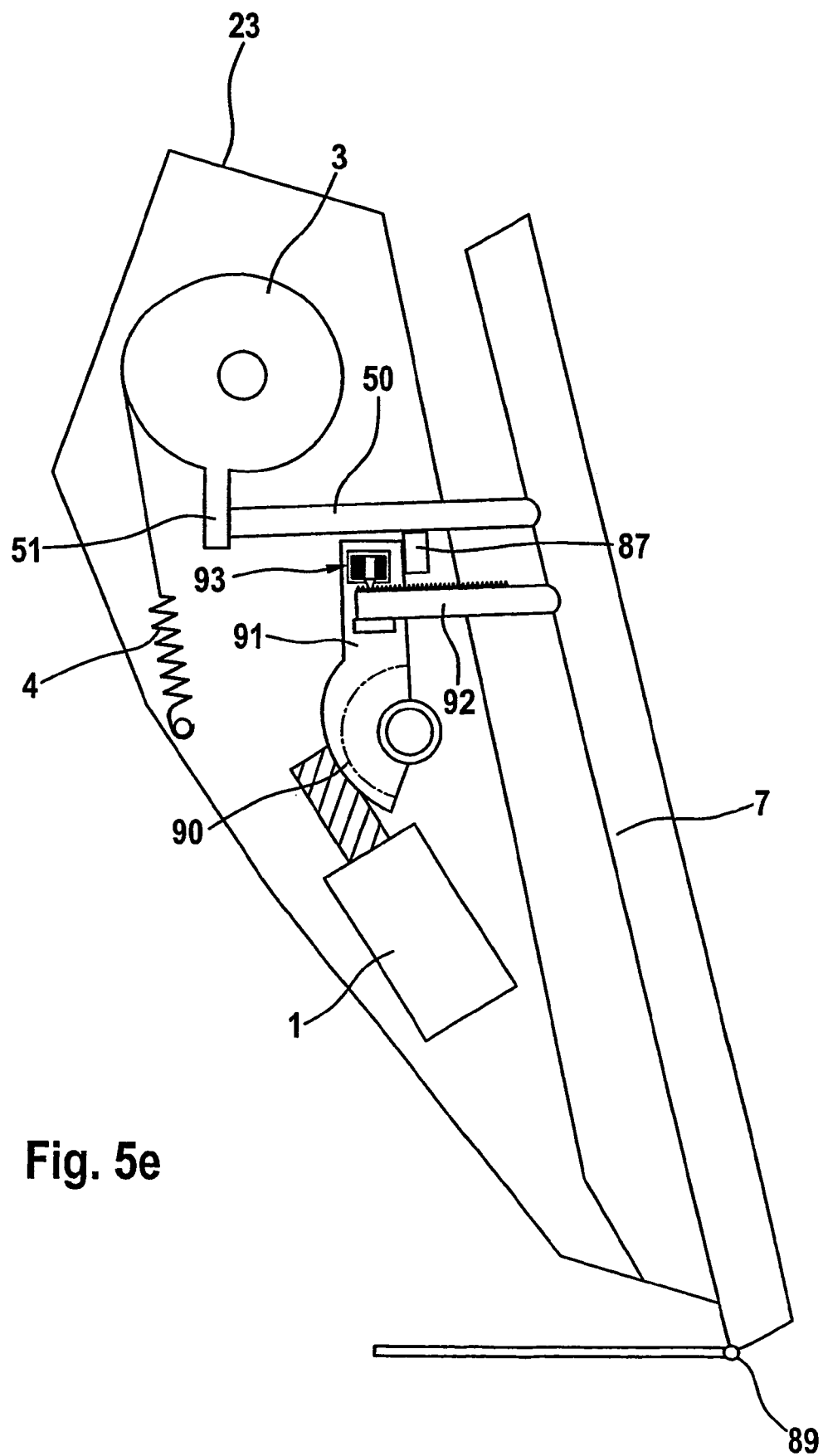

The embodiment of FIG. 5a suggests introducing a mechanical stop that is immovable in relation to the vehicle body. The design of the pedal module shown in FIG. 5e is largely identical to the module illustrated in FIG. 1 so that details will not be repeated. The description of the basic components of a pedal module referred to herein are also applicable to FIG. 5e. The corresponding reference numerals of FIG. 1 have been similarly applied in FIG. 5e so that the description of FIG. 1 may also be read with respect to FIG. 5e.

In the following, the pedal module of FIG. 5e is described insofar as an embodiment for the device of the invention is concerned.

A motor 1 drives a turning lever 91 by way of a worm gear 90, the lever being thus pressed with its end against the stop 87 by means of a predetermined force. Thus, the force exerted by the motor is taken up by stop 87 and discharged into housing 23. As this occurs, there is no need to constantly drive the motor. It is sufficient for the motor to start operating only when the cruise control is activated or is activated only when a foot approaches the accelerator pedal during activation of the cruise control. It is also possible that the motor is switched on only shortly before the actual speed reaches the nominal speed. A coupling rod 92 in FIG. 5e is moved to the left due to the tilting movement of the pedal 7 about the axis 89. At that moment or at the angular position of the pedal, where the counterforce acting against the leg force shall be generated, a clutch 93 is engaged which connects the turning lever 91 to the coupling rod 92. Subsequently, the counterforce generated by the system or motor 1 will abruptly counteract the actuating force applied to the pedal (see FIG. 5b to FIG. 5d). This safeguards a major jerk of force at the pedal, as demanded.

A possible embodiment is illustrated as explained in FIG. 5e. For the reliable functioning preventing that the pedal gets stuck in the normal function or the throttle valve or injection pump stays open, an uncoupled actuating rod 92 is proposed for the FF function. The clutch determines the point of force application A, while motor and gear D are responsible only for the control of the variation of forces.

Figure 5F:
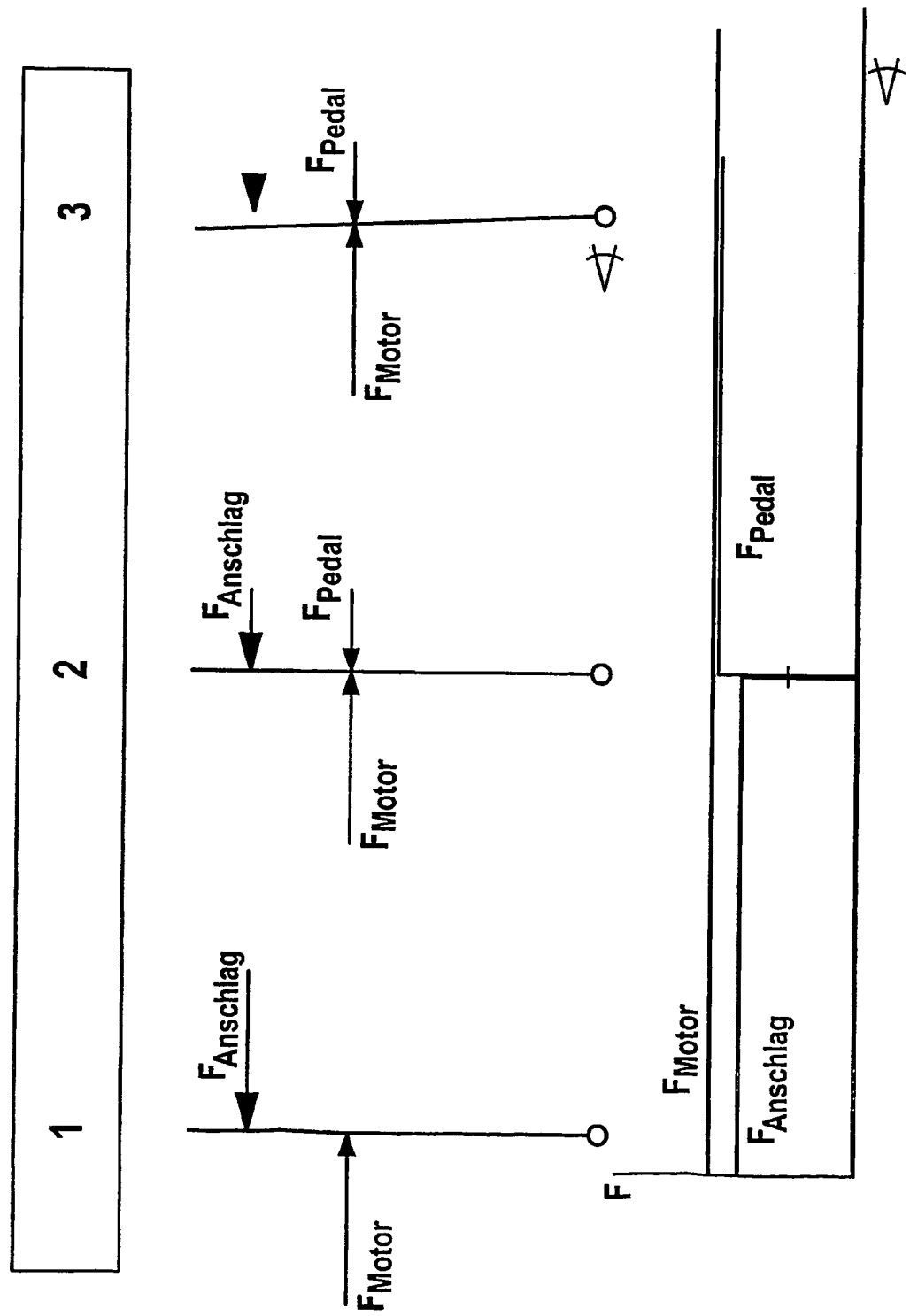

The correlations explained in FIGS. 5b to 5d are illustrated once again in FIG. 5f in a slightly different form. During the condition 1 shown above in the Figure, the abutment of the turning lever is taken up by a stop by means of the force F_motor so that the two forces applied to the turning lever are in balance. Due to the lever effect, F-Motor is somewhat higher than F_stop, as is shown in the dependencies of the forces on the angle or rotation of the pedal at the bottom of the Figure. During condition 2 the force F_pedal will rise to such an extent that it is roughly in balance with the force F_motor. The two curves F_motor and F-pedal will hence coincide roughly. When subsequently the force F_pedal will slightly exceed F_motor, the turning lever 91 will lift from the stop and thus move away from it (condition 3). It therefore shows that the pedal force is additionally required to abruptly act against the motor force F_motor in the transition from condition 2 to condition 3.

Figure 6:
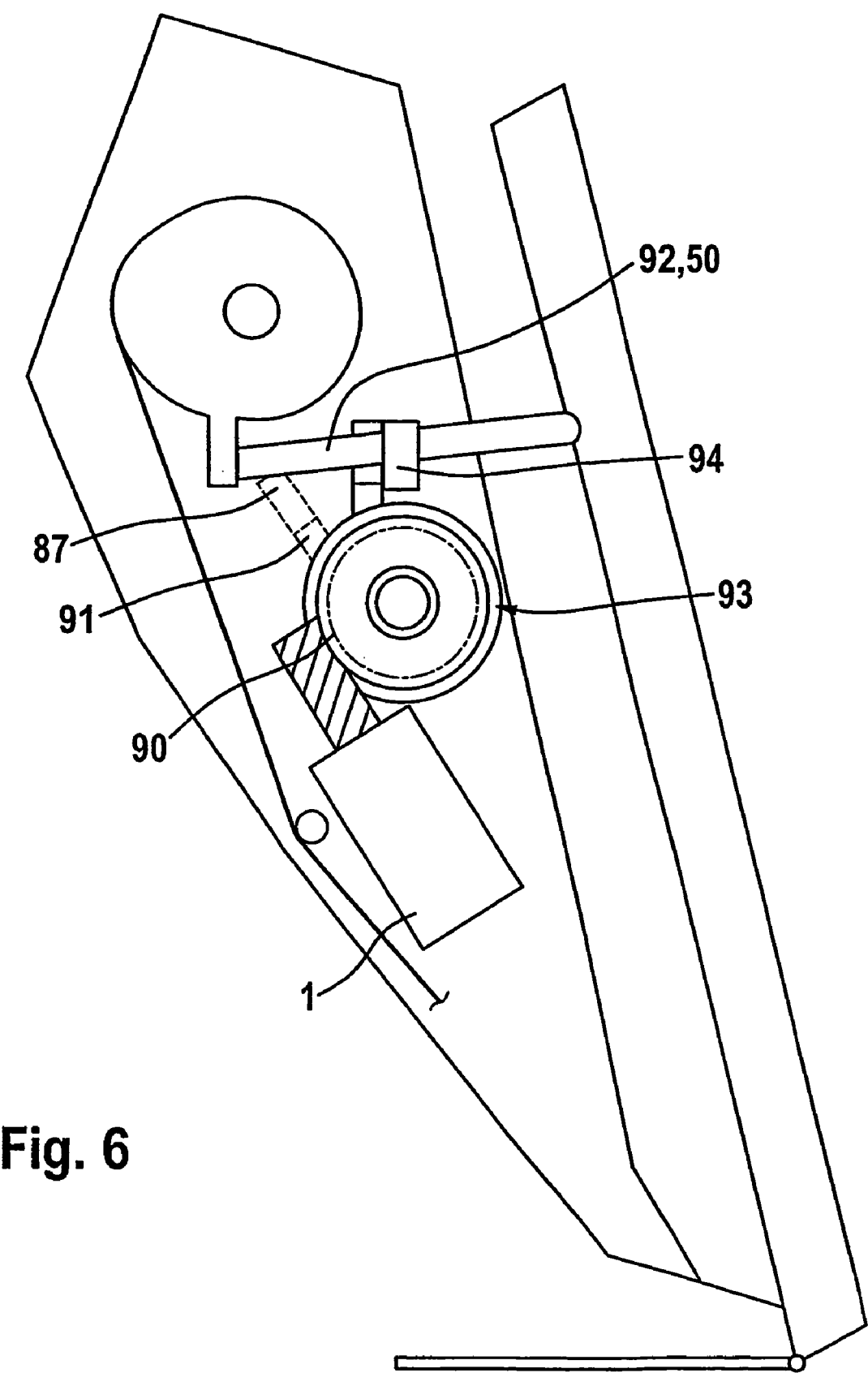
FIG. 6 shows a sixth embodiment.

Embodiment 6 According to FIG. 6

The mode of operation of the embodiment of FIG. 6 is very similar to that of FIG. 5. The basic difference involves that no locking clutch (93 in FIG. 5e) is provided, but stop 87 is variable in its position. When the cruise control is switched off, the stop adopts an inactive position. While the cruise control is in operation, the stop 87 is continuously moved into the position in which the counterforce is desired to act on the pedal, in the corresponding angular position of the pedal. In this position an associated cam 94, which is rigidly connected to the coupling rod 92 of the pedal 7, will make catch at the end of the turning lever 91 so that the counterforce becomes abruptly active on the pedal. The function of the application of force onto the pedal board is achieved by an electric motor 1 that acts on the coupling rod 92 of the electronically controlled acceleration device by way of a gear 90 and a clutch 93, preferably being a sliding clutch. The piston rod 92 may also be the coupling lever 50 as shown in FIG. 1. Hence follows that there is no absolute need of providing a coupling rod 92 that extends in parallel to the coupling lever 50. FFP actuator and coupling rod are adapted to be coupled by form lock (stop) only in one direction, namely in the actuating direction of the pedal. The purpose of the sliding clutch is to ensure that the pedal can always be actuated, e.g. in the event of blocking of motor, gear or with mass inertias.

When the cruise control function is disabled, stop 87 will move to assume its rest position, and no mass inertias of motor and gear are produced in the operative connection.

Advantage: The mechanism is entirely uncoupled from the mechanism of the electronically controlled acceleration

Figure 7:
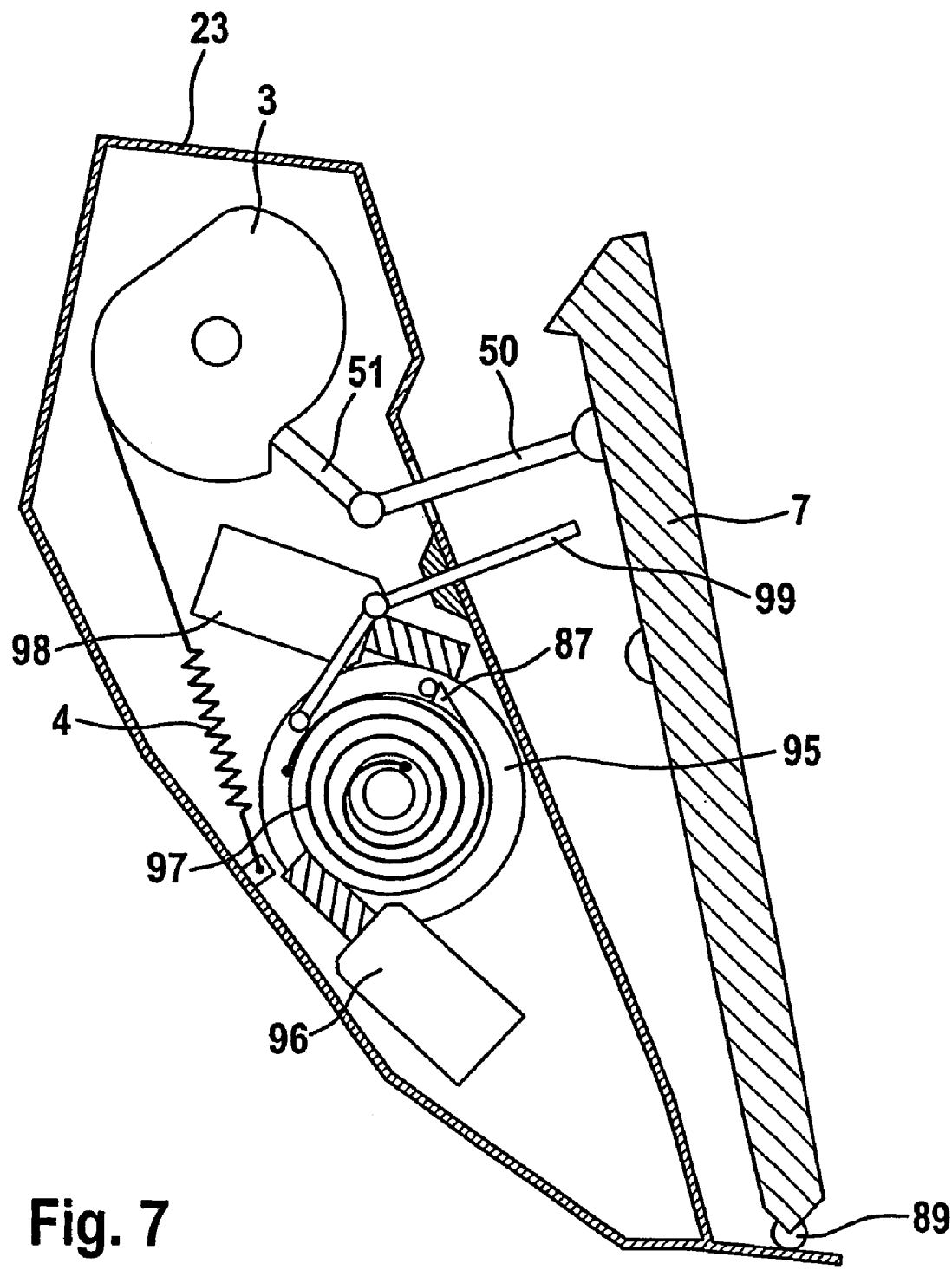
FIG. 7 shows a seventh embodiment.

Embodiment 7 According to FIG. 7

The embodiment of FIG. 7 is an improvement of the embodiment of FIG. 6. The function of the stop is improved. In other respects, the design of this embodiment is identical to the one as described with respect to the FIG. 1 and FIG. 6 embodiment.

The pivotable pedal acts as usual by way of the coupling lever 50 on the cam plate 3 at which a restoring spring 4 for retracting the pedal also makes catch. A servomotor 96 pulls a spiral spring 97 counterclockwise on a worm wheel 95 in opposition to a stop 87 rigidly connected to the worm wheel. Hence, the worm wheel 95 has a counterclockwise preload that is applied by the spiral spring 97 to the stop 87 on the worm wheel 95. Thus, a basic force preloading this worm wheel is applied to the FF worm wheel 95 by way of the spiral spring 97. Hence, the spiral spring 97 is wound up by the servomotor e.g. by way of clockwise rotation of the worm wheel over the stop 87 connected to the worm wheel. When the actual speed exceeds the nominal speed, the motor 98 will start to operate and turn the worm wheel 95 in opposition to the force of the wound-up spiral spring 97 into the desired position in which a pedal stop 99 connected to the worm wheel 95 moves into abutment on the pedal lever 7. The spiral spring 97 is wound up still further by means of motor 98 twisting the worm wheel 95. This allows achieving a considerable counterforce in a comparatively small motor 98. The servomotor 96 keeps the stop in the desired position in opposition to the counterforce. This way the servomotor is able to move the FF worm wheel via said's stop pin with the pedal stop coupled thereto into the desired angular position in which the motor and the spiral spring will jointly act as a counterforce against the stop until the pedal acts on the free end of the pedal stop and, thus, is subjected to a corresponding counterforce.

The stop is rated so that position adjustment is possible during the force control action. Further, two springs are provided assisting the power generation of the motors so that the motors may have smaller dimensions, which fact is very important in view of the very limited mounting space. The power consumption of the motors is reduced by the springs that produce a torque.

Embodiment 8 According to FIG. 8a to FIG. 8f

Springs are frequently employed for the simulation of a demanded force/travel characteristic curve in nowadays passive actuating modulates, said springs being connected to the actuating element by way of Bowden cables. This principle is frequently used especially with accelerator pedals (electronically controlled acceleration device). FIG. 8a shows a typical realization wherein the movement from the step plate of a pedal lever 7 is transmitted to a cam plate 3 by way of a coupling lever 50 configured as a joint rod. Said cam plate in turn winds up a rope that is attached to a tension spring used as restoring spring 4. A number of ropes and tension springs are often used for redundancy reasons. The construction according to FIG. 8c is referred to as passive accelerator pedal.

Modules are also desired for the better information of the driver, wherein a force can be produced actively, that means controllably or adjustably, in addition to the passive basic characteristic curve. FIG. 8b shows the desired course as a requirement of the pedal characteristic curve.

FIG. 8a shows a possible approach to a solution, wherein an electric motor 1 operates by way of a gear 13 in parallel to the passive elements and is always moved along.

Figure 8F:
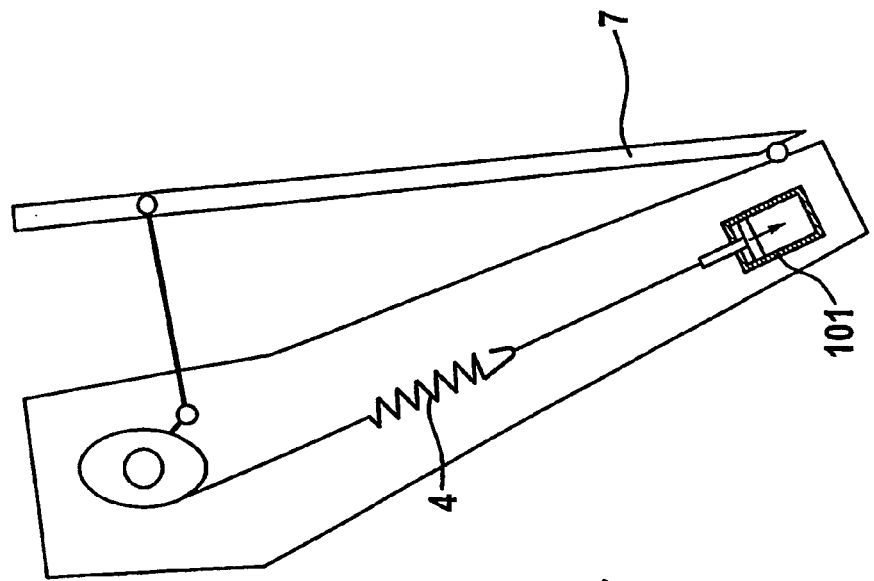
Figure 8E:
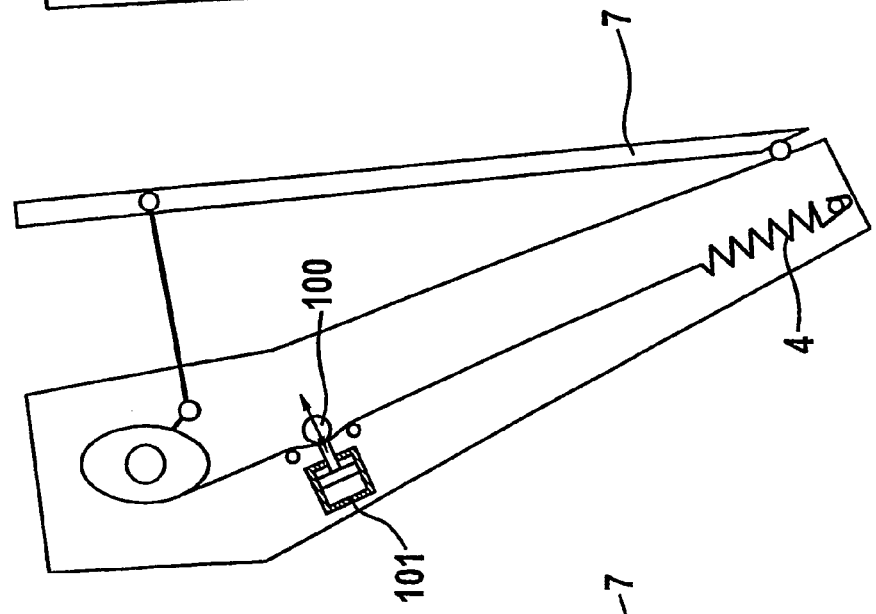
Figure 8D:
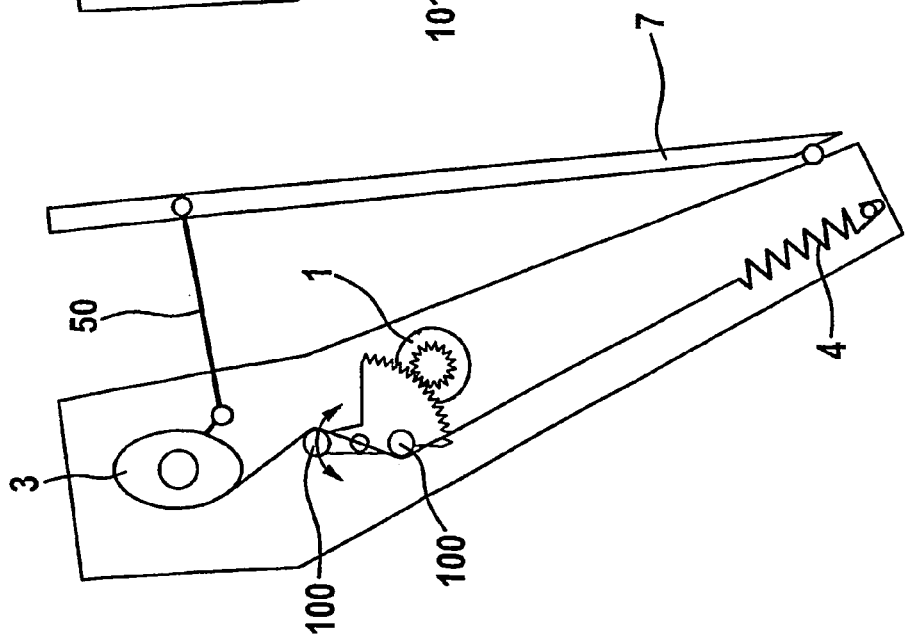

The embodiments according to FIG. 8d and FIG. 8e suggest a solution principle, which makes use of the Bowden cable of the passive modules for the demanded active function. A controlling member causes movement of one or more rollers 100 in such a fashion as to bring about an additional deflection of spring 4 and, thus, a higher total force by deviation of the rope. FIGS. 8d to 8f show several examples for the arrangement of the rollers and their movement, and an electric motor 1 is used as a controlling member in FIG. 8d, while a stroke magnet 101 is used in FIG. 8e and FIG. 8f. The embodiment of FIG. 8f manages without rope pulleys. Herein the bottom bearing point of the spring 4 is moved directly by a stroke magnet 101, thereby bringing about an extension of spring 4 and, thus, an increase in force.

The following detailed statements can be made with respect to the embodiments with active elements at the Bowden cable according to FIG. 8d to FIG. 8f.

This principle differs by several features from other concepts similar to the embodiment of FIG. 8c.

Feature I)

The controlling members are not coupled to the pedal movement, they perform only a feed movement. The following advantages are hereby achieved:

a) When the pedal is operated purely passively, the active component will by no means influence the passive characteristic curve; they are uncoupled.

b) Failure of the active components will normally achieve the advantage mentioned under a). Application of the pedal is still possible, though at higher forces, even in the rare case of the module getting jammed in a compressed position.

c) Regulating distance and speed of the actor are no longer coupled directly to pedal travel and pedal speed. Generally, the regulating distance may hence be shorter than the pedal travel.

When only two switch points are required (passively and passively plus invariable offset), a stroke magnet may also be used as an actor for the short travel. Said stroke magnet is distinguished by high dynamics and low costs compared to an electric motor.

d) Inequalities at the drive, e.g. due to jerking of the motor or meshing of a gear, are much less perceptible at the foot than in the case of a direct connection.

Feature II)

The controlling member is so involved in the flow of forces that the force or the torque at the actor represents an indicator of the total pedal force. The following advantages result: The total pedal force (passive and active) can be adjusted—especially when an electric motor is used—with a sufficient rate of accuracy by controlling the current supplied. No further sensor means is necessary to this end.

Figure 9A:
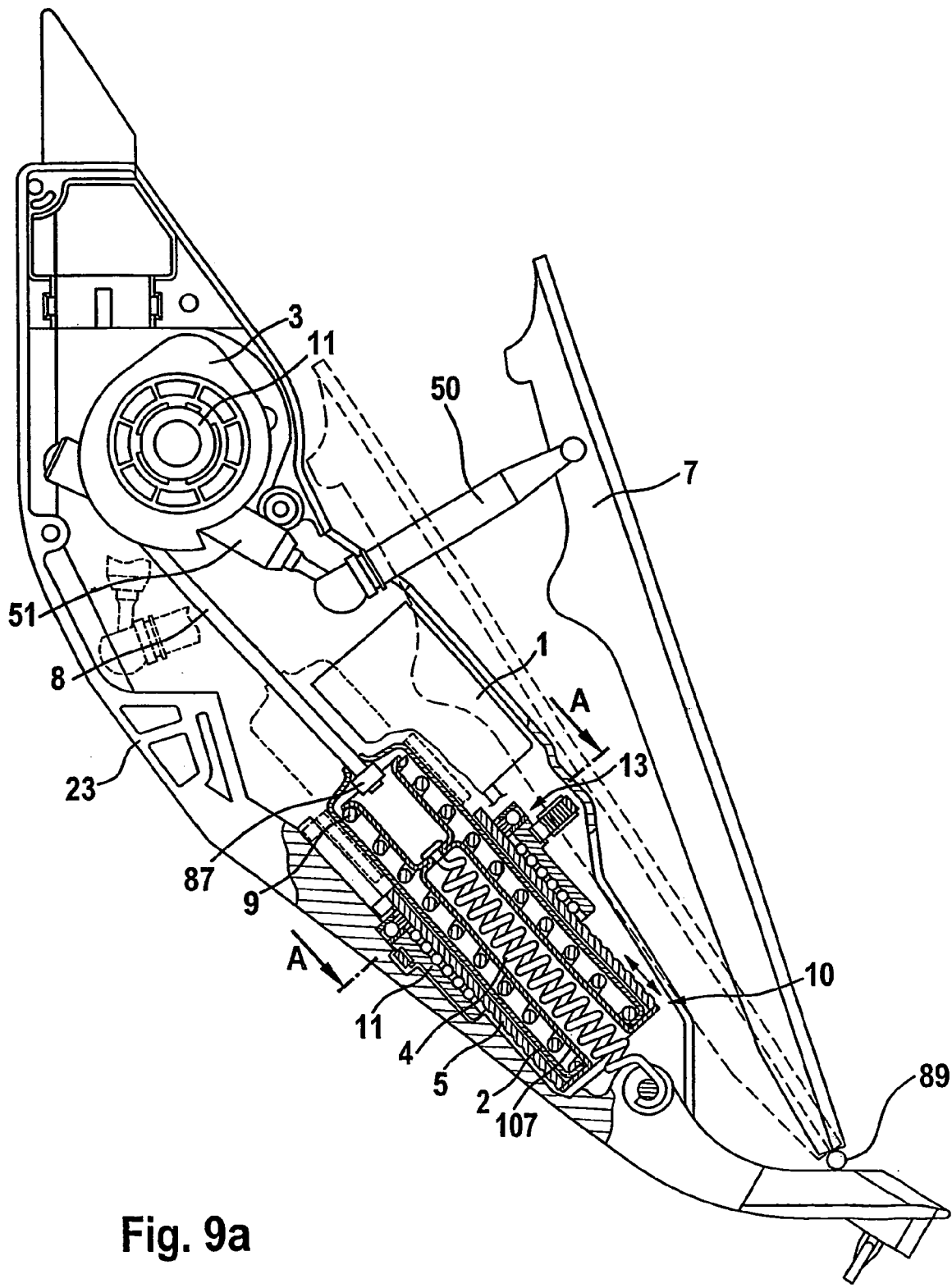
FIG. 9a and FIG. 9b show a ninth embodiment.
Figure 9B:
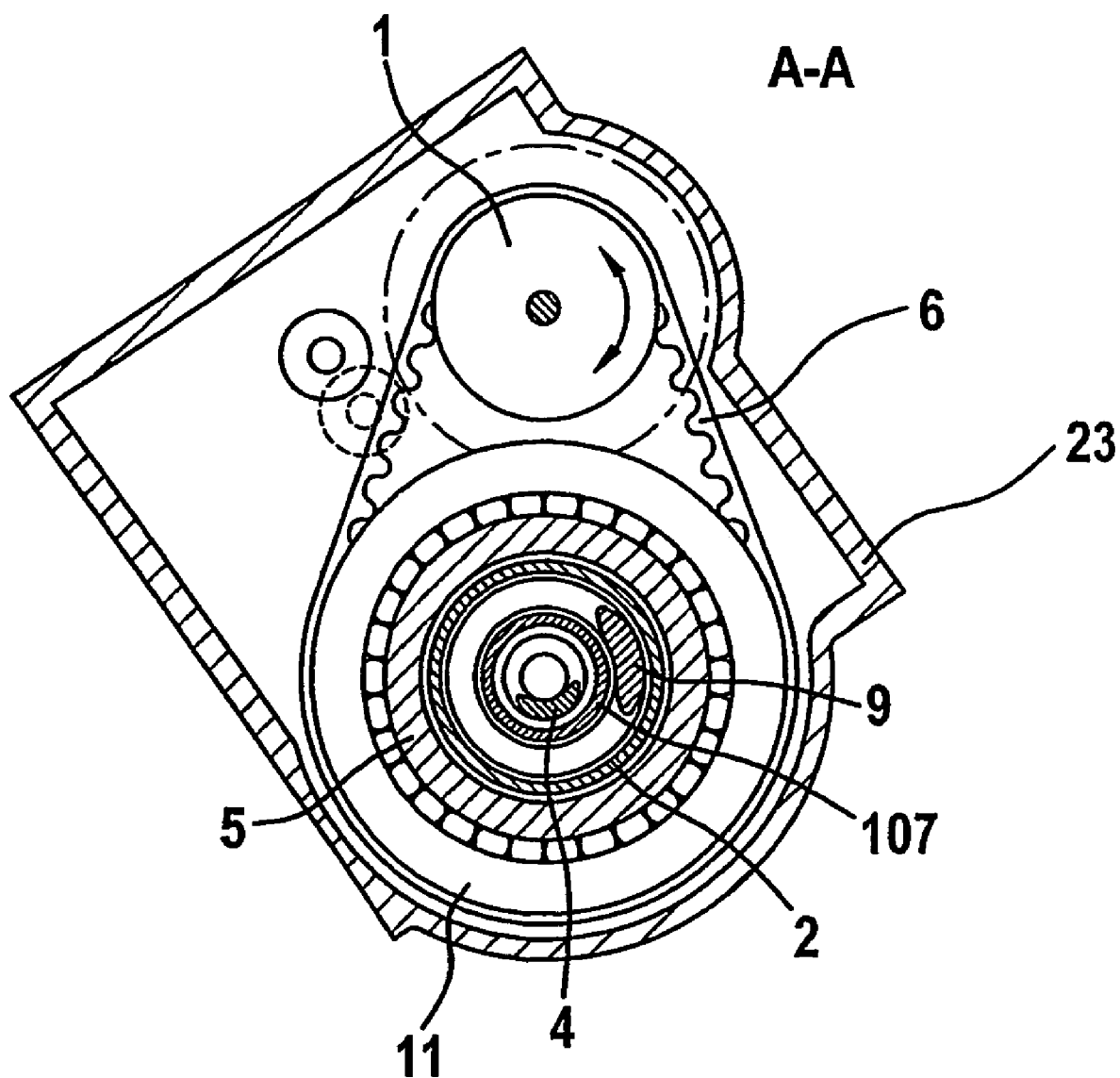

Embodiment 9 According to FIG. 9a and FIG. 9b

Likewise in this embodiment, like reference numerals are used for the elements customary in a pedal module as used in the preceding embodiments. Insofar the description of the above embodiment can also apply to the embodiment according to FIG. 9. In the normal condition, the hollow spindle 5 (hereinbelow often referred to as spindle sleeve 5) adopts its top end position as indicated in FIG. 9a. The force directed upwards from rope 8 is transmitted to an inside stop sleeve 107 by way of a sleeve 2 and a spring 9 configured as a compression spring. The compression spring 9 may be pictured as a hollow cylinder because it is very stiff. Consequently, the force pulling the rope 8 upwards is transmitted onto the retracting spring 4.

The mode of operation of the embodiment 9 according to FIGS. 9a and 9b with an active pedal is as follows:

Being able to apply the accelerator pedal 7 at any time is necessary in the active FFP function. For this reason, a function of overruling pedal depression is required when the accelerator pedal is reset actively, yet the driver wants to accelerate. The electric motor 1 drives a ball screw nut or threaded sleeve 11, herein by means of a synchronous belt drive 6, with the spindle 5 moving against the stop sleeve 107 (see abutment point 10 in FIG. 9a) and thus pulling at rope 8 through Bowden cable sleeve 2. The force acts on the accelerator pedal. More specifically, in case that an additional force acting in opposition to the force introduced at the pedal is demanded, a motor will drive the synchronous belt 6 according to FIG. 9b so that the spindle 5 is moved in a downward direction in the drawing. In doing so, it will entrain the stop sleeve 107 pulling the rope 8 downwards through the stiff spring 9 and the Bowden cable sleeve 2. Hence, the force of motor 1 acts in parallel to the force of retracting spring 4.

The driver is any time able to depress the accelerator pedal to such an extent (depress in an overruling manner) and thus actuate the sensor that the preloading force of the preloaded compression spring 'collapses' and, hence, allows a stroke again.

One of the two ropes 8 is operatively connected to one of the two retracting springs 4 by way of the sleeves 2, 107. The other rope remains unaffected. Exactly as in the embodiments according to FIGS. 10 and 11, the external spring 9 of the two springs 9, 4 nested relative to each other is very stiff.

Finally, the case may occur that the driver wishes to overcome (overrule) the restoring force, whereby the corresponding angular position for the adjustment of the accelerator pedal for the vehicle can be reached. This causes reversing of the motor in opposition to its proper direction of rotation. If the motor or the gear block, or if the inertia forces are excessive due to high actuating speeds, the compression spring 9 will yield. In the normal case, it applies that the force of the driver causes a slight upward displacement of the spindle by way of the stiff spring 9. This may happen when the drive of the spindle is not self-locking. The spindle nut 11 can be moved to rotate caused by the longitudinal movement of the spindle, and this rotation is transmitted through the synchronous belt 6 to the motor 1 that is driven hereby. The condition for this construction is that the spindle 5 is longitudinally movably yet non-rotatably mounted, while the spindle nut 11 is arranged so as to be rotatable but not longitudinally slidable. The following facts are especially important for the embodiment:

Uncoupling of the traction cable and interposition of a flexible component acting in response to a defined force, that is arranged in a radial direction around the active actuating member.

Advantages

The packaging problem is solved by way of arranging the overruling depression spring 9 around the ball screw spindle (nesting arrangement). A series arrangement would not be possible at this point (several strokes in succession).

Fail-safe solution owing to the use of single simple components.

Inexpensive

Low noise due to synchronous belt drive, no transmission of vibrations.

The components may be made of plastics.

A sensor for determining the angle of rotation may remain at the point envisaged by the customer.

Spindle nut being a multi-function part with an integrated axial bearing and drive function by the electric motor.

Modular construction is possible.

Figure 10:
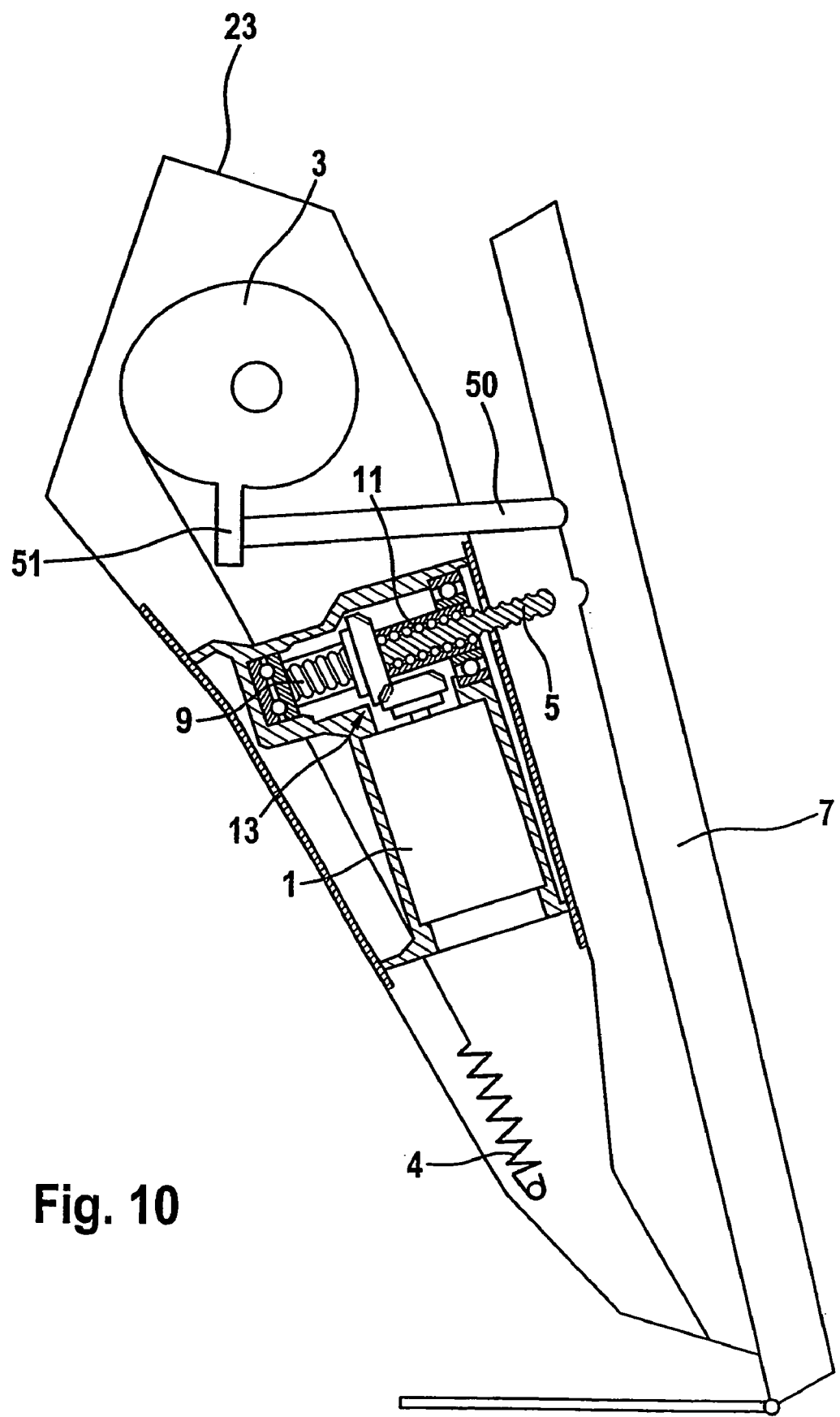
FIG. 10 shows a tenth embodiment.

Embodiment 10 According to FIG. 10

This embodiment has the usual design with respect to its normal functions as described hereinabove, and its operation is as follows. In the initial condition, the spindle of the gear 13 configured as a ball screw in FIG. 10 is moved entirely to the left and the normal pedal function prevails, as has been described hereinabove several times. The spindle 5 is fixed against rotation and can move in an axial direction only. The gear 13 must not be self-locking for the function. When the Force-Feedback function is enabled for producing an additional restoring force (many times referred to as controlling force hereinbelow), the motor 1 will rotate a threaded sleeve by way of bevel gears, and consequently the spindle 5 moves to the position where the position of the pedal 7 corresponds to the preset nominal speed. When the preset speed and thus the nominal position of the pedal is overruled, the spindle is urged to the left by pedal 7 and the motor is reversed. Due to the self-locking mechanism missing, the device comprised of motor 1 and gear 13 will thus additionally perform the function of overruling depression. The pedal force is increased to the preset valve due to the active force of the motor 1. When the Force-Feedback function is disabled, the spindle will return to its initial position caused by a corresponding actuation of the motor.

The usual restoring force for pedal 7 is applied by means of the coupling lever 50, the cam plate 3, and the restoring spring 4. The additional force applied to pedal 7 is produced because the pedal reaches the end of the spindle 5 and comes to sit on it. Because the thread is not self-locking, the spindle is displaced in its longitudinal direction, and a rotational force is applied to the motor shaft by way of the threaded sleeve 11 often referred to as spindle nut. Thus, the motor is not only used for displacing the spindle in its longitudinal direction and hence for displacing the stop. In addition, the motor also exerts a counterforce. This counterforce may still be augmented by electrically switching the motor—with a torque applied by the pedal to the motor—in such a fashion that it actively resists this torque. This can practically imply that a corresponding voltage is applied to the windings of the motor. The spring 9 is used for the safety of the device of the invention. Should the motor block, it is still possible to axially displace the spindle 5 in opposition to spring 9 and thus depress the pedal 7 in an overruling manner. The following facts are very important for the described principle.

The rotation of the electric motor is converted into a translation motion hindering the pedal movement in the direction of the full-load position.

Advantages

Very good efficiency of the ball screw.

Favorable packaging.

The parts may be made of plastics.

Figure 11:
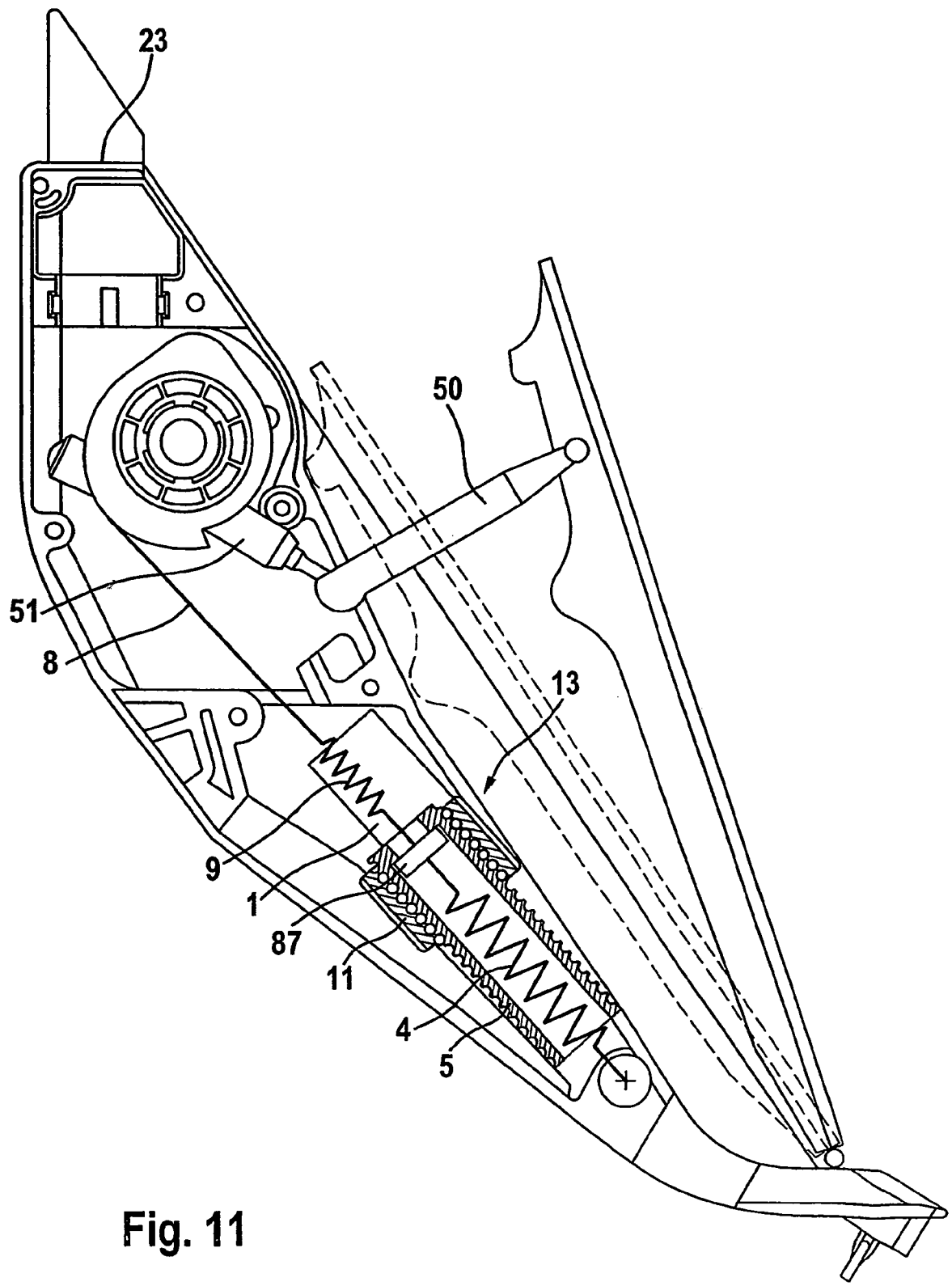
FIG. 11 shows an eleventh embodiment.

Embodiment 11 According to FIG. 11

FIG. 11 again shows the usual design with respect to the normal functions of the pedal module. In this solution of the invention, the force for the Force-Feedback function is introduced into one of the ropes 8 returning pedal 7 for the pedal retracting springs 4 installed as a standard. A stop 87 is fitted to rope 8 to this end. The spindle of the ball screw 13 is designed as a hollow shaft and has at its upper end a constricted cross-section, by way of which the rope 8 with stop 87 can be pulled downwards.

When the Force-Feedback function is disabled, the spindle 5 in FIG. 11 is moved to the very top by a corresponding actuation of motor 1 so that stop 87 on rope 8 cannot get engaged with spindle 5. It is possible in this case to consider the top spring 9 that has a high spring constant as a rod plunging a certain distance into the hollow spindle.

When the Force-Feedback function is enabled, the spindle that moves downwards due to the threaded sleeve 11 set rotating by the electric motor will move to the position where the pedal position corresponds to the preset speed. When the pre-adjusted speed and, thus, the nominal position of the pedal is overruled, the spindle is pulled upwards and the motor reversed. The required pedal force is this way increased to the pre-adjusted value. To ensure the standard function of the accelerator pedal upon failure of the Force-Feedback unit, e.g. blocking of the motor 1, spring 9 is fitted between the rope and the stop. The preload of the spring is so high that an excursion of the spring is possible only when a force higher than the maximum Force-Feedback force prevails. The position of spring 9 for the function of overruling depression and safety functions is not limited to the position as shown in the drawing. Instead of a ball screw, any other gear may be used which converts a rotation into a translation.

Figure 12:
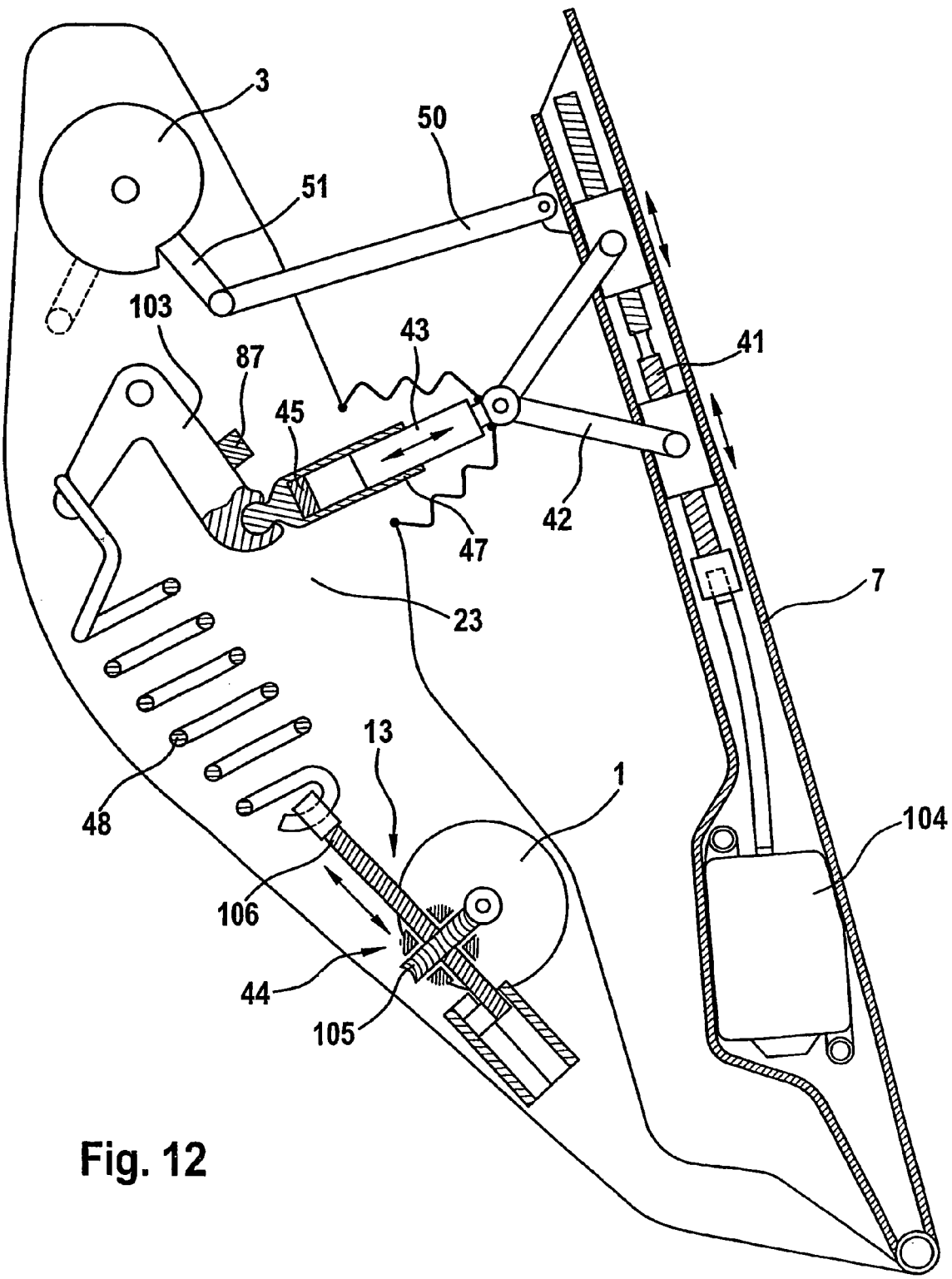
FIG. 12 shows a twelfth embodiment.

Embodiment 12 According to FIG. 12

In the embodiment according to FIG. 12, the pedal lever 7 is reset in the usual manner in the normal condition as described e.g. hereinabove with respect to FIG. 1. In the resetting operation, a retracting spring (not shown in FIG. 12) urges the pedal lever 7 back in the direction of its initial position by way of the cam plate 3, the coupling lever 50 and the turning lever 51. Subsequently, only those features will be described in detail in this embodiment that serve for generating an additional controlling force, which abruptly appears in addition to the usual resetting force as soon as the actual speed exceeds the nominal speed. A motor 1 is used for this purpose pulling a tilting lever 103 suspended in the housing 23 against a stop 87, by way of a gear 13 and a spring 48, and thereby preloading the free end of this tilting lever. Motor 1 may then start working when the nominal speed is predetermined for the vehicle (e.g. in a cruise control), or may only start up when the actual speed has almost reached the nominal speed.

The principle presented in FIG. 12 solves the packaging problem in such a manner that the accelerator pedal 7 is not only a step plate but rather may assume further functions integrated in the plate. For example, a stop positioning is illustrated in the sketch in FIG. 12. A position motor 104 actuates a scissors-type lever 42 by way of a spindle 41. The direction of motion is changed as a result (acts vertically to the pedal), and the actuating rod 43 plunges more or less deeply into the pedal housing 23. In the pedal housing there is enough space for the abutment force adjustment device 44 comprising, among others, the motor 1 and the gear 13.

In the present embodiment, the pedal 13 is pivoted on the right-hand side of FIG. 12 at the bottom end. The normal restoring force is generated like in FIG. 1 or FIG. 10. The additional restoring force can be changed by the adjustment device 44 by means of a motor 1, as has been described already in patent application DE 101 53 837.5. A spindle nut 105 that is axially not adjustable but rotatable is driven by the motor 1 and thereby displaces a stop spindle 106 in its longitudinal direction. This increases the tensile force of spring 48 that acts in opposition to stop 87. Said stop is stationary. A corresponding spindle 41 is also provided in the housing of the pedal. Spindle 41 is used to change the position of the actuating rod 43, which is guided in a guide sleeve 47. As soon as the actuating rod abuts on the damper 45, the pedal is required to overcome the force of the illustrated spring 48 in addition to the normal pedal force (not shown). The position starting from which this additional force will act against the pedal, depends on the position of the scissors-type lever 42. The damping element 45 damping the abutment of the actuating rod 43 is provided to avoid abutment noises between actuating rod and stop sleeve 47.

These provisions ensure the following advantages: solving the packaging problem and damping abutment noises.

Decisive Item of the embodiment:

Split-up of the functions to the pedal housing 23 and the step plate or pedal lever 7, and damping abutment noises.

An adjustable stop is used in the solutions indicated above. Depending on the position of the stop, the motor torque acts against the pedal force in a defined pedal position. The position of the stop need not only be conformed to the desired driving speed but also to the driving situation. The stop is realized by means of an adjustable rope slack in an already suggested solution.

Figure 13:
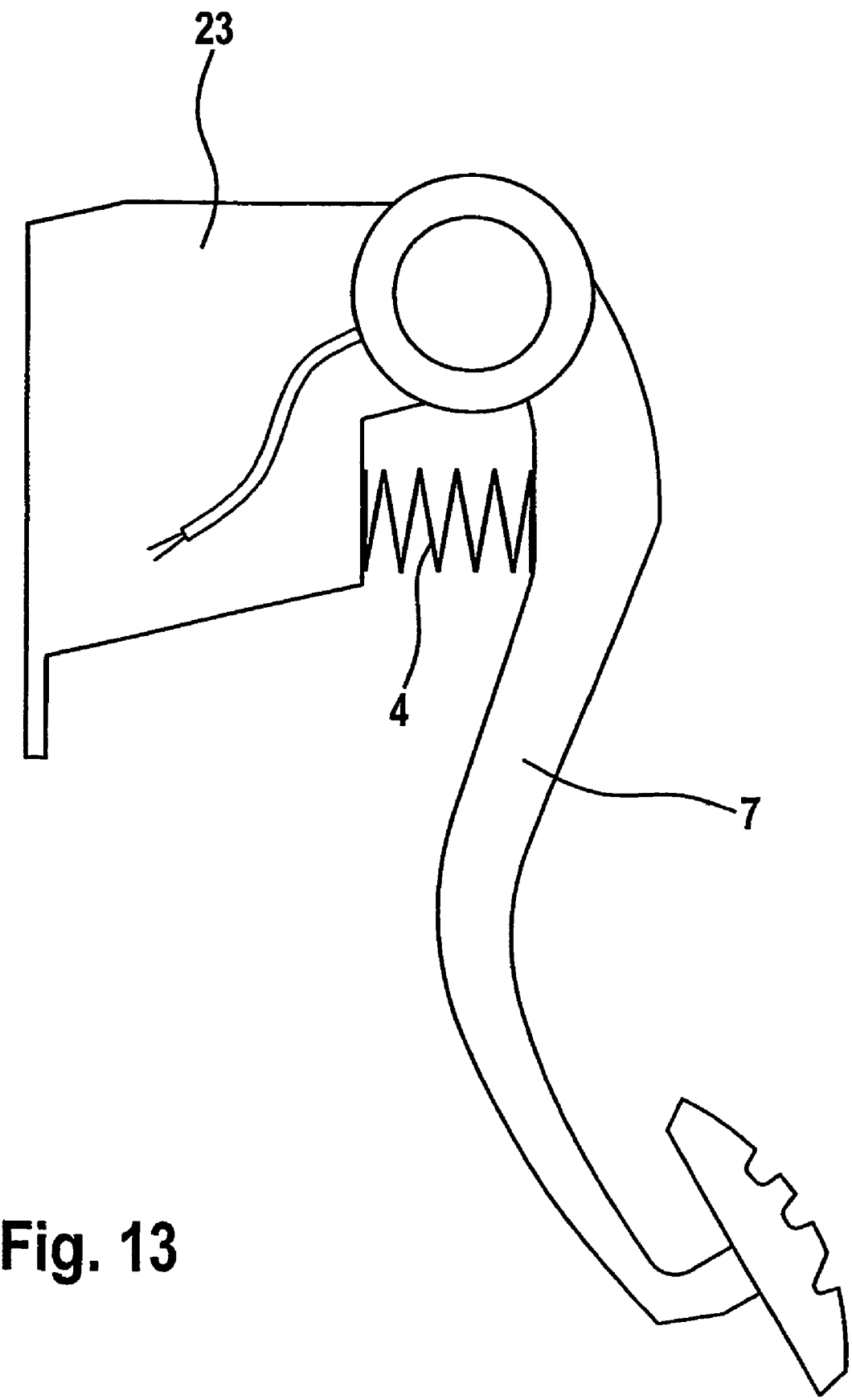
FIG. 13 shows a thirteenth embodiment.

Embodiment 13 According to FIG. 13

Magnetic-particle brakes (MPB) are structural elements where a small slot between two friction members is filled with magnetic particles. The magnetic particles will align when exposed to a magnetic field, the friction torque is thereby multiplied, and the friction torque is largely linear to the strength of the magnetic field and constant with respect to speed.

The use of such brakes in operating elements of by-wire systems is the object of this embodiment 13. When an MPB is connected in the flux of forces in parallel to a retracting spring 4 used as a passive spring element, the force that is passively generated by the retracting spring 4 and acts on the pedal 7 will increase by the frictional force. As this frictional force is freely selectable within limits by changing the magnetic field, the counterforce can be generated by way of corresponding regulating devices in dependence on the position, direction of motion and speed of the operating element, vehicle speed, etc., for example.

Advantage over Other Active Elements lower current consumption as an electric motor with identical torque
only the basic friction remains upon failure of the MPB or its actuation, no torque variations (jerking) occur like during the rotation of a non-energized electric motor
smaller mounting space than an electric motor
considerably lower temperature sensitivity than MR damper
inexpensive due to a simple design.

Example EMB (Electromechanical Brake):

In a pedal simulator, the MPB could be arranged on the axis of rotation of the pedal. A free-wheel mechanism connects pedal and MPB upon application of the pedal and disconnects them upon pedal release. Consequently, the (controllable) force of the MPB will act only during actuation, which ensures a release even if the friction torque of the MPB is higher than the restoring torque produced by the passive element.

The force inhibiting the actuation of the pedal 7 or the force counteracting the pedal force of the driver is produced by means of applying a corresponding magnetic field to the magnetic-particle brake by way of the current supply 102. Again a correspondingly high current is supplied to an appropriate coil for generating a corresponding magnetic field. This action is initiated by the output signal of a control that is driven by parameters indicative of the vehicle dynamics. However, the output signal of the control may also be triggered by externally supplied signals, e.g. by a device arranged at a route in connection with a speed limit. In this case, however, the magnetic-particle brake must be combined with the accelerator pedal only because the intention is to make the driver reduce the engine output rather than prevent the driver from braking. The higher actuating force which is abruptly needed after the response of the magnetic-particle brake for reaching the same pedal position not only indicates to the driver to withdraw the accelerator pedal, but also imparts to him/her the impression of having reached a corresponding position of the accelerator pedal by application of a higher actuating force than is the case in reality. This way the driver is unknowingly induced to maintain the adjusted nominal speed.

Figure 14A:
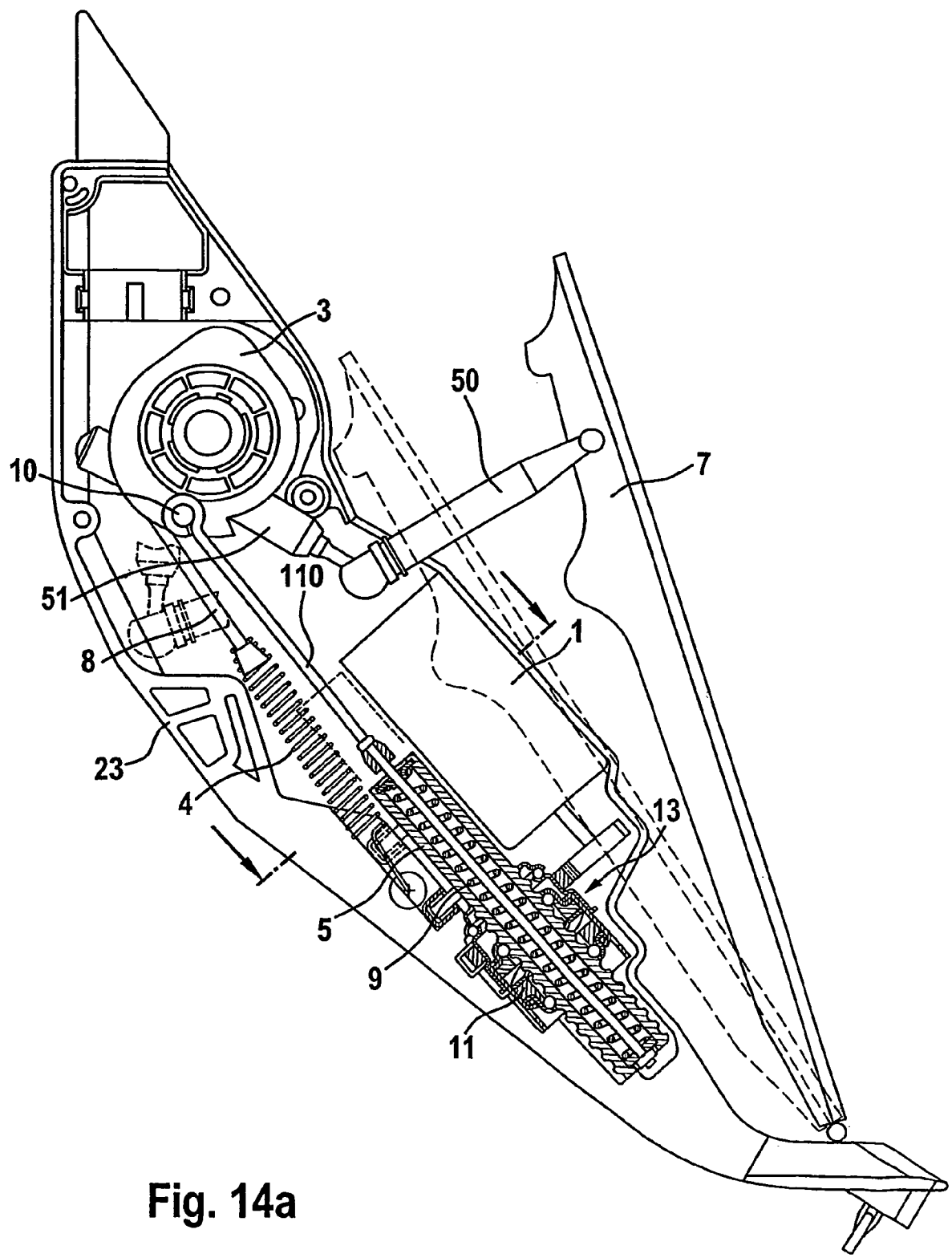
FIGS. 14a, 14b, and 14c show a cross-sectional view of a fourteenth embodiment.
Figure 14B:
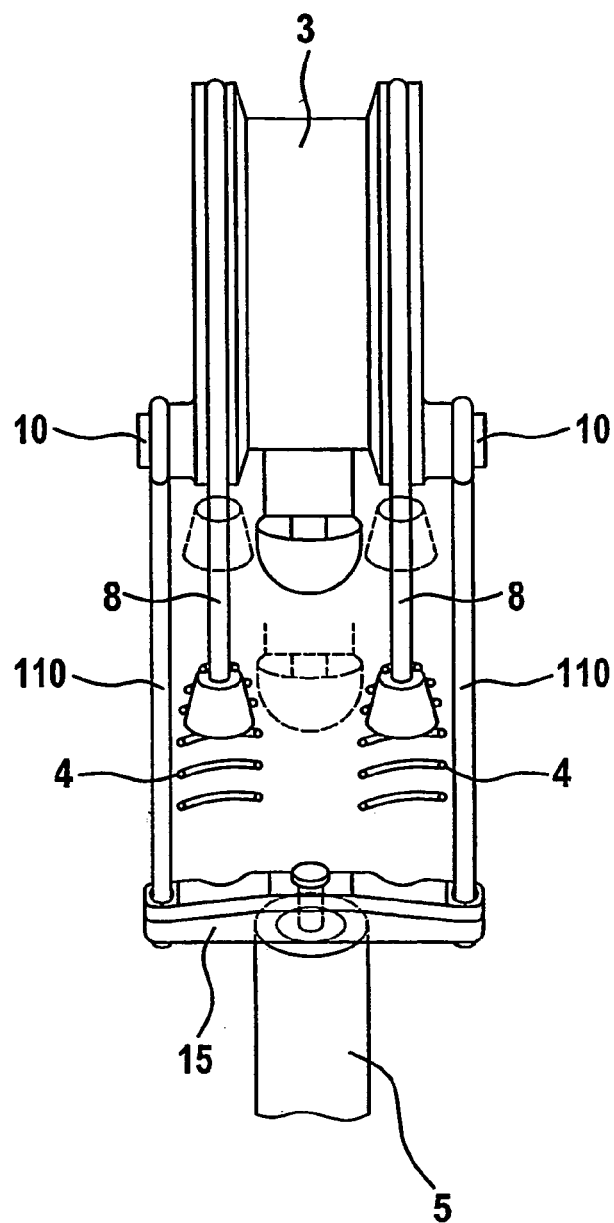
Figure 14C:
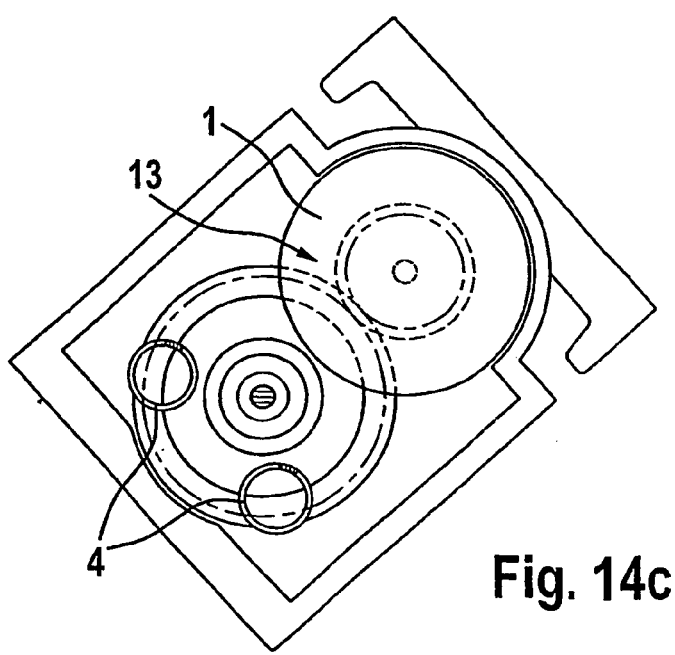

Embodiment 14 According to FIGS. 14*a*, 14*b* and 14*c*

The embodiment according to FIGS. 14*a* to 14*c* is similar to the embodiment 9 described in FIG. 9. The statements made therein also apply to the embodiment 14 of the present application as will be described in the following, unless differences are concerned that will be referred to hereinbelow. In the embodiment 9, the usual retracting spring 4 and the spring 9 producing an additional force that acts in the direction of resetting the pedal are in series arrangement. That means the two springs are serially arranged in terms of effect and act by way of one single pull-back rope 8 on the cam plate 3 that is used to transmit the retracting force to the pedal 7 by way of a linkage 50, 51. Because the customary retracting spring 4 in the known pedal assembly is conformed to the cam plate 3, e.g. by a defined angle of wrap which produces a predetermined friction force for the cam plate, the return spring does not change the predetermined tuning of the pedal assembly when the FFP function is disabled, what is also important for claims. The overruling depression spring 9, which will be explained in detail in the following, is meant to permit overruling the FFP function.

FIGS. 14*a* and 14*c* show two parallel arranged restoring springs 4 which make catch at the cam plate 3 by way of pull-back ropes 8, said cam plate in turn acting on the pedal board 7 by way of the linkage 50, 51. The restoring springs 4 are anchored at a housing 23 and at their opposed end respectively make catch at a pull-back rope 8. The above statements correspond to the usual design. By way of resetting ropes 110, an overruling depression spring 9 makes catch at the cam plate 3 by way of two eccentrically arranged pins 10 in a novel manner. The additional controlling force is transmitted from the motor 1 through the gear 13 to the threaded sleeve 11 when the FFP function is active. The force propagates from the threaded sleeve 11 though the hollow spindle 5 to the stiff overruling depression spring 9 which, with its bottom end in FIG. 14*a*, makes catch indirectly at the resetting rope 110 and thereby acts through the cam plate 3 in the resetting direction on the pedal 7. The overruling depression spring 9 is loaded by the hollow spindle 5, which is mounted in the housing 23 in an unrotatable manner but displaceable in its longitudinal direction. In its ineffective normal position, the hollow spindle 5 in FIG. 14*a* and FIG. 14*c* is disposed far to the top, as is shown in dotted lines.

When the threaded nut or threaded sleeve 11, which is mounted in an axially undisplaceable but rotatable manner, is turned by an electric motor 1 through a gear 13 in the FFP function, the spindle 5 in FIG. 14 is moved downwards and thereby pulls the top end of the stiff return spring 9 downwards so that a force is exerted by way of the cam plate 3 in a rearward movement on the board 7 of the pedal. This force acts irrespective of the retracting spring 4.

The additional controlling force can be overruled by the pedal 7 in the fashion described hereinabove several times in that the spindle 5 is pulled upwards in FIG. 14 by the pedal 7 by way of the resetting ropes 110 and the spring 9, and the motor is then turned in opposition to its direction of drive by way of the gear 13.

Should the motor 1 or the gear 13 block upon overruling depression or should the pedal 7 be depressed in an overruling manner so quickly that the mentioned assemblies are unable to follow this movement, the spring 9 will yield in this emergency situation and thereby nevertheless render possible a movement of the pedal 7 (counterclockwise) with a view to increasing the driving speed. This is done because a force is generated by the overruling pedal depression contracting the stiff return spring 9. As this occurs, the two resetting ropes 110 make catch at the return spring 9 by way of a web 15 (FIG. 14*b*), said spring acting evenly on both ropes as a result.

Figure 15B:
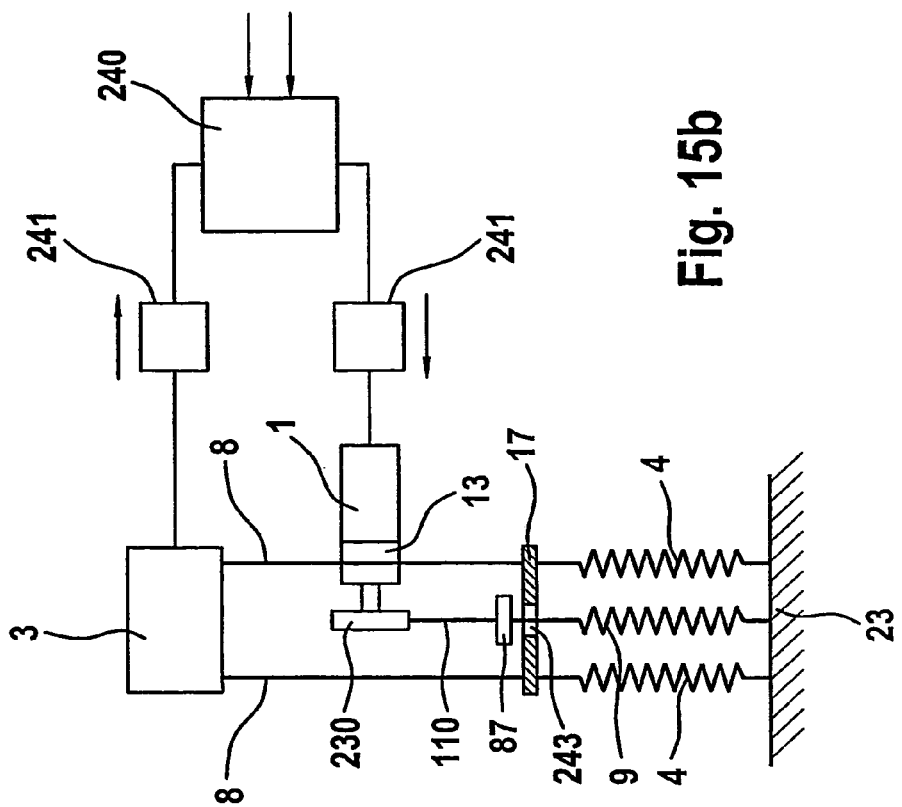
FIGS. 15a and 15b show a cross-section taken through a fifteenth embodiment.
Figure 15A:
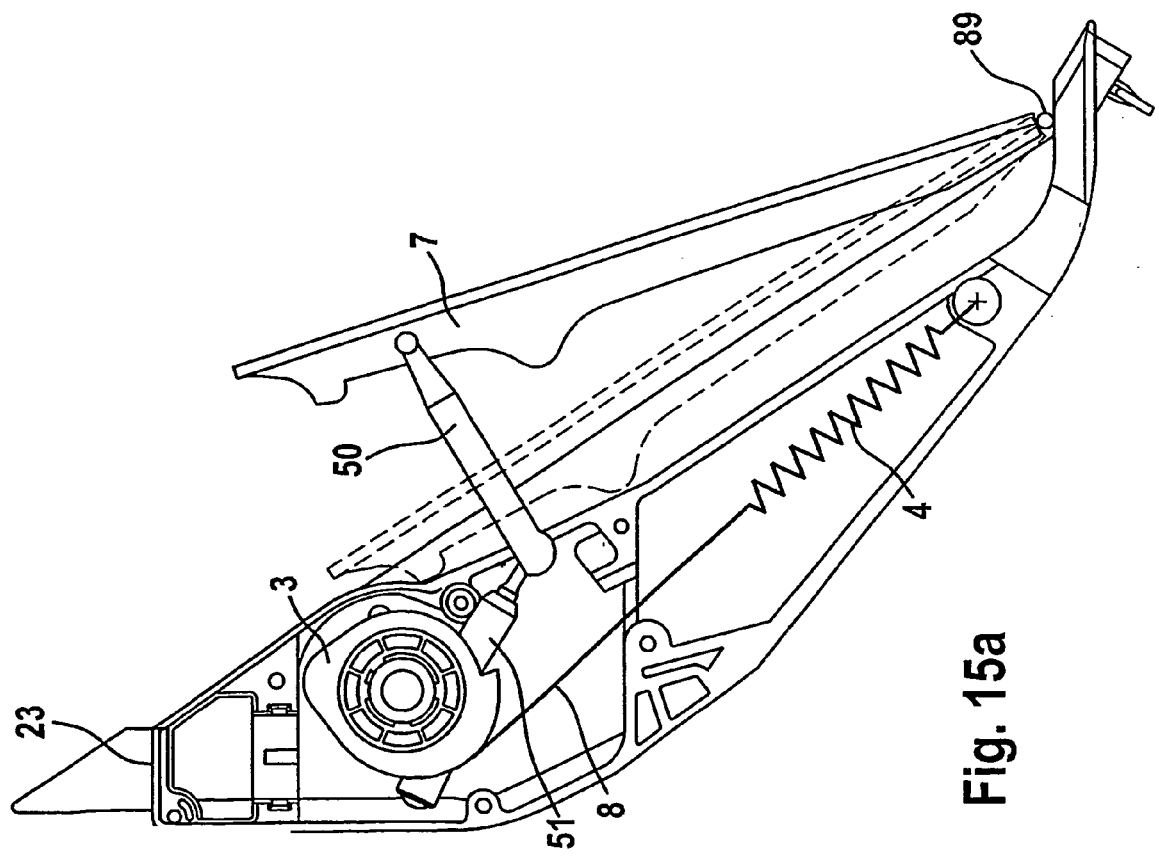

Embodiment 15 According to FIG. 15*a* and 15*b*

The embodiment according to FIG. 15 is based on the usual design of a pedal module within housing 23. Thus, the principal design of the standard module is again the same as in the previous embodiments. Because equal reference numerals are employed, the statements made hereinabove will apply accordingly. Especially the embodiment 14 according to FIGS. 14*a* to 14*c* is referred to.

As usual, a pedal board 7 is pivoted at the pedal module 23 by way of the axis of rotation 89. By means of a pull-back rope 8 a return spring 4 makes catch at a turning lever 51 by way of a cam plate 3, which turning lever acts on pedal 7 by way of a coupling lever 50. As can be seen from FIG. 15*b* and as is usual, the return spring 4 is formed of two parallel-connected springs. When the pedal board 7 is depressed, the coupling lever 50 that is articulated at the turning lever 51 is displaced axially. The turning lever 51 is rigidly connected to the cam plate 3 so that the cam plate 3 is turned by a defined angle upon application of the pedal board 7. The rotation is effected against the resistance of the return spring 4, the spring thereby trying to pull the pedal 7 back into its initial position because it is connected to the cam plate by way of the pull-back rope 8. This mode of operation is a standard in customary pedal modules.

The embodiment of the invention is characterized in that a counterstop 17 is attached to the pull-back rope 8 or the two pull-back ropes 8, said counterstop changing its position due to the expansion of the return spring 4 when the pedal board 7 is applied. An adjustment spring 9 is interposed between the two return springs 4 and makes catch at the housing 23 like the return springs 4. With its other end, the adjustment spring 9 is connected by way of a resetting rope 110 with a rope pulley 230 which can be rotated by way of a motor-and-gear unit 1,13. Said motor-and-gear unit 1,13 comprises an electric motor 1 and a gear 13. Fastened to the resetting rope 110 is a stop 87 whose position is adjustable by actuating the motor 1 which, by way of rope pulley 230, changes the length of the adjustment spring 9 and thus displaces the position of stop 87. Counterstop and stop are arranged in such a way that they can backgrip each other when moved towards each other. Consequently, stop 87 cannot pass by counterstop 17 if it is lowered sufficiently far downwards in FIG. 15b.

In the normal operation where no additional controlling force (FFP force) is applied to the pedal board 7, the motor-and-gear unit 1,13 maintains the stop 87 far enough above the counterstop 17 so that the counterstop 17 can move freely with the pull-back rope 8. If the additional controlling force shall be applied, for example because the actual speed of the vehicle has reached its adjusted nominal speed, the electric motor 1 is switched on and lowers the stop 87 by way of gear 13 in the direction of the force of the adjustment spring 9 so far downwards until it makes catch at the counterstop 17 and thus exerts an additional force on the pull-back rope 8 and also the pedal board 7. The magnitude of the force, by which the stop 87 acts on the counterstop 17, can be controlled by means of the motor 1, and the maximum force is predetermined by the force of the adjustment spring 9 preloaded by means of the motor. This setting possibility of the controlling force by way of the motor 1 is important because otherwise the controlling force is only determined by the force of the preloaded adjustment spring 9, this force in turn depending on the preload of the adjustment spring 9 when both stops get into contact with each other. However, this preload depends on the instantaneous position of the counter stop 17.

It is indicated in FIG. 15b that the motor 1 is actuated by an electric control 240 when the speed s (actual speed and nominal sped) measured by the control are equal or almost equal. The control 240 can act on the electric motor 1 by way of a transformer 241, said transformer delivering the corresponding current to the electric motor due to the voltage at the output of the control 240. To be able to act with a defined force on the counterstop 17 by way of stop 87, the control must be informed at which position the counterstop 17 is disposed. Due to the actual speed alone, the position of the counterstop 17 is not accurately defined in advance because this position also depends on the possible loading of the vehicle, a possible uphill driving and similar aspects. But the position of the counterstop 17 at the point of time of the transfer of the controlling force (that is e.g. actual speed is equal to nominal speed) is exactly fixed by the rotary position of the cam plate 3. It is therefore advisable to measure the rotary position of the cam plate at the point of time of the transfer and to actuate the control 240 correspondingly by way of another transformer 241. No attempt is made to adjust the stop 87 in advance based on corresponding table values that take into account not only the speed but also the other driving conditions such as loading, uphill driving, and similar aspects, before the nominal speed is reached. As has been explained hereinabove, the position of the counterstop is rather determined only when it has reached this position, in other words, at the point of time the additional controlling force is transferred to the pedal 7.

Concluding, the embodiment according to FIG. 15 can be described briefly as follows: There is provision of two retracting springs 4 and one single return spring 9. The effect of the return spring 9 is achieved by a stop 87 acting on the two pull-back ropes 8 by way of a catch 17.

In this solution, a third spring (FFP spring) is used as an overruling depression spring 9 furnishing the maximum Force-Feedback force. A rope 110 preloads this FFP spring by means of a motor-and-gear unit 1, 13. When the FFP function is disabled, the FFP spring 9 is preloaded maximally upwards and locked in this position. However, the motor and/or the gear can also be self-locking so that a corresponding snap-in locking device is not required.

Attached to the pull-back rope 8 of the standard retracting springs 4 is a stop in the form of a catch or counterstop 17. A stop 87 is secured to the resetting rope 110 of the FFP spring. With the FFP function disabled, the stop 87 of the FFP resetting rope 110 has moved completely upwards and cannot get in contact with the catch 17 of the standard pull-back rope 8. The bore 243 in the catch 17 is so large that the FFP spring 9 fits through. This ensures the normal pedal function.

When the FFP function is now enabled, the FFP resetting rope 110 is unlocked, and the stop 87 of the FFP resetting rope 110 is moved to the catch 17 of the standard pull-back rope 8. To be able to depress the pedal still further, a force that is increased by the FFP spring force of spring 9 must be applied to pedal 8. To vary the pedal force, the motor 1 can also pull at the spring with a defined force and hence support the leg force.

The following differing mode of operation is the result. As in embodiments described hereinabove, an adjustable stop is employed. When the FFP switch condition is reached (e.g. actual speed equals the nominal speed), this stop is moved against the counterstop in such a fashion that the stop acts with a (predefined) force against the counterstop and thus against the pedal 7.

The embodiment of FIG. 15 offers the following advantages: Fail-safe performance, that means, the pedal can be continuously actuated with an increased force even when the gear or motor is blocked. The FFP resetting rope 110 will simply kink upon dynamic overruling depression, and no additional inertia forces are produced. The restoring force can be varied during the FFP function.

The following modification is also possible with the present invention. Instead of the FFP spring 9, it is also possible to use a second electric motor as a power motor.

Figures 16A, 16B:
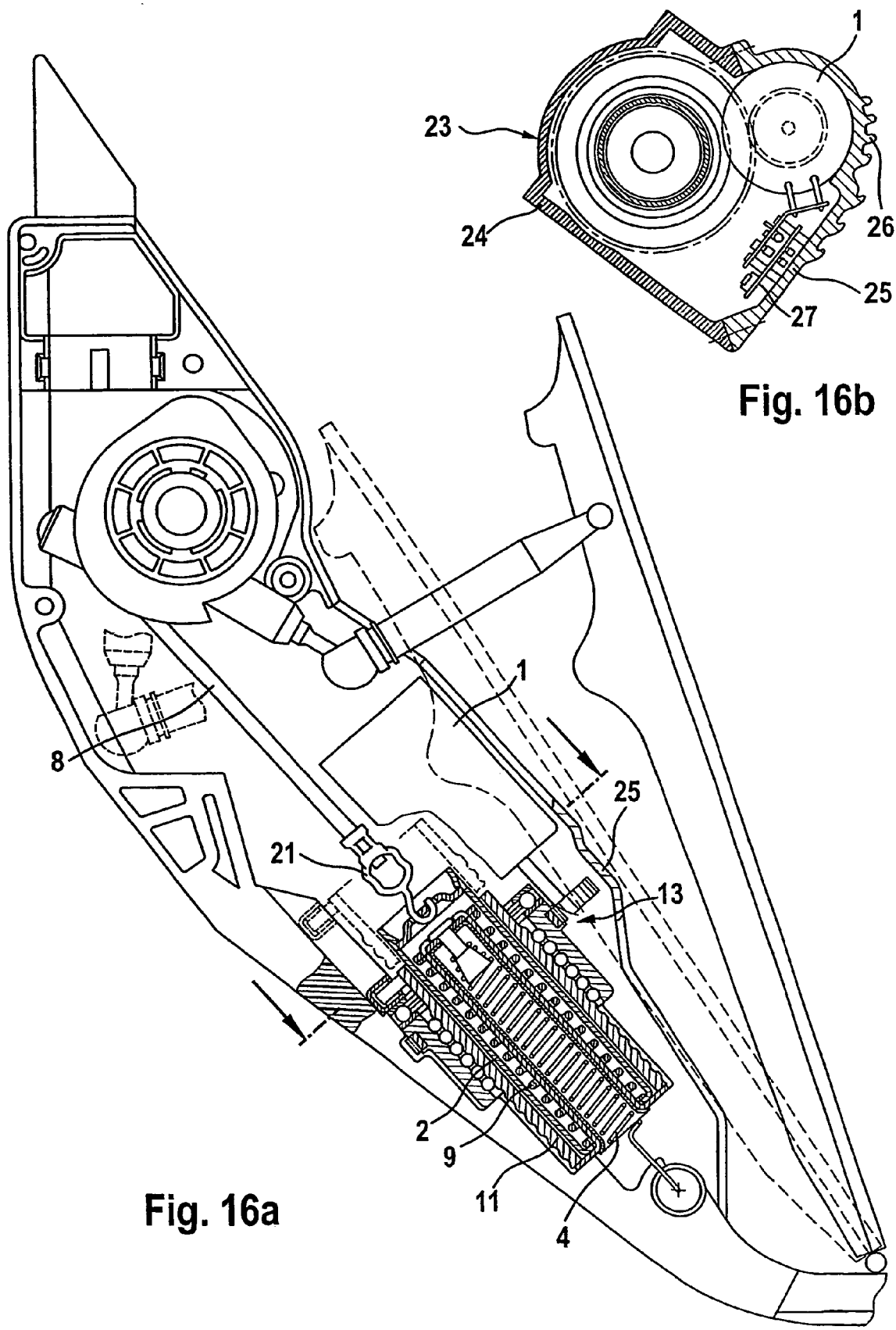
FIGS. 16a and 16b show a sixteenth embodiment.

Embodiment 16 According to FIG. 16a and FIG. 16b

FIG. 16a and 16b describe a sixteenth embodiment that is based on the embodiment of FIG. 9. In this embodiment, the depression spring 9 and the usual retracting spring 4 are nested, with these two springs acting in series in terms of effect though. The design of this arrangement and is mode of operation has been described in detail in the last mentioned German patent application in connection with FIGS. 9a and 9b illustrated therein. A sleeve 2 for spring 9 acts on the overruling depression spring 9 by way of a coupling link 21 in the present embodiment. The coupling link 21 is deformable in the longitudinal direction of the pull-back rope 8. This condition allows adjusting the effective length of the pullback rope 8 and thus adjusting the device.

FIG. 16b shows a cross-section taken through the housing 23 of the embodiment of FIG. 16a accommodating the electric motor 1, the gear 13 and the threaded sleeve 11. The housing comprises a first housing part 24 and a second housing part 25. The first housing part is composed of a lightweight and easy-to-shape plastic material. The second housing part is made of a rigid material with good heat conducting properties such as iron or aluminum. As a result, the heat emitted by the motor 1 can be discharged properly into the atmosphere. The housing 23 provides a pre-assembled unit, which can be inserted straightforwardly into the pedal housing.

The following advantages are hereby achieved: Housing cover 25 made of metal for introducing/dissipating motor heat and possible discharge to the ambient air. The cooling effect is increased by cooling ribs 26 and/or by means of a heat-conducting paste between motor and cover. Sheet bars (electronics) 27 and motor 1 are favorably integrated in the second housing part 25 used as a cover. The coupling link 21 in FIG. 16a is deformable and thus serves for tolerance compensation after the assembly. The motor heat is dissipated by means of special constructive measures and the arrangement of the motor as well as a low-cost integration and assembly of the electronics.

Figure 17:
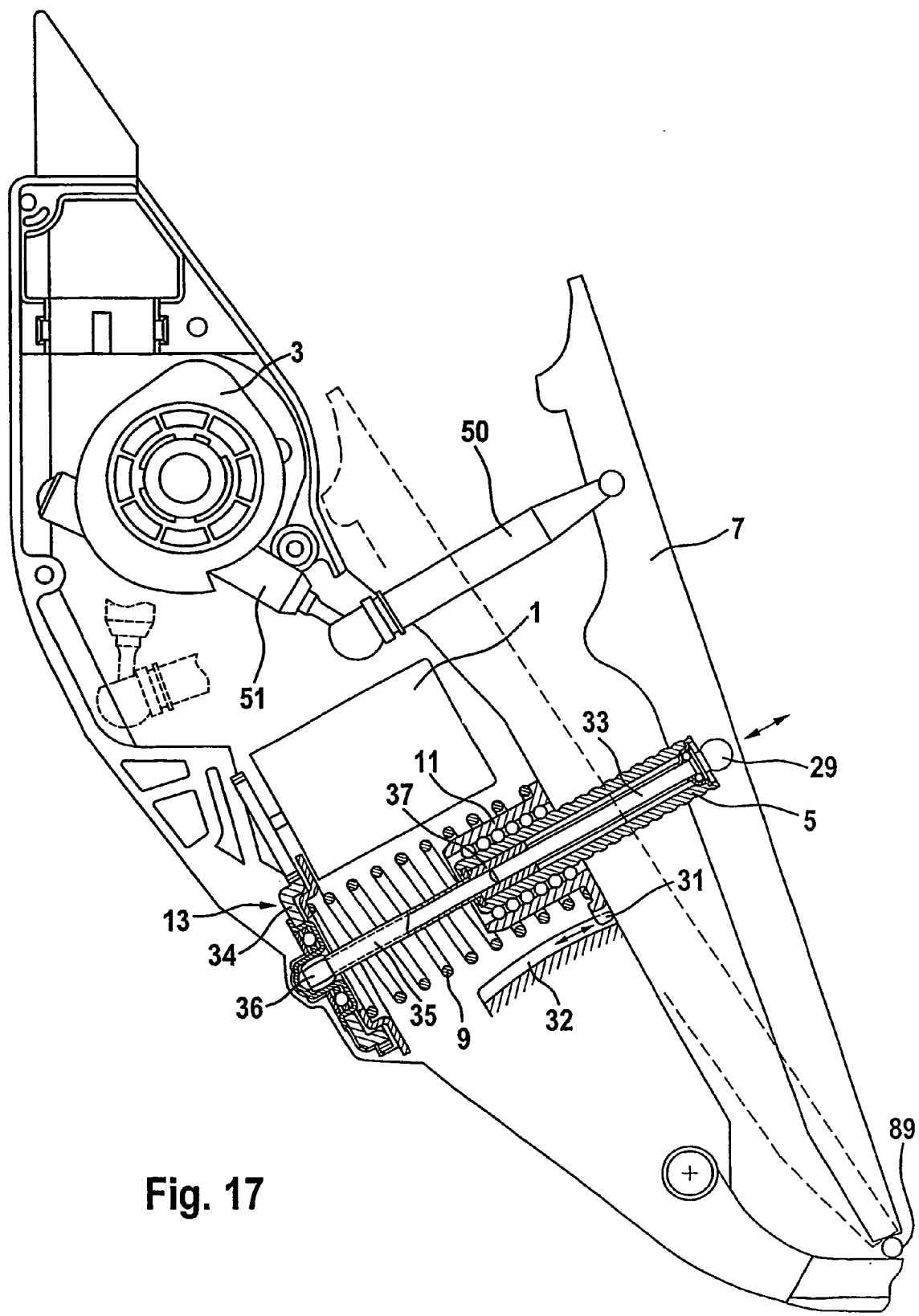
FIG. 17 shows a seventeenth embodiment.

Embodiment 17 According to FIG. 17

FIG. 17 describes a seventeenth embodiment as has been described similarly in connection with FIG. 10.

A spindle 5 referred to as a threaded pin in the following, is mounted with its one end 29 in the board of pedal 7. Board 7 is pivotable about axis 89. Spindle 5 is displaceable in its length and pivoted. Contrary thereto, the one threaded sleeve 11 is unrotatably and axially non-displaceably mounted. As in the previous embodiments, the purpose of spring 9 is to permit overcoming the returning force in a case of emergency as described above.

When the motor 1 starts to run, gear 13 sets spindle 5 rotating so that the spindle unwinds from the stationary threaded nut 11 and through end 29 of the extension 33 presses against the board of pedal 7. Compared thereto, the linkage comprising coupling lever 50 and turning lever 51 separately makes catch at board 7 by way of cam plate 3. It is important for the present embodiment that the threaded sleeve 11 is stationarily arranged in the normal case. In this case it is displaceable in a longitudinal direction of spindle 5 only if the force exerted on board 7 is capable of overcoming the depression spring 9. To this end, an extension 31 provided at the threaded sleeve 11 projects into a stationary guiding groove 32. Said guiding groove 32 has the shape of a circle segment so that the attachment 31 can follow the tilting movement of board 7 about axis 89. In order that the end 29 of spindle 5 need not follow the rotation of spindle 5, it is rotatably mounted in this spindle. An extension 33 is telescopically guided in a tube 35, and gear 13 sets the hollow spindle 5 rotating through said tube because tube 35 is unrotatably yet axially displaceably mounted with respect to spindle 5. Advantageously, the packaging problem is solved by an overruling depression function arranged in parallel to the ball screw.

More specifically, the seventeenth embodiment according to FIG. 17 operates as follows. The resetting/force introduction at the accelerator pedal 7 takes place by way of ball screw (KGT) wherein the threaded sleeve 11 is unrotatably guided in the housing and drives spindle 5. The guiding groove 32 allows an arcuate movement (due to the circular movement of the pedal 7 about axis 89) of the threaded sleeve 11 if the accelerator pedal 7 is depressed in an overruling fashion. Tube 35 is connected to the toothed wheel in a torque-resistant manner, and the pedal movements transmitted by the pedal can be compensated e.g. by a crowned hexagon 36. There is also a possibility of torque transmission (e.g. hexagonal profile 37) in the spindle 5 that is driven by the motor 1 by way of gear 13 and tube 35. The extended spindle can be overcome by the parallel-arranged overruling depression spring 9 in an emergency situation (e.g. blocking of the gear or the motor). In the normal overruling pedal depression, the stiff spring 9 fixes the threaded sleeve 11 axially in its position, and the motor is rotated contrary to its direction of drive by way of spindle 5. The end 29 forming a head is unrotatably connected to pedal 7 and is detachable axially from the spindle 5 in the case of a malfunction.

Figure 18:
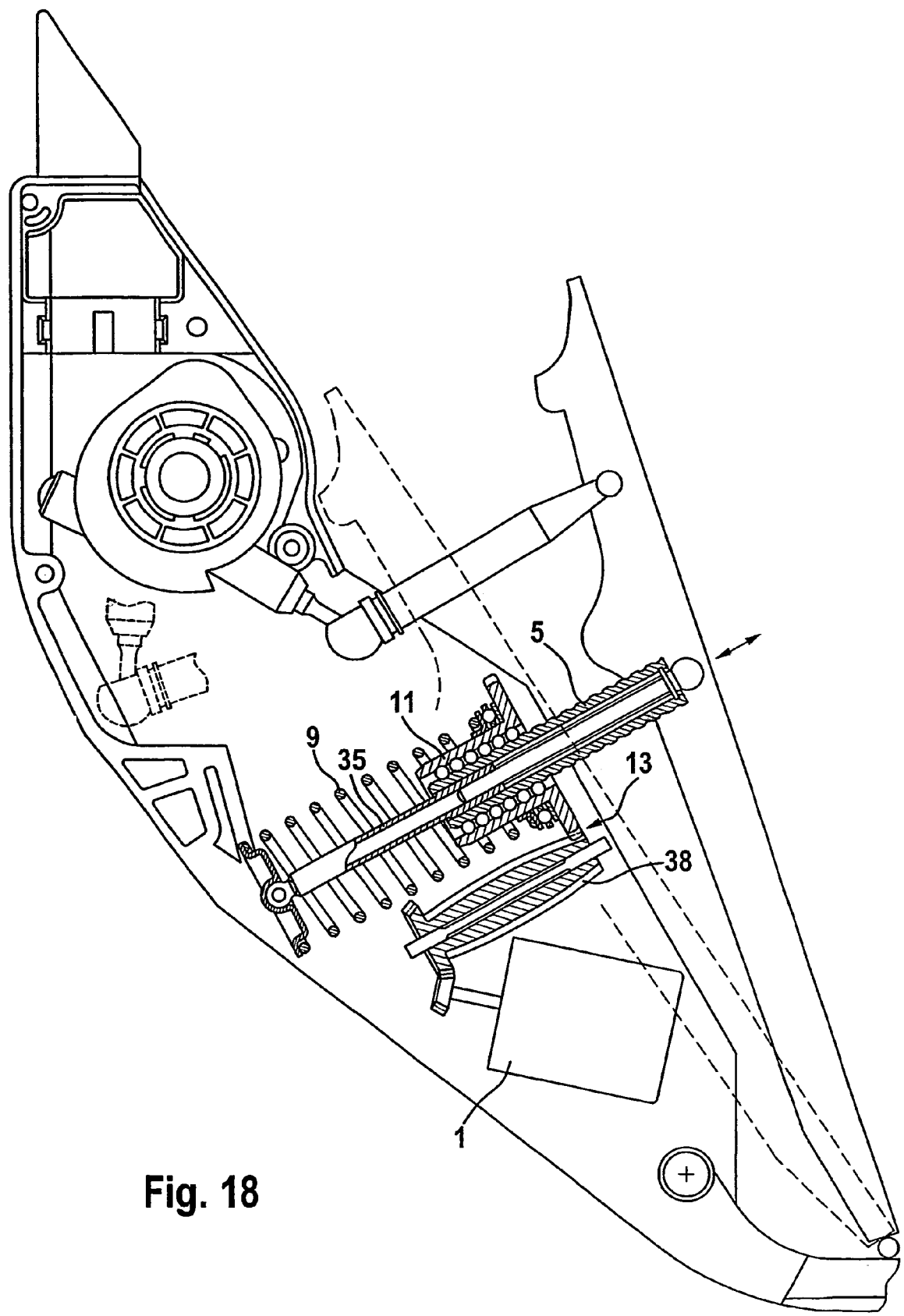
FIG. 18 shows an eighteenth embodiment.

Embodiment 18 According to FIG. 18

FIG. 18 shows a modification of the seventeenth embodiment according to FIG. 17 as an eighteenth embodiment. In this embodiment, gear 13 has a curved toothed wheel (tooth barrel) 38 rendering it possible to displace the threaded sleeve 11 along its longitudinal axis in opposition to the force of the return spring 9, without moving out of engagement from the toothed wheel 38. In the embodiment of FIG. 18, tube 35 is arranged so as to be pivotable about its end but otherwise immovable with respect to the housing. As the threaded sleeve 11 is rotating in the present embodiment, provisions must be made that the spindle 5 is mounted unrotatably yet displaceably in its longitudinal direction in tube 35 (e.g. by a square). The result is as follows: the resetting/force introduction at the accelerator pedal 7 occurs by way of ball screw (KGT) wherein the threaded sleeve 11 is driven by a tooth barrel 38 and driven by the electric motor 1. The tooth barrel allows overcoming the spindle drive (pendulum motion), while a simultaneous drive is given.

The following advantages are achieved in total for the embodiment according to FIGS. 16a to 18. Inexpensive, simple parts, modular construction, safe concepts, small installation dimensions (only 2× stroke and ball nut height). Especially in the embodiment according to FIG. 18, no drive torques are introduced into the spindle.

Figure 19A:
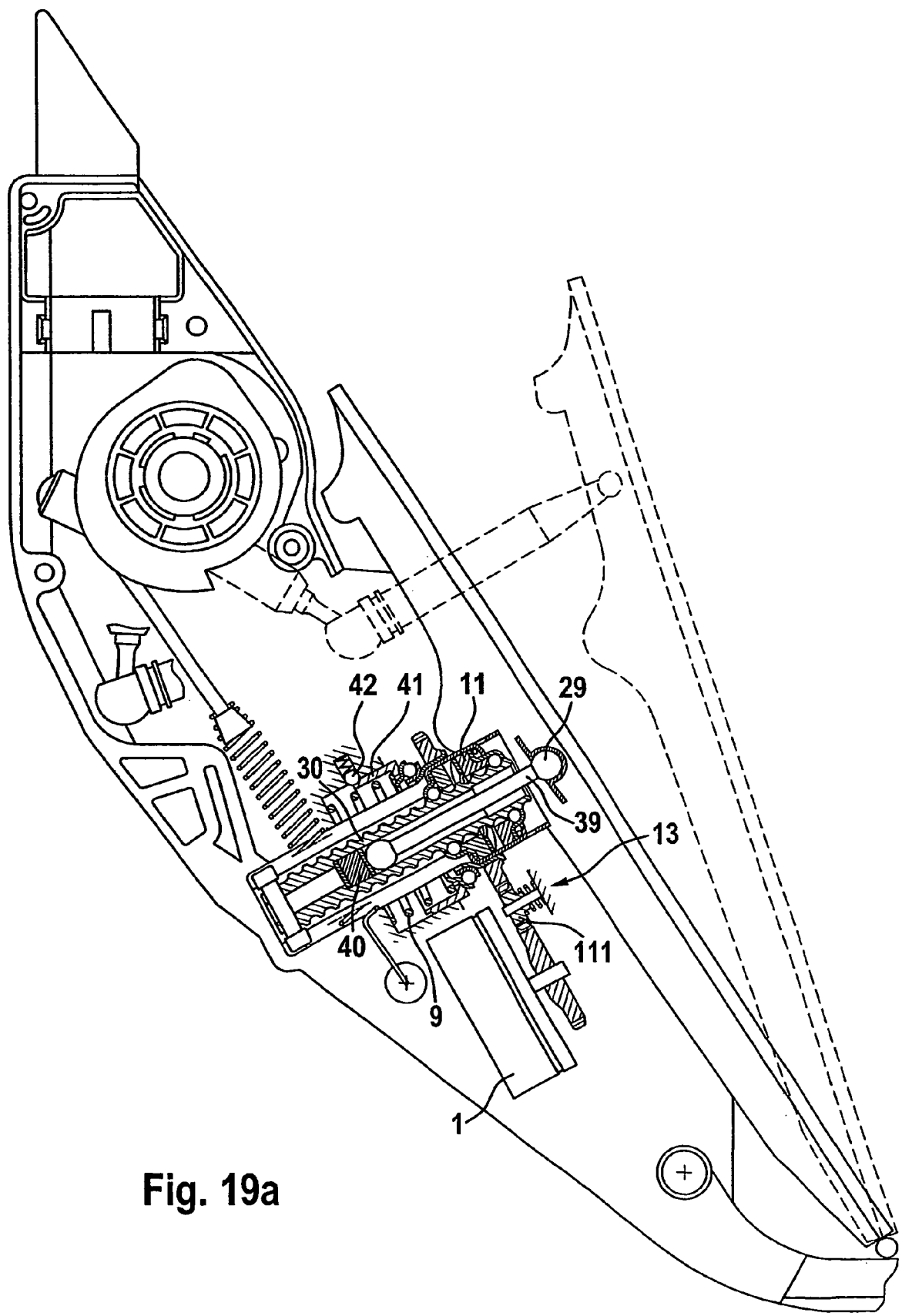
FIGS. 19a and 19b show a nineteenth embodiment.
Figure 19B:
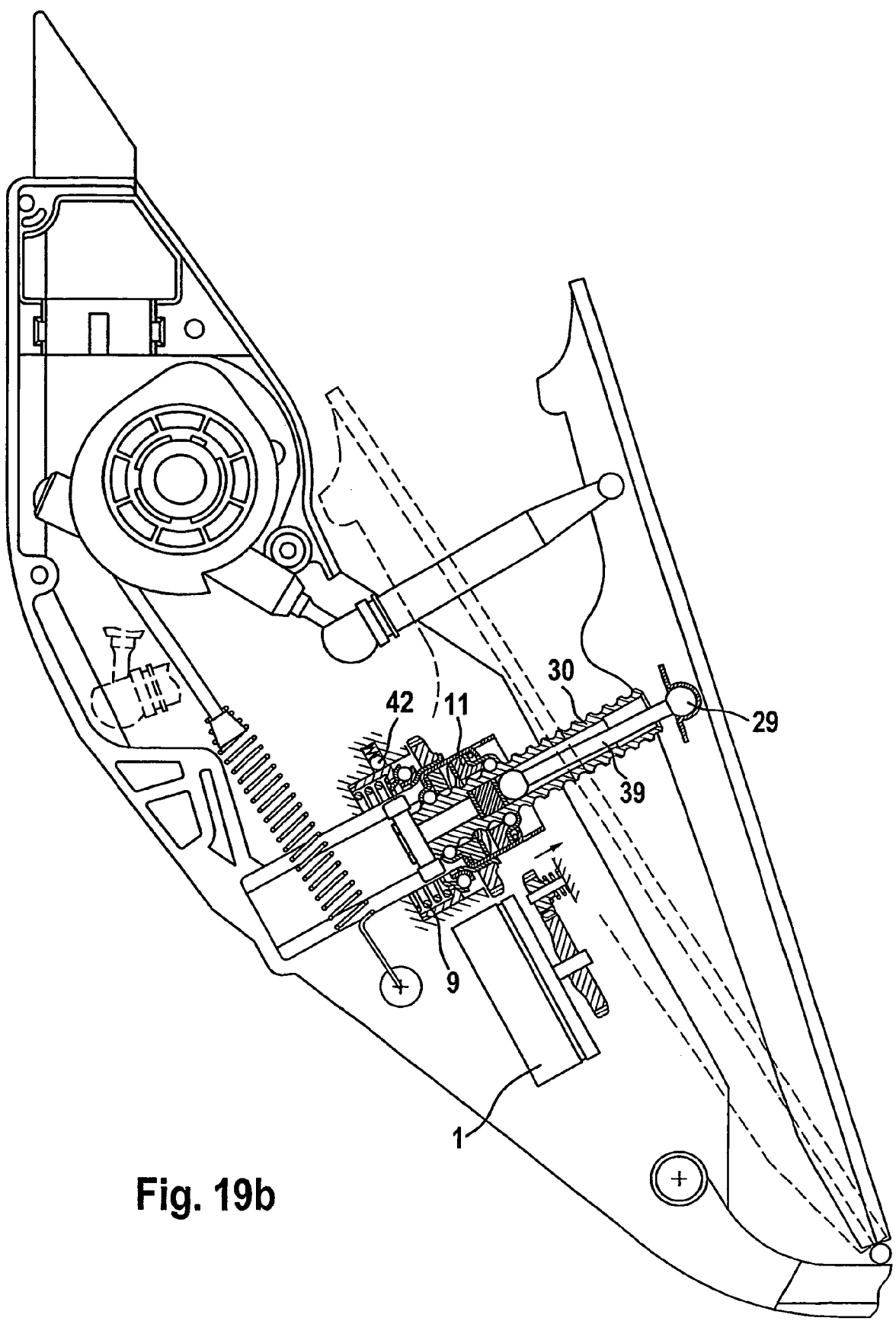

Embodiment 19 According to FIGS. 19a and 19b

FIGS. 19a and 19b show a nineteenth embodiment. In FIG. 19a, the device of the invention is shown in its normal condition, while FIG. 19b shows the embodiment of the invention in the condition of overruling depression where the force exerted by the returning device and directed in opposition to the force of the foot is overcome by the driver. The embodiment according to FIGS. 19a and 19b is very similar to the embodiments of FIGS. 17 and 18, so that the description indicated is similarly applicable to the present embodiment.

The spindle 5 in the present case is mounted so as to be displaceable in its longitudinal direction, yet unrotatable. Its ball-shaped end 29 can adapt without difficulties to the angle of inclination of board 7 with respect to an actuating rod 39 disposed in the spindle 5. Rod 39 bears against the bottom of the cylindrical recess in spindle 5 by way of a noise damper 40 that is formed of an easily flexible element. Threaded sleeve 11 is set rotating by means of a motor 1 and a gear 13. The threaded sleeve 11 is mounted so as to be rotatable and non-displaceable in its normal condition in an axial direction of spindle 5. It is supported through a ball bearing on a locking sleeve 41 being locked in position by a preloaded ball 42.

It is essential for the present embodiment that the threaded sleeve 11, due to a force being correspondingly applied to the board of pedal 7, is displaceable along with spindle 5 in its longitudinal direction. By way of rod 39 and the noise damper 40, the spindle 5 in FIG. 19 is entrained to the left. Because the threaded nut 11 is possibly retained by way of the motor 1 and the gear 13 in an emergency situation, it cannot escape the force exerted by spindle 5 by a rotation and is also pulled off to the left. On account of the force so exerted, the locking sleeve 41 is detached from its locked condition with regard to ball 42 and displaced against the force of the return spring 9. The result is that the toothed engagement of the threaded sleeve 11 with gear 13 is removed, and subsequently sleeve 11 is no longer hindered in its rotation.

From this results the following mode of operation of the embodiment of FIG. 19a and 19b. Upon quick application of the accelerator pedal, the driving motor is uncoupled from the ball screw (KGT) 13. Starting from a constructively predefinable force, the ball screw is displaced so that the motor 1 is no longer in engagement, and the threaded sleeve 11 is more easily rotatable. Responsible for this condition are locking elements, e.g. spring-loaded ball(s) 42 which release the ball screw axially starting from a defined force. The compression spring as overruling depression spring 9 pushes the ball screw back into its initial position. Further, there is a possible passage in the stroke direction in case the ball screw gets jammed (see FIG. 11). A possible intermediate wheel 111 facilitates finding the tooth gaps. Ball-type end 29 compensates the rotation of the accelerator pedal with respect to the ball screw.

Figure 20:
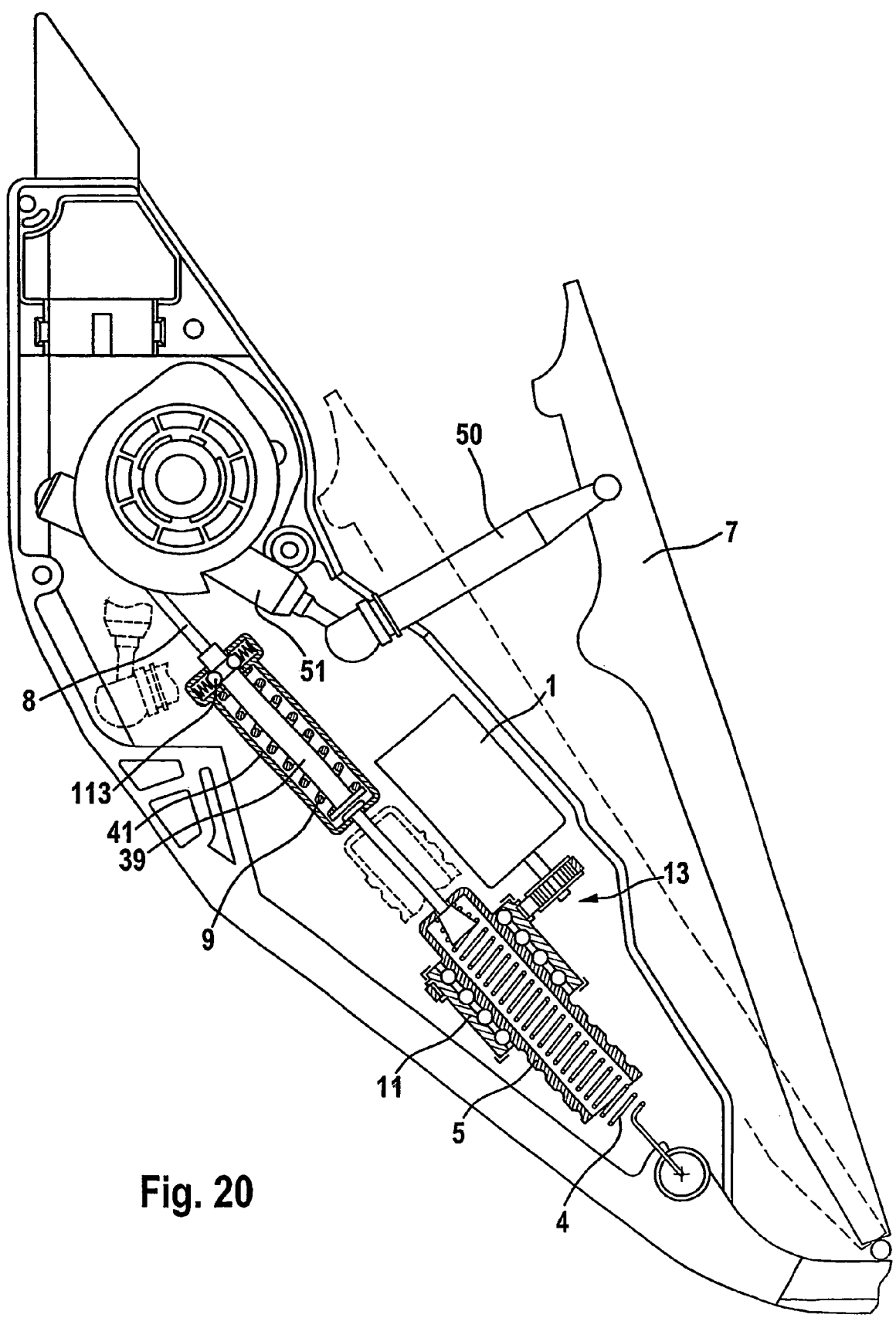
FIG. 20 shows a twentieth embodiment.

Embodiment 20 According to FIG. 20

In the twentieth embodiment according to FIG. 20 the retracting spring 4 and the overruling depression spring 9 are connected in series not only in terms of effect but also spatially. When correspondingly exerting a force on the board of pedal 7, it is rendered possible to overcome the force returning the board 7. This returning force is exerted by a motor 1 on a threaded sleeve 11 by way of a gear 13, as described already in connection with FIG. 16. It is essential in the embodiment of FIG. 20 that the overruling depression spring 9 is retained in a locking sleeve 41. As soon as the force exerted on the pull-back rope 8 by way of the board 7, through the linkage 50, 51, and the cam plate 3 is of a sufficient amount, the actuating rod 39 connected to rope 8 will disengage from the locked connection with locking sleeve 41. The locked connection is effected by means of two balls 113 axially preloaded in the locking sleeve 41 with respect of the actuating rod 39. The overruling depression spring 9 enabling overruling pedal depression is chosen to be so stiff that it can move the actuating rod 39 back into its locked position after overruling pedal depression is terminated.

The principle presented herein in connection with FIG. 20 permits a quick depression (for accelerating) or in an emergency situation when the mechanism is blocked. A blocking mechanism (39, 113) maintains the flow of forces between rope and compression spring 8, 9 up to a defined force. When this retaining force is exceeded (function of overruling depression is desired), the force system will collapse, the locking elements 113, e.g. one or more force-loaded balls, will release the locking member 39 and thus enable a slack of the rope to allow the acceleration action. The overruling depression spring 9 is used to position the locking member in its initial position. In a particularly advantageous manner, the packaging problem is solved. Small installation dimensions are very important in this embodiment.

Figure 22:
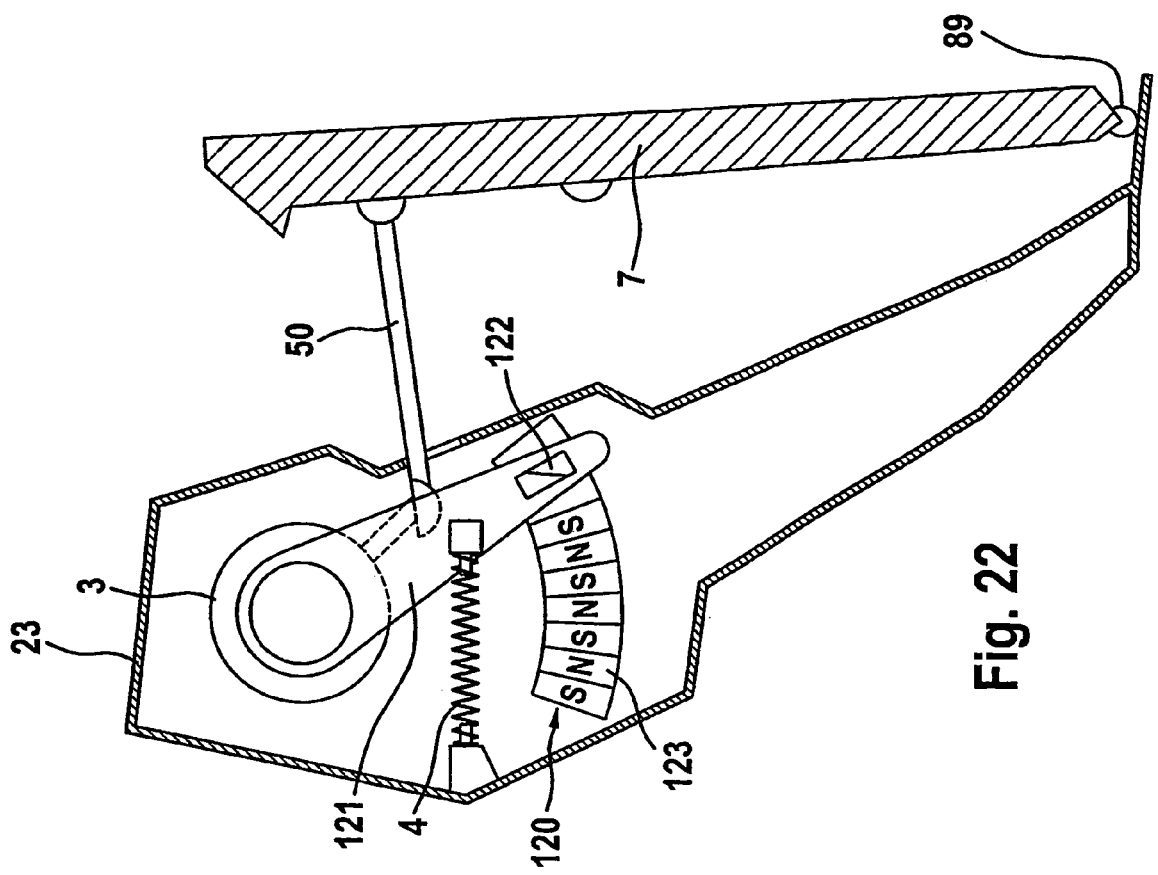
FIG. 22 shows a twenty-second embodiment modified with respect to the twenty-first embodiment.
Figure 21:
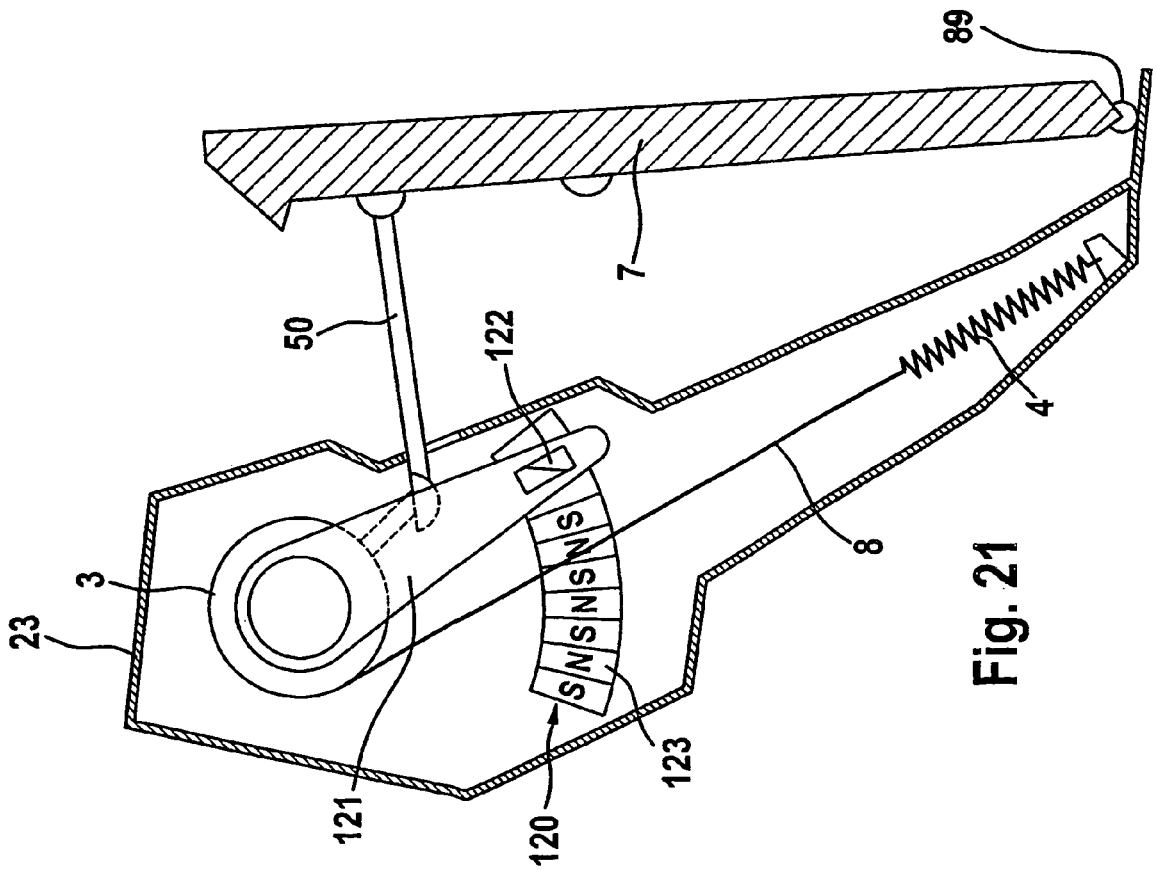
FIG. 21 shows a twenty-first embodiment.
Figure 23:
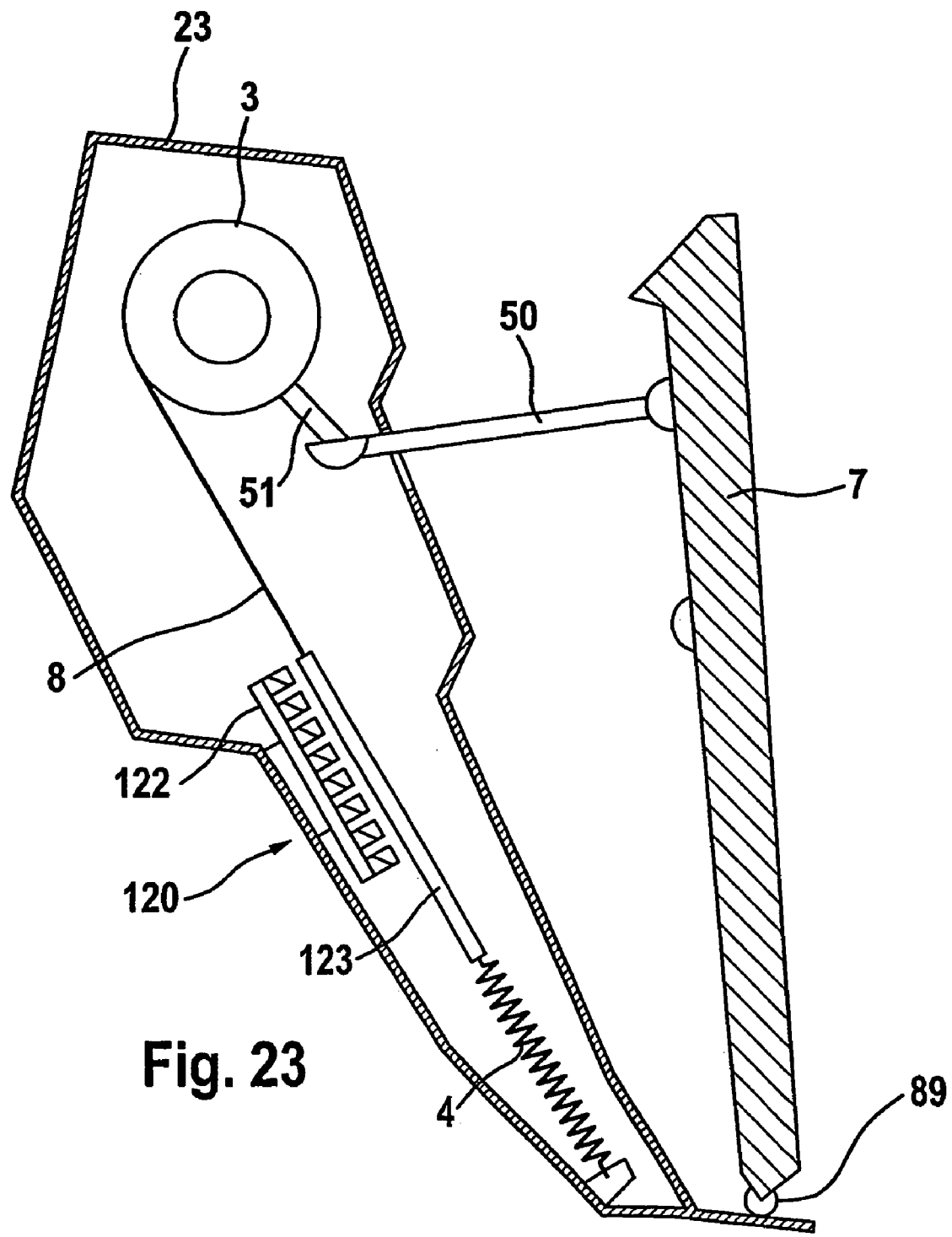
FIG. 23 shows a twenty-third embodiment.

Another simplification can be achieved by the invention by means of the embodiments according to FIG. 21, FIG. 22 and FIG. 23.

Embodiment 21 According to FIG. 21

With regard to the normal mode of operation of the pedal module, this module shows the usual design, as described hereinabove already several times. A pedal board 7 is pivoted at the housing 23 of the pedal module alongside the direction of rotation 89. The conventional retracting spring 4 is attached with its one end to the housing 23 and with its other end to a pull-back rope 8, with said pull-back rope 8 in turn making catch at the periphery of the cam plate 3. In turn, a turning lever not shown in FIG. 21 is attached to the cam plate 3, and a coupling lever 50 is articulated at the turning lever, as has been explained already several times with respect to further embodiments of the present invention. This way the retracting spring 4 applies a restoring force to the pedal 7 by way of rope 8, cam plate 3, turning lever 51 and coupling lever 50.

In the embodiment illustrated in FIG. 21, the Force-Feedback force is generated by way of a segment EC drive preferably configured as a linear motor 120. A curved reaction bar 123 provided with magnetic fields of alternating polarity is arranged in the housing 23. The magnetic fields are alternating in the longitudinal direction of the reaction bar 123. An inductor 122 is fastened to a lever arm 121 connected to the cam plate 3. The lever arm 121 and the inductor 122 are configured such that the inductor 122 moves over the magnetic fields upon rotation of the turning lever 121. When the inductor is energized, magnetic forces will act between the inductor and the magnetized reaction bar 123. These magnetic fields act as a field of traveling waves which entrains the inductor 122 and, hence, the cam plate 3 connected to the inductor. This way, a reaction torque applied to the cam plate 3 is generated which causes an increase in pedal force. The normal function is continuously maintained when the inductor is not energized. In the embodiment of FIG. 21, the components necessary for providing the additional controlling force (FFP force) can be added retroactively to the pedal module 23 of standard design.

The major advantage of the embodiment of FIG. 21 involves that there is no need for an additional electric motor, a gear, a coupling, and safety devices, which render possible to depress the pedal 7 in an overruling manner even if the source of force outputting the additional controlling force is blocked. Because there are no undercuts between the inductor or the turning lever 121 and the reaction bar 123, it is not possible that this source of force can be blocked mechanically. Because the turning lever 121 runs in parallel to the non-illustrated turning lever (51) of the cam plate 3 and the field of wandering waves of the reaction bar 123 acts with the same force on the inductor 122 independently of the position of the inductor 122, there is no need for controlling devices having to adapt the controlling force (FFP force) to the position of the turning lever 121 or the cam plate 3. When the reaction bar 123 is energized, the field of the reaction bar 123 will make catch directly at the inductor 122 so that no additional clutch is necessary. By correspondingly supplying the reaction bar 123 with current, it is moreover possible to adapt the amount of the additional controlling force (FFP force) to the respective requirement. Thus, e.g. the additional controlling force can be selected to be higher when the pedal has been depressed relatively far, and consequently a high resetting force is anyway provided by the retracting spring 4 or e.g. the driver depresses the pedal too long in an overruling manner. The additional controlling force can, however, also be changed in such a way that it rises the longer it lasts until the actual speed reaches the adjusted nominal speed.

Embodiment 22 According to FIG. 22

Embodiment 22 shows a similar design as embodiment 21, with the exception that the construction is somewhat simplified and needs fewer components than shown in FIG. 21. In this variant of the embodiment according to FIG. 21, the normal function is also illustrated by way of the segment EC-drive in that the restoring springs 4 (if necessary, a double spring) act on the turning lever 121. The pedal restoring spring 4 shall ensure the resetting of the pedal when the drive fails. The hysteresis performance is adjusted in contrast to the standard pedal module by way of the segment EC-drive 120.

Like in FIG. 21, the inductor 122 in FIG. 22 is coupled to the cam plate 3 by way of the turning lever 121. This is, however, not necessary as regards the invention. A simple design is achieved when the reaction bars 123 have a straight shape as e.g. shown in FIG. 23 rather than being curved like in FIG. 21. In this case, cam plate 3 and lever 121 are not required. The coupling lever 50 in FIG. 22 will then make catch directly at the inductor 122 on which the pedal restoring spring (possibly a double spring) will act in opposite direction. If it is desired to have a dependency between pedal travel and restoring force corresponding to the cam plate 3, this can be achieved by a corresponding arrangement of the magnetic fields in the linear motor or by a corresponding energization of the linear motor.

Finally, it is possible to also dispense with the restoring spring 4 because normal resetting is also done by means of the linear motor 120. However, it is then necessary to detect the position of the pedal by means of a sensor in order that a force is exerted on the pedal 7 in a restoring direction that corresponds to the restoring force of the obsolete restoring spring 4.

The following advantages are achieved by the embodiments of FIGS. 21 and 22:

Fail-safe performance: it is always possible to overrule the drive. Only low additional inertia forces are produced upon dynamic overruling pedal depression. The system is stiff. There is a variable resetting force in the FFP function. A variable pedal characteristics can be realized in the basic function.

Embodiment 23 According to FIG. 23

In the embodiment 23 according to FIG. 23, again a segment drive 120 is used so that the statements made in connection with the embodiments 22 and 23 apply analogously also in the present embodiment. As can be seen in FIG. 23, there are only slight modifications to be added compared to a conventional pedal module. FIG. 23 displays the usual design of the pedal module repeatedly described in the previous examples, which shall not be explained once more. Differing e.g. from the embodiments 2 or 9 in FIG. 2 or 9, a segment drive 120, instead of an electromechanical actuator, is inserted into the pull-back rope 8 ahead of the restoring spring 4. The reaction bar 123 is inserted between pull-back rope 8 and restoring spring 4, while the inductor 122 of the reaction bar 123 is arranged oppositely and fixed in the pedal module.

In the solution illustrated in FIG. 23, the Force-Feedback force of the Force-Feedback pedal (FFP) is generated by way of a linear drive 120. A reaction bar 123 is fastened to the pull-back rope 8. When the inductor 122 is energized, magnetic forces act between the inductor and the magnetized reaction bar. This way a reaction torque making catch at the cam plate 3 is produced and causes an increase of the pedal force. The normal function of the pedal module is maintained as before when the inductor 122 is not energized.

It is possible to present also the normal function by way of the linear drive. The pedal restoring spring 4 shall ensure pedal resetting in the event of drive failure. The hysteresis performance is adjusted by way of the linear drive in contrast to the standard pedal module.

The solution of the invention as shown in the embodiments in 21 and 22 according to FIGS. 21 and 22 consists in using a segment EC-drive, among others. A drive of this type can be a linear motor. By means of a linear motor it is possible to do without the otherwise necessary conversion of a rotation of a motor shaft into a linear movement by a gear. Overruling pedal depression is easily possible in this case. Thus, there is no need for a separate spring 9, as shown in FIG. 10, where a spring arranged in the longitudinal direction of the spindle allows an escape of the spindle in the event of overruling depression by the pedal.

The following statements can be made with respect to the linear motor used. A linear motor is a new driving element. Comparable to the prior-art rotating electric motors, the linear motor can be manufactured as synchronous linear motor and asynchronous linear motor. Of the two mentioned types, the asynchronous linear motor is of more importance. Principally, however, both types can be used in the present invention.

The device of the invention places high demands on dynamics, speed and accuracy with respect to the position of the elements moving towards each other. Conventional drives of linear or rotational operation are often unable to achieve the sufficient degree of accuracy. Mechanical transmission elements such as a ball screw, toothed rack or synchronous belt moreover involve additional system-relevant mass inertia torques and losses caused by friction. When accelerating and slowing down, a considerable portion of the available torque must be spent on compensation. Especially with highly dynamic and simultaneously exact motional actions, disadvantages of the mechanical transmission members such as mechanical backlash, elasticities and wear are especially in the focus. These shortcomings can be eliminated by the use of a linear motor.

The following applies to the design of the linear motor. When imagining a stator iron pack of a conventional asynchronous motor compressed under a press, a flat double-sided iron pack is obtained. The individual metal sheets of the stator pack halves are slotted like a comb (double inductor comb). The stator winding (primary winding) is accommodated in the grooves. Disposed between the stator halves is the likewise extended rotor bar. This so-called reaction bar is made of copper or aluminum material. The stator pack design may, however, also be one-sided (single inductor comb). Compared to the double inductor comb, the electric and mechanical conditions become less favorable though. To prevent a magnetic pull between single inductor comb and reaction bar, a lamellar iron pack is opposed to the one-sided stator sheet-metal pack.

The reaction bar is guided between them. Thus, the asynchronous linear motor represents an open driving system compared to the conventional asynchronous motor. In single-rail tracks, usually the supporting body additionally takes over the role of the reaction bar.

The stretched stator design achieves a flat magnetization plane. The magnetic rotating field becomes a field of wandering wave (transverse wave), therefore the designation 'traveling wave motor'. When the field of wandering waves intersects a flat plane conductor (reaction bar), eddy currents are produced there. The field of wandering waves and the magnetic field of the eddy currents are vertical to each other according to the lever relationship rule so that forces (torques) are generated. When imagining the rotor as stationary and the stator as rotating in the normal three-phase asynchronous motor, yet the electric energy is supplied to the rotating stator, the direction of the rotational field in the stator is opposite to the mechanical direction of motion. The same practical case prevails in the asynchronous linear motor: the field of wandering waves is opposed to the mechanical forward motion.

Due to this construction, it is not necessary to interpose gears or other mechanisms. The construction of the primary and secondary part is relatively simple. Cooling occurs quickly in spite of increased instantaneous local heat.

The linear motor can be designed as a suspended system in the present case of application, with the result of losses due to friction approaching zero. However, there is also the possibility of keeping the inductor spaced from the reaction bar by mechanical means, e.g. by way of a linear sliding bearing or roller bearing. In the invention, a linear motor working as a step motor can also be used, as is described e.g. by Lindner, Brauer, Lehman in the Handbook of Electrical Engineering and Electronics, publishing house for handbooks Leipzig, 1991, pages 233 to 236.

Embodiment 24 According to FIG. 24a to FIG. 24e

Figure 24C:
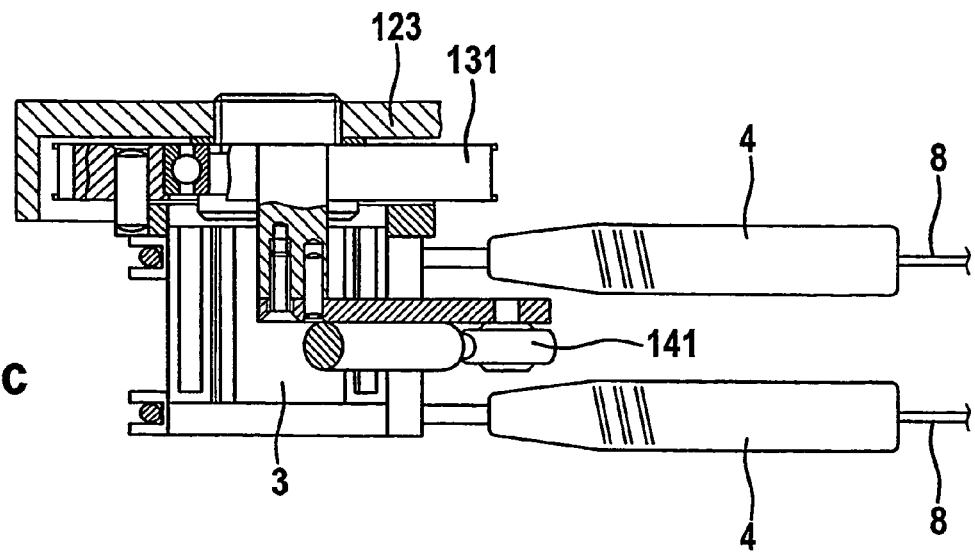
Figure 24D:
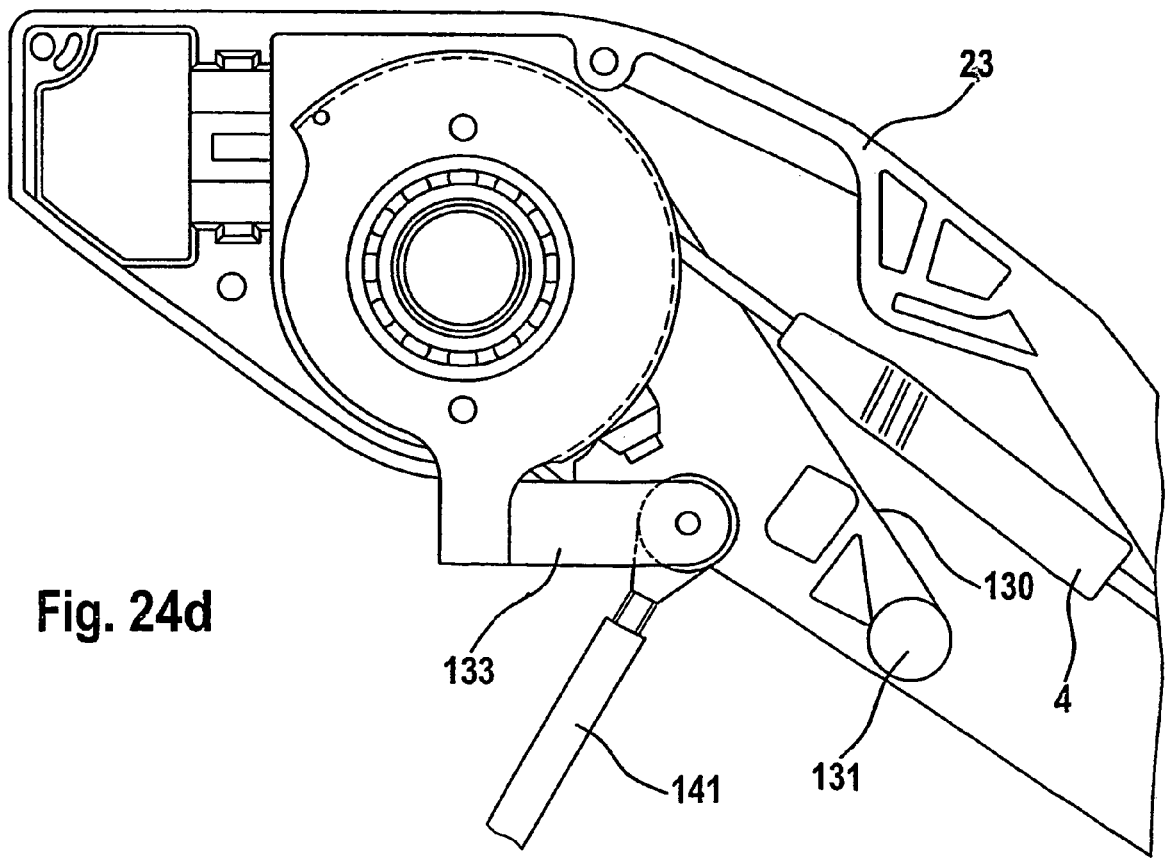

In the embodiment according to FIGS. 24a to 24e, the pedal module 23, as indicated in FIG. 24a, has the usual design with respect to its normal function, as has been explained several times in the embodiments hereinabove. Reference is made to these descriptions herein. The reference numerals associated with the individual components described hereinabove have also been used in the present embodiment so that the above descriptions apply to FIGS. 24a to 24e as well. In the embodiment described at this point, two parallel-connected retracting springs 4 make catch at housing 23 and act in the usual manner on the non-illustrated pedal board by way of the pull-back ropes 8 and the cam plate 3 and by way of the usual levers (turning lever 51 and coupling lever 50) not illustrated in FIG. 24.

Rigidly connected to the cam plate 3 is a top conveyor drum 131 on which a band 130 is wound. Below the cam plate 3, a connection shaft 134 is pivoted in the housing 23, by which a bottom conveyor drum 132 is rigidly connected. The connection shaft 134 and, thus, the bottom conveyor drum 132 can be rotated by an electric motor 1 by way of a gear 13 and a stiff spiral spring 97 in such a manner that the band 130 is wound up on the bottom conveyor drum 132 or can be unwound from it. To this end, the output of motor 1 acts by way of a gearwheel 136 pivoted on the connection shaft 134 on the outside end of spiral spring 97, whose inside end is rigidly connected to the connection shaft 134 (see FIG. 24b).

The function of the spiral spring 97 will be explained in detail hereinbelow. For a simplified review, it is sufficient to look at the spring 97 as a stiff component rigidly connecting the connection shaft 134 to the gearwheel 136.

Mode of Operation of the Embodiment

In the solution illustrated in FIGS. 24a to 24e, the pedal angle at which the FFP function intervenes is defined by way of a variable band length. Band 130 is fastened to a top conveyor drum 131 and a bottom conveyor drum 132. The Force-Feedback pedal force (FFP force) is introduced into the pedal board 7 (not shown) by way of the top conveyor drum and the coupling arm 133 attached thereto, what can also be carried out by way of the usual combination of turning lever 51 and coupling lever 50 though. The band length is varied by way of the bottom conveyor drum 132 and the connected motor-and-gear unit 228. The motor-and-gear unit 228 basically comprises an electric motor 1 and a gear 13.

When the FFP function is disabled, the band 130 is unwound from the bottom conveyor drum 132 so far that the band will not be tensioned, not even at a full pedal stroke.

When the FFP function is switched on (for example, when the actual speed reaches the nominal speed), the band 130 is wound up by means of the motor-and-gear unit 1, 23 and the connected bottom conveyor drum 132, thereby impressing a torque into the top conveyor drum 131. The FFP force at the pedal board is obtained from this torque and from a lever arm resulting from a coupling arm 133 that is connected rigidly to the cam plate 3 or the upper conveyor drum 131. When the motor 1 is switched on (the nominal speed has been reached or almost reached) the motor will wind the band initially without exerting force on the pedal, until the band is tightened. When the driver applies the pedal such that the nominal speed is exceeded, the motor 1 becomes active in the way of an additional controlling force. When the driver tends to depress the pedal in an overruling manner, he/she must try to unwind the band 130 in opposition to the force of the motor and, in doing so, turn the rotor of the motor in opposition to its previous moving sense. The path of force extends via the top conveyor drum 131, the band 130, the bottom conveyor drum 132, the connection shaft 134, the spring 97, hollow shaft 135 (which is rigidly connected to the gear wheel 136) and the gear 13 to the rotor of the motor 1.

To prevent damage of the FFP module at high actuating speeds, causing the motor to die due to its inertia or a possible blocking, and to ensure the basic function of the accelerator pedal, a safety function is provided whose principal mode of operation has already been explained several times in the previous embodiments. In the construction illustrated in FIGS. 24a to 24e, the possibility of overruling depression of the pedal even in the event of the motor or the gear blocking is integrated into the motor-and-gear unit 1, 13. The connection shaft 134, whereat the bottom conveyor drum 132 is disposed, is connected by way of the spiral spring 97 to a hollow shaft 135 at which, in turn, the gearwheel 136 is fastened. The motor torque for generating the FFP force is thus introduced by way of the gear range 13 into the hollow shaft 135 and from there by way of the spiral spring 97 into the connection shaft. This construction is similar to the design described in connection with FIG. 7 so that the statements made therein apply accordingly.

The purpose of the spiral spring 97 is that this spring collapses starting from a defined instant and, thus, the pedal can be actuated further, even if the motor is still at standstill due to its mass inertias or a defect. In view of the usual pedal forces that serve for restoring the pedal, the spiral spring 97 can be considered as rigid, that means it acts as if the hollow shaft 135 was integrally connected to the connection shaft 134. Only when the actuating force exerted on the pedal exceeds a defined threshold will the spring give way, and the pedal can this way be depressed for increasing the vehicle speed.

The safety function with the spiral spring 97 can also be integrated into the coupling of the top conveyor drum to the cam plate 3 of the standard pedal module. To avoid unwinding of the band in the event of a dynamic overruling depression of the pedal or a malfunction of the motor, a stop 138 is provided at the cover of the housing 23, which limits the rotation of the connection shaft in the direction of unwinding the band.

More specifically, when the function of the FFP is enabled, the band 130 is wound up to a certain extent by the motor 1 by way of gear 13, while the pedal force exerted by the driver is directed in such a way that it tends unwinding the band again. When the force exerted on the pedal is of so great a magnitude that the motor is unable to follow it in the direction of unwinding the band, the spiral spring 97 will yield on account of the sufficiently high torque between connection shaft 134 and hollow shaft 135. This will twist the hollow shaft with respect to the connection shaft. As mentioned hereinabove, the length of the band depends on the position of the pedal shortly before the nominal value is reached.

All components of the FFP module are attached to the housing cover so that it can simply be slipped as an assembly on the standard pedal module in an 'add-on' solution. The torque transmission from the top conveyor drum 131 into the cam plate 3 of the standard pedal module takes place by way of a form lock. Other types of connection for torque transmission are possible and can also be used with regard to this invention.

In the present embodiment, the force is coupled from the housing 123 to the pedal by way of a coupling arm 133 connected to the top conveyor drum 131 rather than, as usual, by way of a coupling lever connected to the cam plate 3. The band may also be replaced by any other suitable component, which can transmit only tensile forces but no pressure forces, e.g. by means of a rope. It can be seen from FIG. 24c that the top conveyor drum 131 is connected to the cam plate 3 by way of a screw coupling. The pull-back ropes 8 make catch at the cam plate 3 by way of the restoring spring 4 in the usual manner. The top conveyor drum is equipped with a coupling arm 133, by which the force is transmitted to the pedal (not shown) by means of a linkage or rope 141.

Figure 24E:
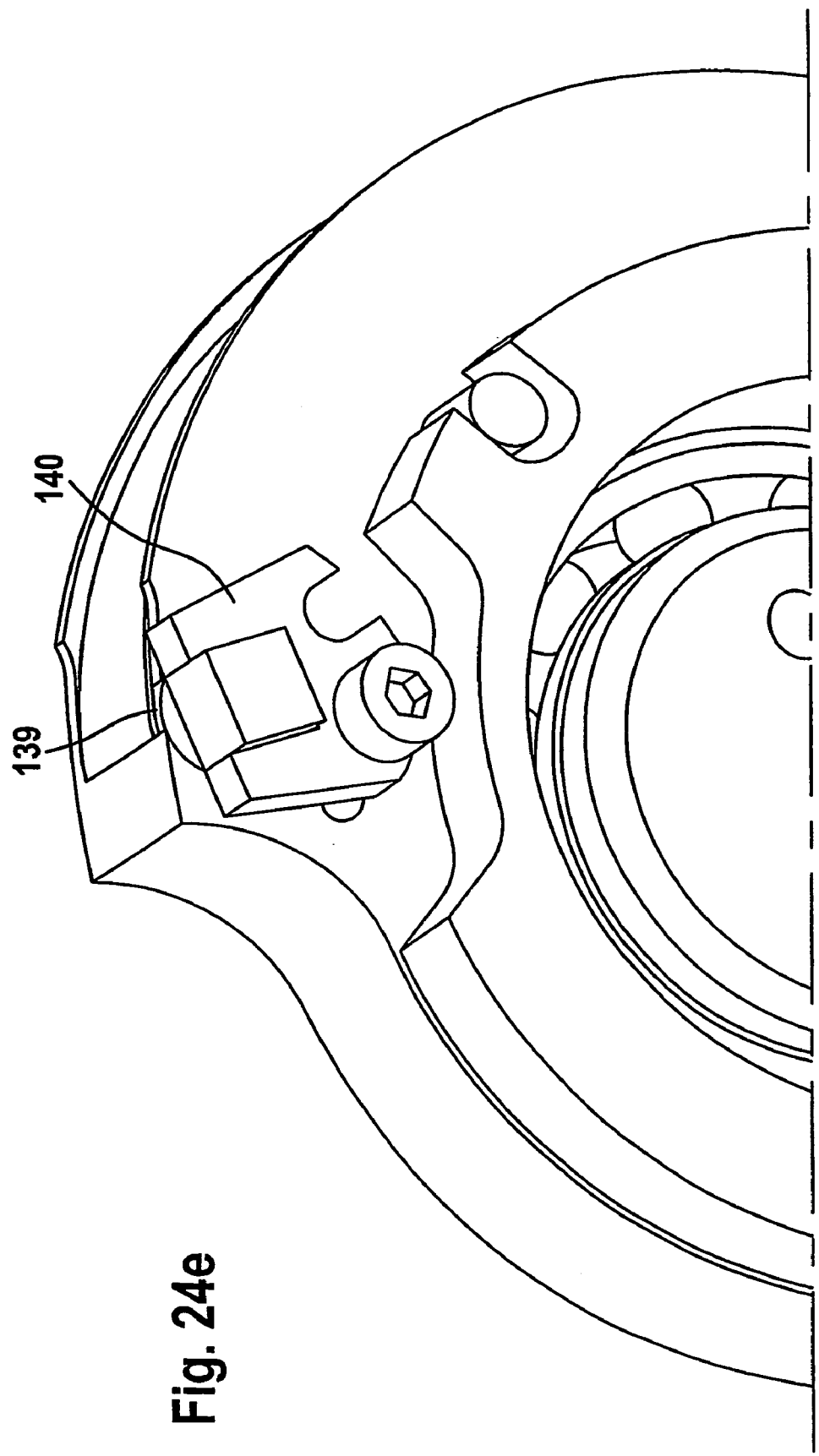

To be able to adjust the band after the assembly (add-on) of the module to the pedal module in the correct length, the mechanism illustrated in FIG. 24e was integrated into the top conveyor drum. The band running around the top conveyor drum 131 is threaded up into the groove of a dowel pin 139. This pin can now be turned by a screw driver until the band has the necessary tension. To fix the pin in its position, the dowel pin has a polygonal profile. A washer 140 that is screwed to the conveyor drum 131 grips around this polygonal profile. To fix the washer 140 at the conveyor drum in very fine graduations, it has several bores. Several bores are also incorporated in the conveyor drum, whereby sufficient accuracy of positioning is reached for the dowel pin. The tensioning device can be integrated into the top conveyor drum, as illustrated in FIG. 24e, or into the bottom conveyor drum.

Advantages

Fail-safe performance: When the gear or motor is blocked, the pedal can be applied further with an increased force. The spiral spring will collapse in the event of dynamic overruling pedal depression, and additional inertia forces will not occur.

Stiff system.

Variable restoring force in the FFP function by controlling the motor forces. Function of overruling pedal depression by means of spiral spring.

Assembly of the complete module as 'add-on' module and band length compensation.

Embodiment 25 According to FIGS. 25a to 25d

The following embodiment 25 shows a similar design as embodiment 24.

Figure 25A:
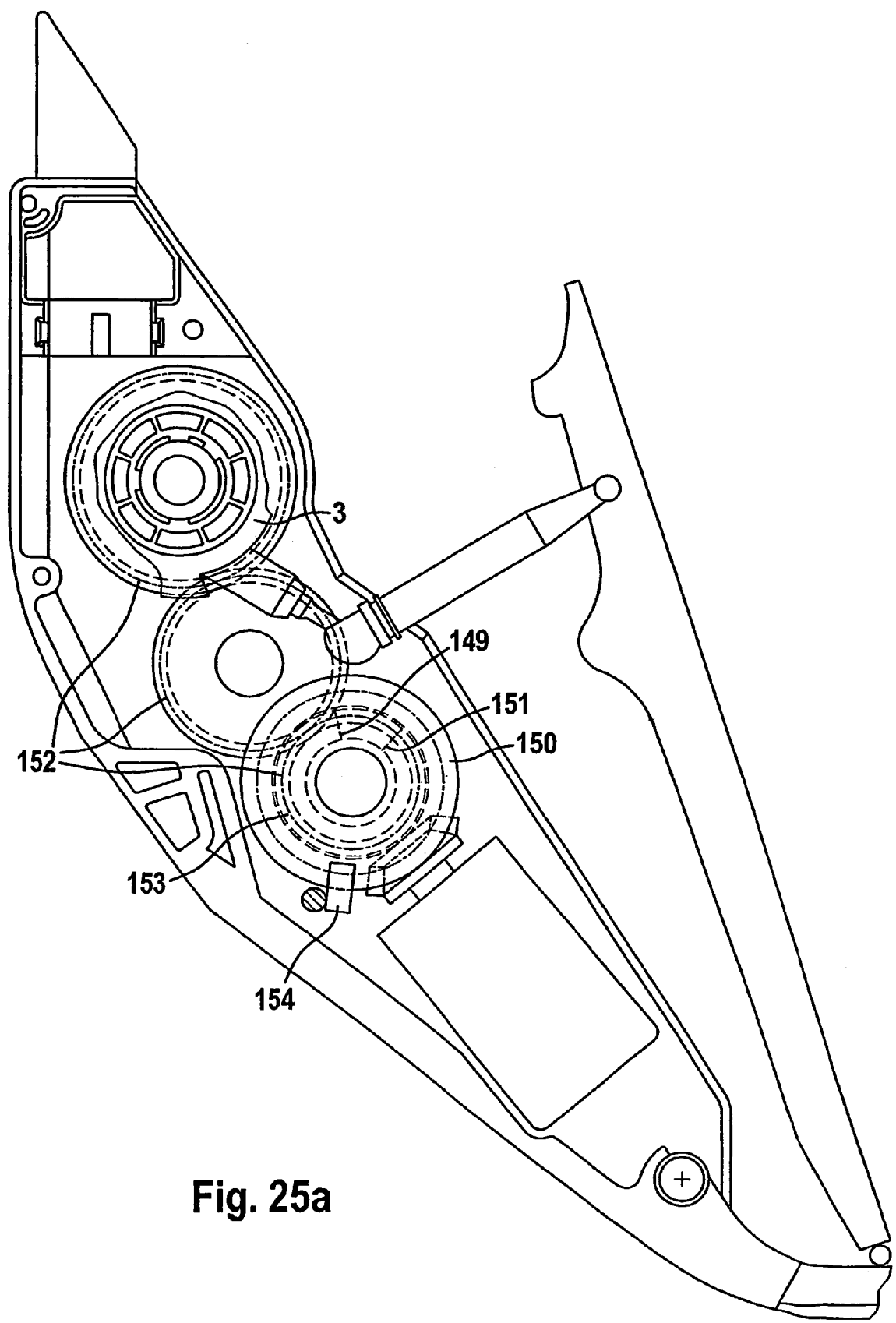
FIG. 25a to FIG. 25d shows a twenty-fifth embodiment.
Figure 25B:
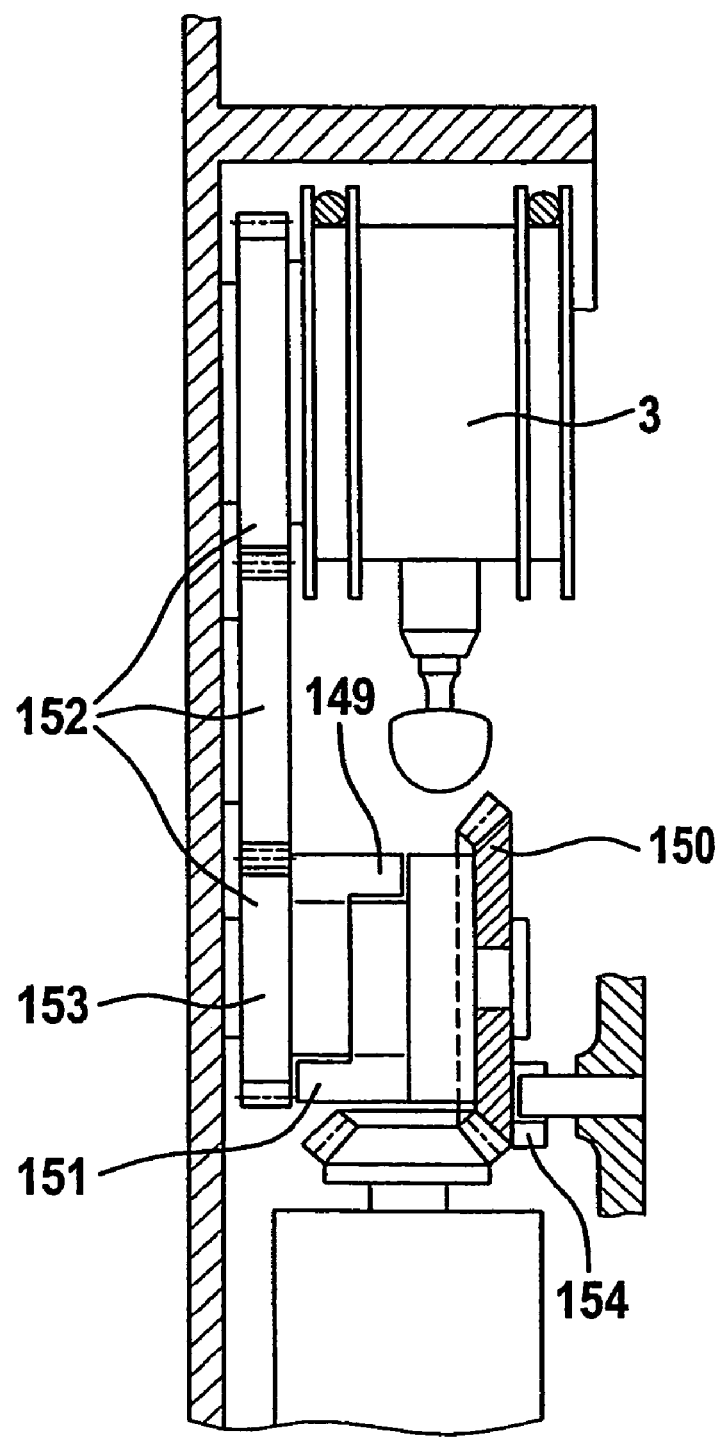
Figure 25C:
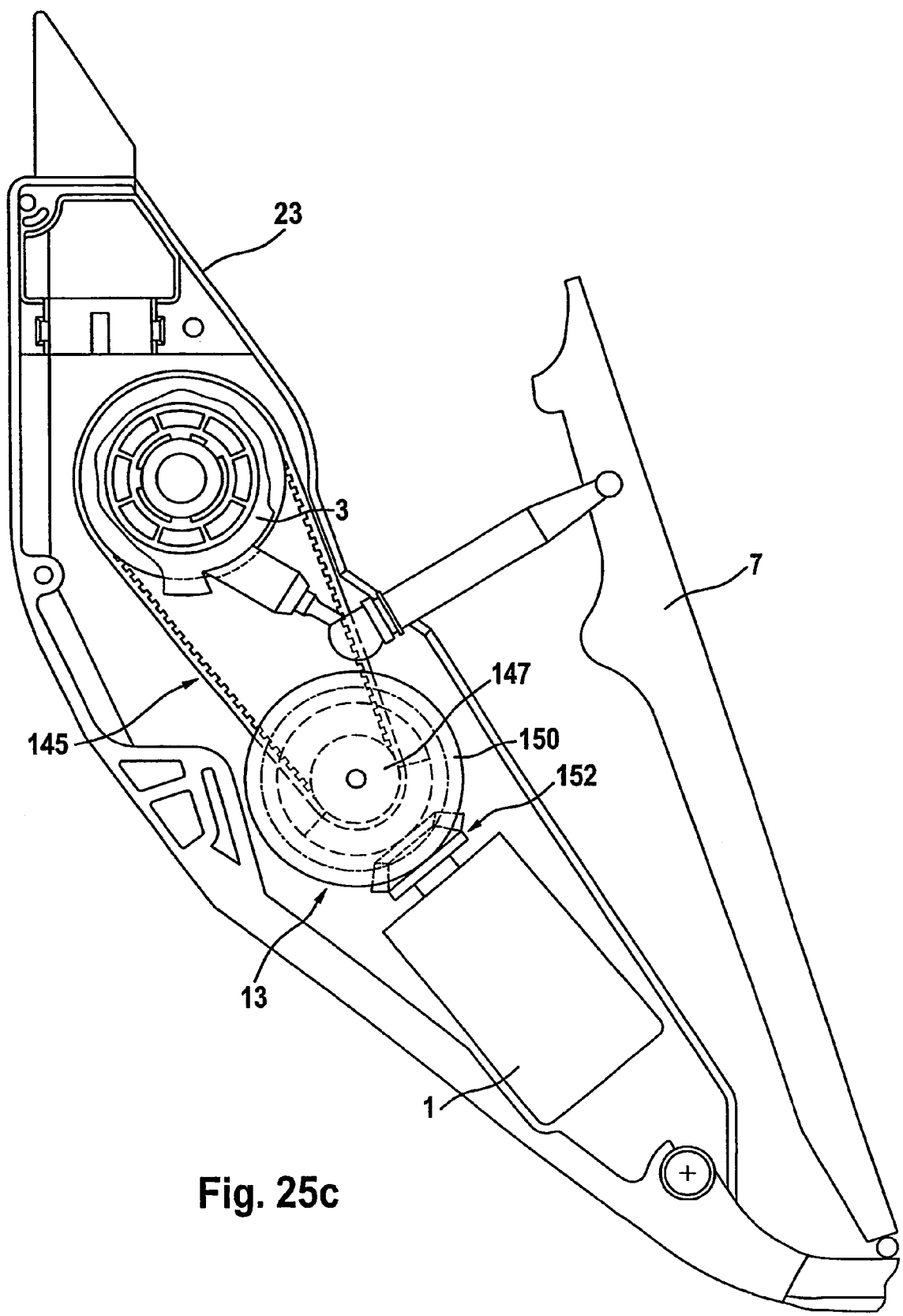
Figure 25D:
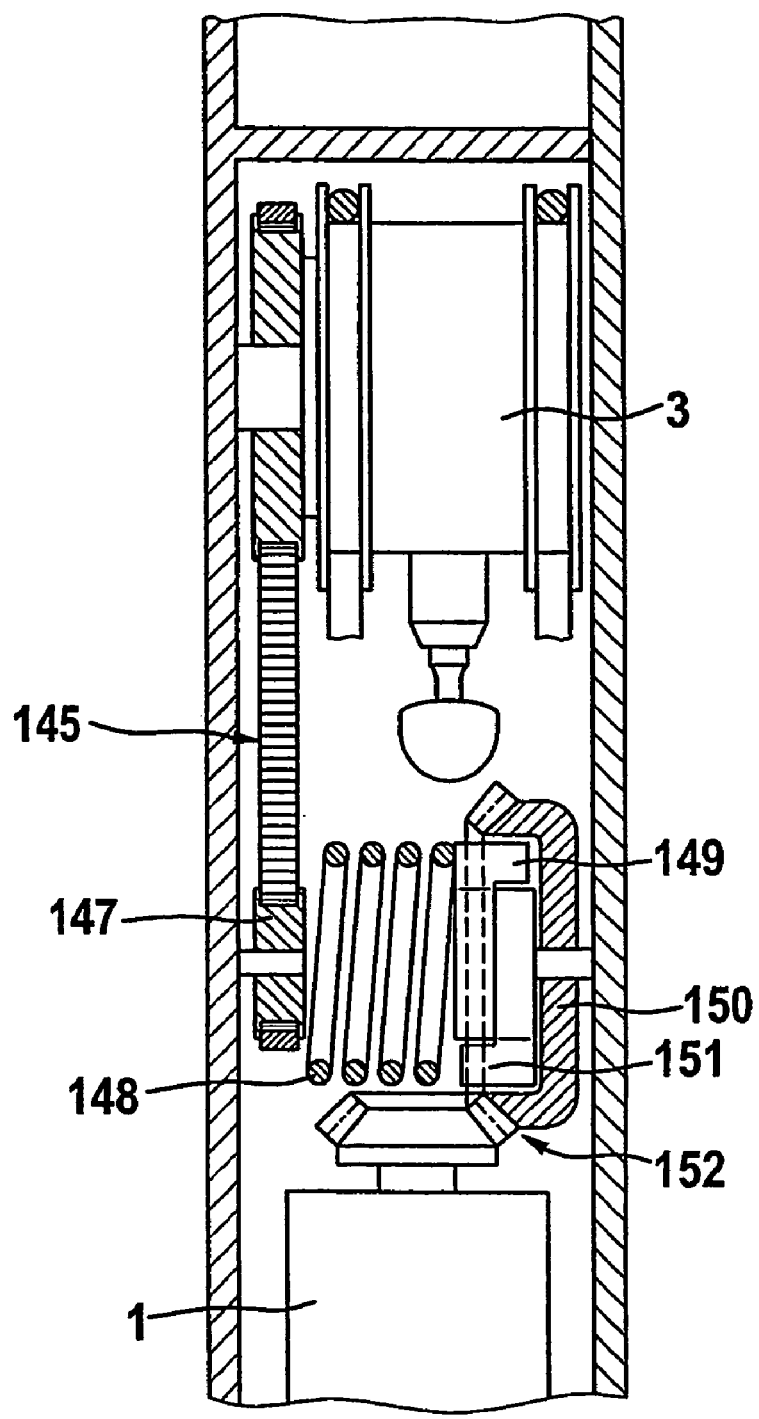

In FIG. 25b, the cam plate 3 is connected to a stop 149 disposed on the trailing gearwheel 153 by way of a gear unit 152. On the same shaft/axis of the trailing gearwheel, the bevel gearwheel 150 with the counterstop 151 is arranged which is connected to the motor 1 for the FFP function by way of a transmission stage. When the cam plate is actuated by way of the pedal without FFP function, the gear causes the gearwheel with the step to be passed through an angular range without meeting the counterstop. The motor has moved said counterstop into a position (rest position) that does not have any influence on the standard actuation. In the FFP function, i.e. the nominal speed has been reached or before reaching the nominal speed, the counterstop is moved to adopt the position corresponding to the adjusted speed so that the stop of the trailing gearwheel will get into contact thereon upon actuation. In the simplest case this may imply that the counterstop is moved against the stop only as soon as the nominal speed is reached. When the motor 1 starts running only after the nominal speed is reached, it will work with the motor force against the pedal until the nominal speed is reached again. In the design according to the present embodiment, it is again possible to overcome the force of the motor, that means, forcing the motor into a rotation in the opposite direction.

It must be ensured under control technology aspects that in the instant of the two stops meeting, the FFP force generated by the motor can be felt at the accelerator pedal as an increased counterforce. (=point of transfer). A possible overcoming of the point of transfer as a safety aspect upon blocking of the motor can be realized by a sliding clutch or a preloaded leg spring/spiral spring which, depending on the place of installation, will even take into account a possible blocking of the gear, as has been described hereinabove in connection with the embodiment 24.

The following variant is possible under the invention: Instead of the gearwheel/gear unit, it is possible to employ a transmission unit embodied by a synchronous belt drive 145, as is shown in FIG. 25b.

In FIG. 25b, the cam plate 3 in housing 23 of the pedal module is connected to a gear 13 by way of a synchronous belt 145. In this arrangement, the synchronous belt 145 makes catch at a gearwheel 147 being now connected to a first end of a leg spring 148. The opposite second end of the leg spring 148 is preloaded with respect to the first end of the leg spring within a housing (not shown) by way of a stop 149. A second stop 151 connected to a bevel gearwheel 150 is pivoted with respect to the first stop 149. The bevel gearwheel 150 is connected to the rotor of the motor 1 by way of a bevel gear 152.

When the FFP function is not enabled, the two stops 149 and 151 are so far away from each other that they are unable to touch each other when the pedal is applied. When the FFP function is enabled, the motor 1 will move the stop 151 into the position that corresponds to the predetermined nominal speed or, in the simplest case, will immediately move the two stops towards each other. Similar to the embodiment 23, a preloaded spring, preferably a leg spring 138, is interposed between the gear 13 and the motor 1. This leg spring is so stiff that it will not give way upon overruling pedal depression. If, however, the motor is blocked, or if the motor cannot escape or yield as quickly as the driver steps on the pedal, the leg spring will give way and thereby protect the device of the invention, on the other hand, giving the driver the possibility of forcing the necessary pedal position.

Advantages

Fail-safe performance. When the gear or motor is blocked, the pedal can be applied further with an increased force. No motor inertia forces in the event of dynamic overruling pedal depression, because the stop is in its rest position when the FFP function is not enabled.
Stiff system.
Simple design.
Variable restoring force in the FFP function owing to torque increase of the motor.
Low-noise operation when a synchronous belt drive is used.

Figure 26:
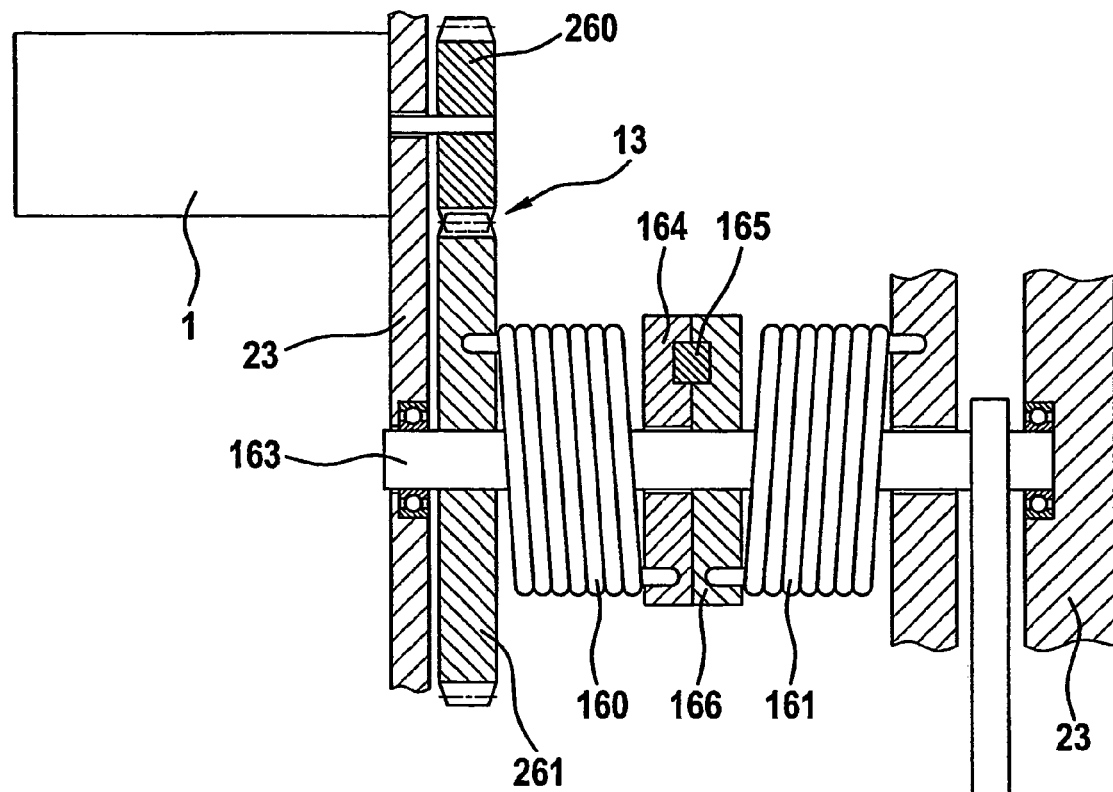
FIG. 26 shows a twenty-sixth embodiment.

Embodiment 26 According to FIG. 26

This embodiment is characterized in that there is no need to install additional components into a standard pedal module for realizing the object of the invention. Thus, this embodiment has no customary restoring spring 4 attached to the housing and no cam plate 3 that makes catch at the pedal 7 by way of a coupling lever 50 and a turning lever 51. This embodiment is characterized by a very compact and simple design.

A bearing shaft 163 is pivoted in the housing 23 in FIG. 26. Said bearing shaft is integral with a substantially cylindrical attachment 166 and, further, rigidly coupled to the pedal lever 7. Additionally, a motor 1 is attached in the housing 23 and drives a gear 13, which is composed of two gearwheels in the present embodiment. Further, a stop disc 164 having a projecting stop 165 is pivoted on the bearing shaft 163.

Seated on an attachment 166 is a first torsion spring 161 making catch with its first end at the housing 23 and with its second end at the attachment 166. In a similar manner, a second torsion spring 160 is with its one end captivated at the stop disc 164, while the other end is axially engaged into an opening in the end surface of the second gearwheel 261 and, thus, is connected to the second gearwheel 261. In a similar fashion, the remaining spring ends of the two torsion springs are engaged in corresponding openings in the stop disc 164 or the attachment 166 so that forces in both directions of rotation can be exerted on these spring ends. In a defined angular position of the attachment 166, said has a counterstop (not shown) in relation to stop 165. When the pedal 7 is depressed at the pedal lever, the bearing shaft 163 with the attachment 166 is rotated, and the first torsion spring 161 is wound up, this way providing the usual restoring force. Thus, the first torsion spring 161 assumes the task that was usually assumed by the restoring spring 4 described in the previous embodiments.

The position of stop 165 is chosen such that during the normal operation where no additional controlling force (FFP force) shall be generated (e.g. because FFP is disabled or the actual speed has not yet reached the nominal speed), the counterstop cannot move to bear against the stop 165 upon actuation of the pedal 7. This way, e.g. the electronically controlled acceleration device can be actuated by the pedal 7 when a corresponding sensor makes catch at the bearing shaft 163.

When now the additional controlling force (FFP force) shall act on the pedal, motor 1 will start running and rotate the second gearwheel 261 by way of gear 13 in such a fashion that the stop 165 will move to bear against the counterstop at attachment 166, whereby the motor 1 acts by way of gear 13 with gearwheel 261 on the second torsion spring 160, and whereby the stop disc 164 with stop 165 is rotated and entrains the attachment 166 by means of the counterstop (not shown). The direction of force of the acting stop 165 is such that the restoring force exerted by the restoring first torsion spring 161 is supported and thus boosted.

If the additional controlling force shall be overruled by pedal 7, the pedal 7 can overcome the forces of the two torsion springs. As this occurs, the counterstop at attachment 166 will entrain stop 165 and hereby rotate the end of the second torsion spring 160.

In a first aspect of the embodiment, the stiffness of the second torsion spring 160 can be chosen to have such an extent that with the usual forces necessary for overruling pedal depression, the second gearwheel 261 is rotated due to the spring end making catch, with the result that the gear 13 causes backward rotation of the motor. Only when a defined force threshold is exceeded because the pedal is suddenly depressed very quickly or the motor 1 or the gear 13 block, will the spring 160 give way with a view to protecting the system against damages and allowing overruling depression of the pedal 7 in spite of the blocking.

The gear 13 can be self-locking in a second aspect of the embodiment. This is advantageous because the motor needs only winding up the torsion spring 160 for generating the FFP force, whereupon motor 1 can be switched off. After the designed nominal speed has been reached, motor 1 will be switched on again to move the stop 165 away from the counterstop.

Therefore, the solution of the object to the achieved by the embodiment of FIG. 26 can be described briefly in other words as follows. In this solution, the reaction force in the pedal is generated by two parallel-connected torsion springs 160, 161. The pedal 7 and the bearing shaft 163 are rigidly interconnected so that pedal application causes rotation of the bearing shaft. Said bearing shaft 163 is rigidly connected to an attachment 166 so that these two structural elements can be seen as one part. The torsion spring 161 is suspended with its one end at the bearing shaft 163 and is supported with its other end at the housing 23. It provides the basic characteristic curve and also ensures the basic function, as has been described in connection with the restoring spring 4 in the above-mentioned embodiments. Thus, the torsion spring 161 represents the usual restoring spring that has been described several times hereinabove and can be preloaded like it. Torsion spring 160 is at its ends connected to the gear range 13, on the one hand, and to the stop disc 164, on the other hand. Stop 165 is rigidly connected to the stop disc 164. The stop disc 164 is pivoted on the bearing shaft 163 and rotated by the motor 1 by way of the gear range 13 and the connected torsion spring 160. This changes the position of the stop 165 on the stop disc 164.

In the initial condition without FFP, the bearing shaft and thus the attachment 166 and the stop disc 164 and thus the stop 165 are not in the flux of force. If a second force (hereinabove regularly referred to as controlling force) shall now be superposed on the basic force of the torsion spring (restoring spring) 161 because the actual speed reaches the nominal speed, the motor 1 causes the stop disc 164 to move into abutment so that both springs are twisted by way of the pedal. The motor 1 then causes rotation of the stop disc 164 with its stop 165 along with the torsion spring 160 in such a fashion that the stop 165 of the stop disc 164 will bear against the attachment 166 of the bearing shaft 163. Thus, the torsion spring 160 is connected in parallel to the torsion spring 161, and upon actuation of the pedal 7 not only the torsion spring 161 must be wound up in relation to the housing 23 but also torsion spring 160 must be wound up in relation to the gear range 13 and the motor 1.

To vary the magnitude of force, the motor 1 can now work the gear 13 at different speeds either in the direction of rotation of the bearing shaft or in opposition thereto, whereby the preload of the torsion spring 160 is varied. To be able to better provide the abrupt change of force at the accelerator pedal, the torsion spring 160 should be preloaded in relation to the stop 165. When the additional controlling force is introduced, the motor can twist the torsion spring 160 in such a manner that its preload is slightly reduced and it is supported on the attachment 166 by way of the stop 165. In an additionally possibility, the motor moves the stop disc 164 in the opposite direction when the additional controlling force is introduced, thereby moving the stop 165 against the attachment 166, and subsequently generating a preload on the attachment 166 and thus the pedal 7 by way of the torsion spring 160.

In a different application (for example, in the brake pedal), the bearing shaft can be in constant engagement with the stop disc. The Force-Feedback force (that means, the controlling force) is produced by a spring with a variable preload. Instead of the torsion spring 160, it is also possible to use only the electric motor 1, what may, however, cause difficulties with the fail-safe performance when the motor blocks (e.g. in the event of quick overruling depression). Tension or compression springs articulated by way of levers may also be used instead of the torsion springs.

For a better comprehension of the drawings, the following should be noted. The gear wheels of the gear range 13 and the stop disc 164 and the bearing shaft 163 including an attachment are shown in a cross-section. This means that these structural elements can entrain the two springs 160, 161 in their anchored ends in both directions of rotation. The attachment 166 and the stop 165 are so configured that the stop disc 164 can be rotated with respect to the attachment 166 about a sufficient angle of rotation without abutting on the attachment.

The embodiment according to FIG. 26 offers the following advantages:

Fail-safe performance. When the gear or motor is blocked, the pedal can be applied further by means of an increased force.

It is only necessary to kick against the parallel-connected spring in the event of dynamic overruling pedal depression.

Very simple design.

Variable restoring force in the FFP function (introduction of the controlling force). The use in the accelerator pedal or brake pedal is possible.

Embodiment 27 According to FIGS. 27a and 27b

This embodiment basically combines the features of the embodiment 14 with the features of the embodiments 24 and 25. However, in the present embodiment the spindle 5 does not act in parallel to the restoring spring 4 on the cam plate 3, but makes catch directly at pedal lever 7 through a separate path of force. Said path of force extends through an overruling depression lever 175 pivoted in the housing of the pedal module and coupled to an actuating lever 176 on the output side by way of a leg spring 177. The design of the leg spring is chosen similarly to the spiral spring 97 in embodiment 24 or the leg spring 148 in the embodiment 25. The leg spring 177 is split up into two partial springs for reasons of symmetry. Leg spring 177, in turn, is chosen to be so strong that it will not change its shape in the normal overruling pedal depression. On the other hand, it protects the invention device in case that suddenly high forces develop, for example, when the pedal 7 is depressed very quickly and the motor 1 is unable to follow the countermovement because the pedal was depressed too quickly or the motor is blocked. Spring 177 will yield in this case and permit the pedal movement the driver demands.

The embodiment according to FIG. 27 can be described briefly as follows. The ball screw with the threaded sleeve 11 and the spindle 5 acts on the overruling depression lever 175, which is connected to an actuating lever 176 by way of a preloaded leg spring 177. The flux of forces occurs like this with an active pedal resetting. To be able to quickly apply the pedal in an active resetting nevertheless, a rotary relative movement between the depression lever and the actuating lever is possible with a somewhat higher force.

Figure 28A:
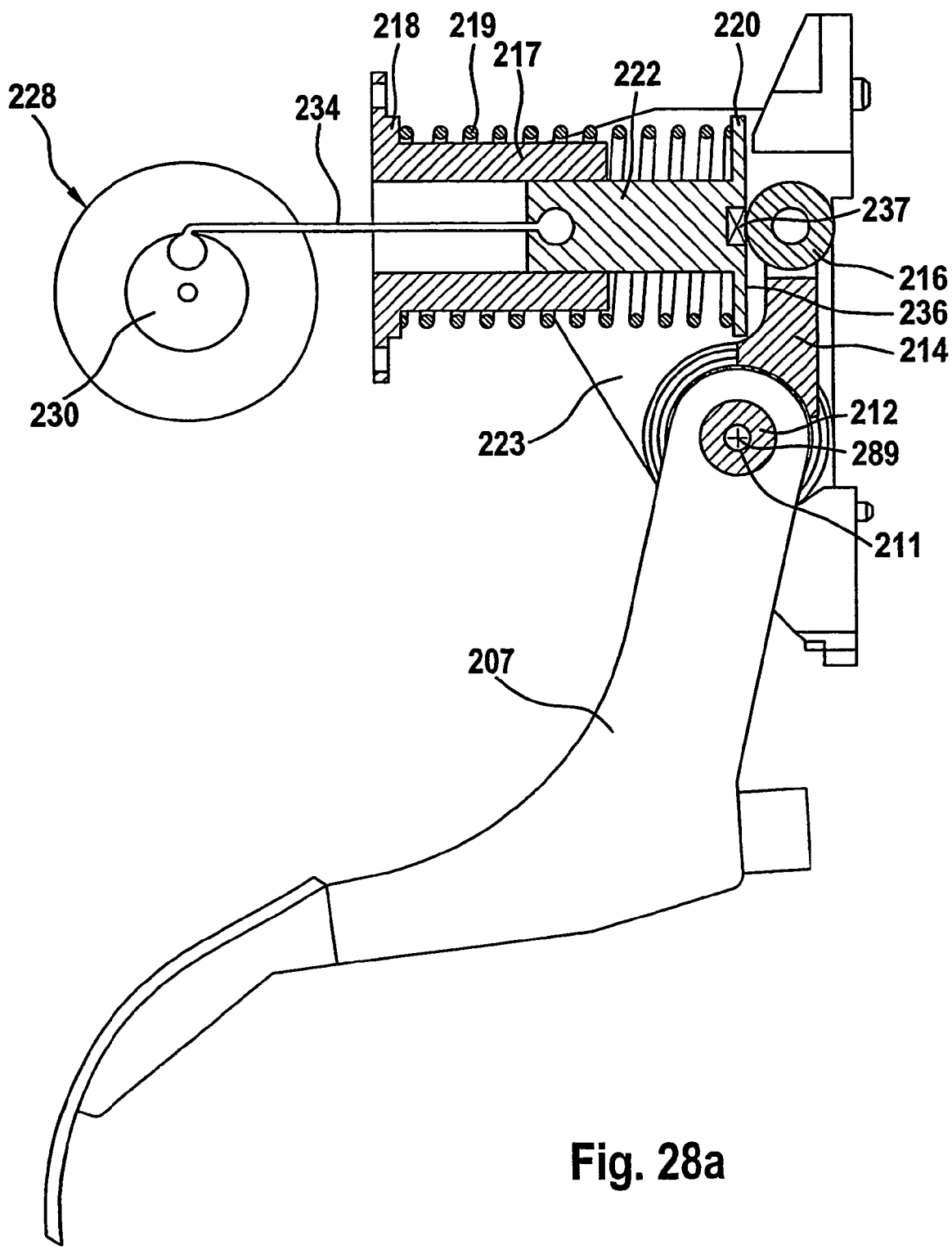
FIG. 28a and FIG. 28b show a twenty-eighth embodiment.
Figure 28B:
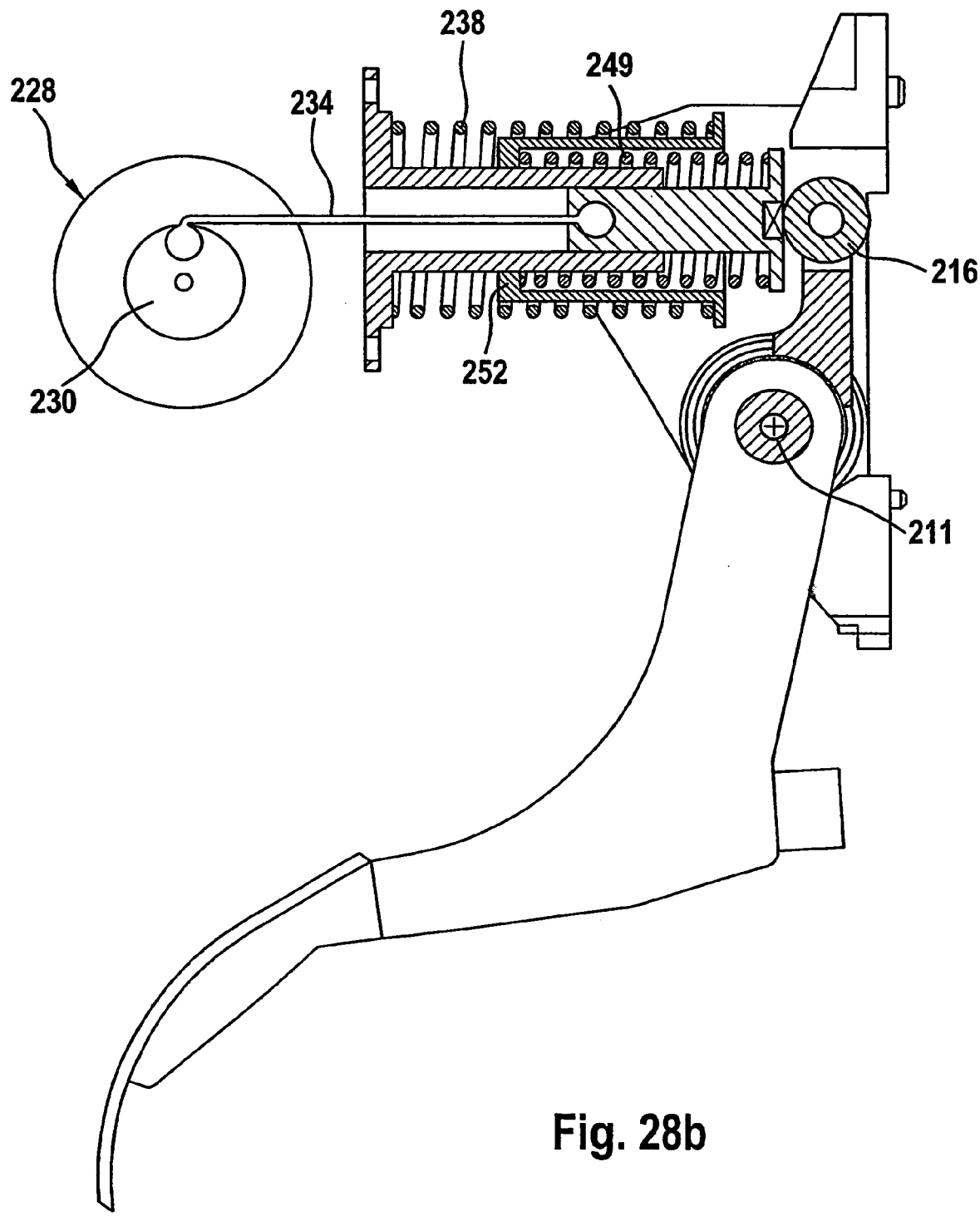

Embodiment 28 According to FIG. 28a and FIG. 28b

FIGS. 28a and 28b show two designs of an embodiment that is very similar to the embodiment according to FIG. 15a and FIG. 15b. While a floor-mounted pedal 7 rotating about the axis of rotation 89 is provided in the last mentioned embodiment, the present embodiment applies the principle described in FIG. 15 to a hanging pedal.

FIG. 28a shows a hanging pedal lever 207 that is pivoted about an axis of rotation 289 with respect to a housing 223. The housing 223 (not shown) represents the customary housing of a hanging pedal lever and has the usual design that will not be described more closely herein. The pivot bearing 211 is rigidly connected to the housing 223. Pedal lever 207 makes catch at bearing 289 by way of a pin 212, said pin 212 being rigidly connected to the pedal lever 207. Pin 212 is part of a turning lever 214 so that the pedal lever 207 and the turning lever 214 kinematically form a unit that is adapted to rotate about the pivot bearing 211 in the housing 223.

A roller is pivoted as a stop 216 at the free end of the turning lever 214 so that only forces that extend vertically to the turning lever can be transmitted by way of the turning lever 214. Further, a sleeve 217 is rigidly connected to the housing 223, said sleeve having at its one end a circumferential attachment 218 on which a spring 219 is supported. The other end of spring 219 makes catch at a circumferential step 220 of a plug 222 slidably guided in the sleeve 217.

Opposite the housing 223 and the vehicle body, a unit 228 made up of motor and gear is arranged. The motor is able to drive a conveyor drum 230 by way of the gear, with the result that a band or rope 234 can be wound up on the conveyor drum. The end of the band disposed opposite to the wound-up end of band 234 makes catch at the plug 222. It is therefore possible by correspondingly winding up the band to pull the plug 222 in FIG. 28a sufficiently far to the left so that its right end surface is out of engagement from the stop 216 and stays like this even if the pedal lever 207 is actuated counterclockwise. The spring 219 is dimensioned such that it can move the plug 222 under preload against stop 216 in every position of stop 216.

In the normal condition when the actual speed is below the nominal speed, the standard pedal module 223 (not shown) works in the usual manner, and the conveyor drum 230 keeps the band 234 wound up in such a way that the plug 222 stays out of engagement with the stop 216. The spring is subjected to a considerable preload.

When the actual speed reaches the nominal speed, an electric circuit will output a signal enabling the motor of the motor-and-gear unit 228. As this occurs, the motor winds off the conveyor drum 230 in such a manner that the stop 236 of the plug 222 moves into abutment on the stop 216 of the turning lever 214 and thereby exerts an additional controlling force on the pedal lever 207. This controlling force can be rated by an appropriate selection of spring 219.

When the driver has finally caused the actual speed to reach the nominal speed, the stop 236 is maintained in this position by the motor and the gear 228.

It is very favorable for the gear to be self-locking because the motor is relieved from the tensile force of the spring 219 in this case. The motor will then readjust only the conveyor drum 230 in the direction of force of the spring or in opposition to the direction of the force of the spring, yet is relieved from tension for the entire time period in which the band 234 is not readjusted.

In FIG. 28a, a microswitch is fitted to the plug 222 in the area of the stop 236, and stop 216 can switch said microswitch. It is therefore possible to have an electric signal output by the microswitch 237 when the (additional) controlling force starts to act on the turning lever 214 and, thus, on the pedal lever 207. This electric signal may e.g. serve for switching off the motor or the unit 228 and/or indicate to the driver that the controlling force became active.

The design of the embodiment according to FIG. 28b differs from the one according to FIG. 28a essentially only in that the spring 219 in FIG. 28a is replaced by two serially connected springs 238 and 249 nested in each other. The spring 238 in FIG. 28b comparable with the spring 219 in FIG. 28a is therefore not directly supported on stop 216, but makes catch at a sleeve-shaped intermediate member 252, which supports with its other end the second spring 249. Said second spring 249 will then act on plug 222 as has been described hereinabove with reference to FIG. 28a. The advantage of this measure essentially involves tuning the two springs in such a fashion that, admittedly, a sufficiently high controlling force is obtained in every position of the stop 216, yet this controlling force is less dependent on the position of the stop 216. In particular, a flatter spring characteristic curve and a lower spring rate are thereby achieved.

The embodiment according to FIG. 28 and further embodiments permits that the motor remains constantly switched on while the controlling force is effective (meaning, while the FFP force acts). This renders it possible to regulate the magnitude of the force output by spring 219 or springs 238, 249. This is important because the effective controlling force depends on the position of the stop 216. If the stop 216 in FIG. 28 is positioned far to the left when the controlling force sets in, the restoring force will be higher than is the case when the controlling force sets in and the stop 216 is positioned far to the right. Differing controlling forces are hereby produced which are especially different when the spring constant is very high. It is now possible to reduce the high controlling force occurring in the presence of a high pedal force by means of the motor (stop 216 is far to the left), because the motor slightly winds the conveyor drum 230 in opposition to the controlling force.

More specifically, the embodiment according to FIGS. 28a and 28b can be described briefly as follows. The construction is based on the spring concept according to FIGS. 15a and 15b, which has already been described therein making reference to a floor-mounted pedal. The illustrated design according to FIG. 28b is for a hanging accelerator pedal. Fitted to the pedal lever 207 of the standard pedal module 223 is a stop lever 214 through which an increased pedal force can be applied. This increased pedal force is generated by way of a spring assembly (218, 238, 252, 249, 222). The spring assembly is compressed when the FFP function is disabled (no controlling force). This is done by winding up the band 234 on the conveyor drum 230 by way of the motor-and-gear unit 228. In order that the motor can be switched off after winding up the band, it is favorable to employ a self-locking gear.

However, a locking mechanics for fixing the end position may also be used. When the FFP function is enabled (introduction of the controlling force), the spring assembly will be relieved until the point of transfer. The increase of the pedal force will impart to the driver that a predefined driving condition is reached. When the point of transfer is reached, the microswitch integrated in the stop of the FFP module is switched. This action permits precisely determining that the point of transfer is reached. A possible solution involves using the contact surfaces of the stops as switch contacts instead of a microswitch.

FIG. 28a shows another embodiment. Only one spring is used to generate the FFP force in this variant. The advantage of the variant in FIG. 28b with the two serially arranged springs can be seen in that the spring rate is reduced and, thus, the force rise above the pedal stroke is less.

The force rise above the pedal stroke can be compensated by way of the motor by slightly energizing the motor, with the motor constantly pulling the band 234, whereby the necessary pedal force is reduced. When the current is slightly increased above the pedal stroke, it is possible to produce a roughly constant pedal force. Of course, the force level can also be generally adapted this way.

Figure 29A:
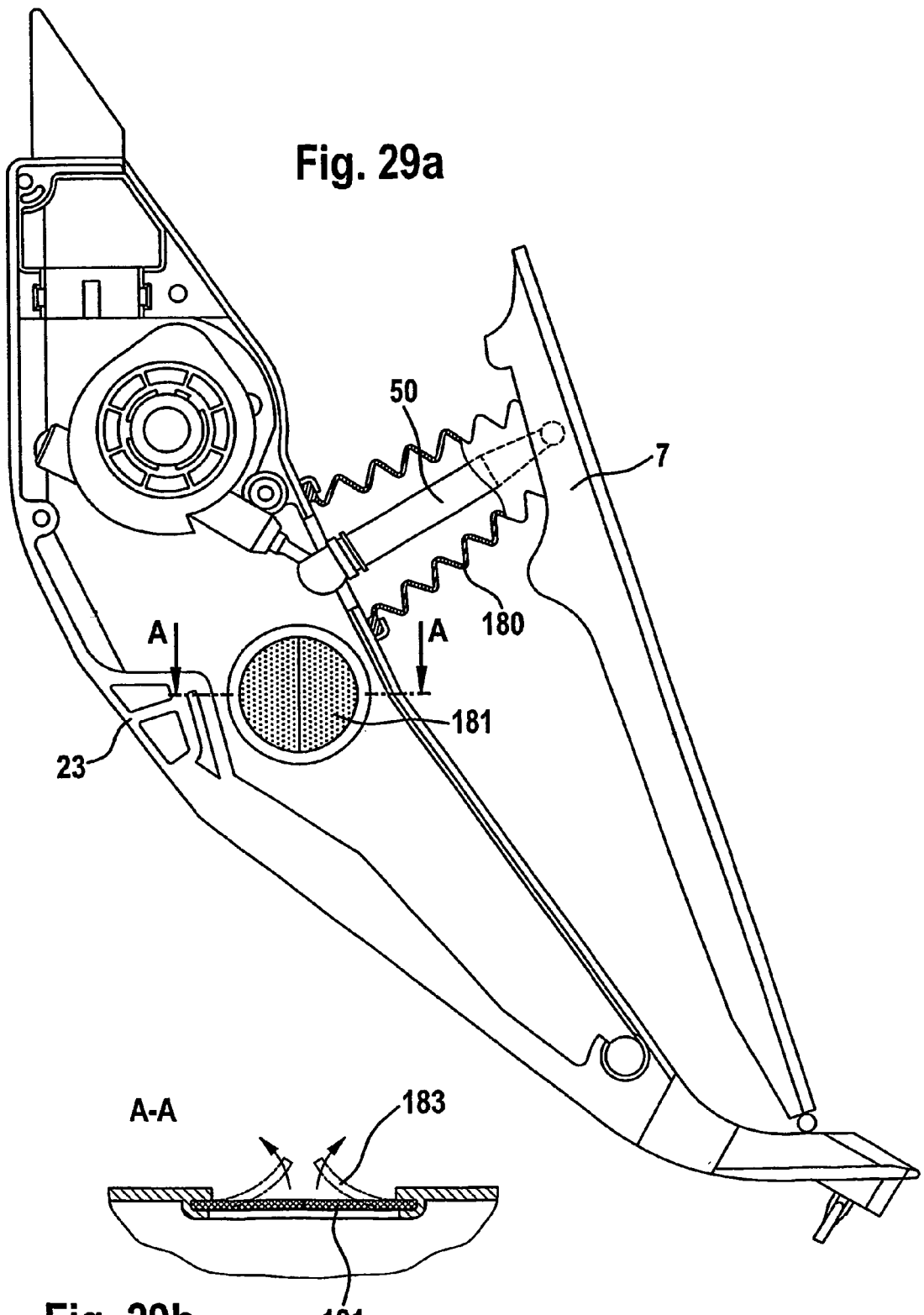
FIG. 29a and FIG. 29b show a twenty-ninth embodiment.
Figure 29B:
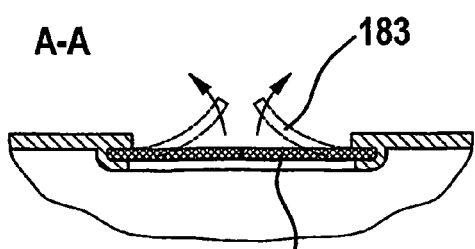

Embodiment 29 According to FIG. 29a and FIG. 29b

The mechanics of Force-Feedback pedal systems is susceptible to dust and, accordingly, must be protected against dust. A pleated bellows 180 is provided for this purpose, sealing the housing and the element projecting from the housing in the direction of the pedal against ambient influences.

When the pedal is quickly depressed, however, the pleated bellows is compressed in a very short time. The thereby compressed air can cause an undesirable behavior of the system in such a way that either the pedal cannot be depressed as quickly as necessary (time delay) or that the pleated bellows is damaged or dismounted (bulged, unbuttoned, etc.).

A filter accommodated in the pleated bellows or in the housing and taking care of pressure compensation will prevent such an occurrence.

Another possibility includes providing a valve in addition to the filter, which can have a very simple configuration (fluttering valve). It is also feasible to integrate the valve into the filter. A respective embodiment is shown in FIG. 29b.

FIG. 29 shows the usual design of a pedal module as it has many times been described in the previous embodiments. A pleated bellows 180 encompassing the coupling lever 50 is arranged between pedal 7 and housing 23. To discharge the pressure from the housing 23 that develops upon depression of the pedal and thus upon folding up of the pleated bellows, a filter 181 is inserted into the wall of the housing 23, said filter having two vanes 183 opening under pressure. When later, upon return of the pedal, the pedal is slowly pushed back by the restoring spring, the vanes 183 made of a filtering material will close, and the air flowing back into the housing can be filtered before entering this space.

The invention claimed is:

1. Device for controlling a vehicle parameter, the device including a control element wherein a change in position of the control element caused by a corresponding actuating force with respect to an initial position of the control element leads to an increase of the parameter in opposition to a restoring force, and with decreasing actuating force, the restoring force returns the control element in the direction of the initial position of the control element, and a controlling member being provided and generating an additional controlling force that acts in the restoring direction of the control element in dependence on one or more predetermined measured variables of the vehicle, wherein the controlling force is generated by an electromechanical actuator, wherein the actuator is actuated by a corrective signal triggered by the deviation of a measured quantity of the vehicle from a nominal value, or is at least dependent thereon, wherein the controlling force acts on the control element in dependence on the deviation from the nominal value, wherein overrule means are provided by way of which the controlling force can be overcome by a sufficiently high actuating force, wherein emergency means are provided which facilitate depression of the control element in opposition to the controlling force even if the overrule means are blocked and wherein the emergency means will respond only after the fluctuating force exerted on the control element exceeds a predetermined threshold which is greater than the sufficiently high actuating force, wherein the emergency means includes an elastic member which remains substantially rigid when the actuating force exerted on the control element is below the predetermined threshold and responds elastically when the actuating force exerted on the control element exceeds the predetermined threshold.

2. Device as claimed in claim 1, wherein the controlling force sets in abruptly.

3. Device as claimed in claim 2, wherein the actuator accommodates an electric motor generating the controlling force.

4. Device as claimed in claim 1, wherein the actuator is only actuated when an actual speed is at least equal to an adjusted nominal speed.

5. Device as claimed in claim 1, wherein the controlling force is active only in opposition to the actuating force but not in the direction of the actuating force.

6. Device as claimed in claim 1, wherein the overrule means are integrated into the actuator for generating the additional controlling force.

7. Device as claimed in claim 1, wherein the actuator is equipped with a gear by way of which it outputs the controlling force to the control element.

8. Device as claimed in claim 1, wherein the actuator and a source of power providing the restoring force onto the control element is protected against the ambient air.

9. Device as claimed in claim 1, wherein the actuator and a source of power providing the restoring force are arranged within a housing of a control element module.

10. Device as claimed in claim 9, wherein the control element is configured as a pedal lever that is articulated at the housing of the control element module.

11. Device as claimed in claim 1 wherein the vehicle parameter is either the speed or the deceleration of the vehicle.

12. Device as claimed in claim 11 wherein the control element is either a pedal configured to control the driving force of the vehicle engine or a pedal configured to control the brake force of the vehicle.

13. Device as claimed in claim 1 wherein the measured quantity is either a driving speed or a brake force and the nominal value is either a nominal speed or an allowable brake force, respectively.

* * * * *